US012361408B2

(12) United States Patent
Jakobsson et al.

(10) Patent No.: US 12,361,408 B2
(45) Date of Patent: Jul. 15, 2025

(54) SYSTEMS AND METHODS FOR TRANSACTION MANAGEMENT IN NFT-DIRECTED ENVIRONMENTS

(71) Applicant: Artema Labs, Inc, Los Angeles, CA (US)

(72) Inventors: Bjorn Markus Jakobsson, Portola Valley, CA (US); Stephen C. Gerber, Austin, TX (US); Guy Stewart, Olympia, WA (US); Keir Finlow-Bates, Eura (FI)

(73) Assignee: Artema Labs, Inc, Los Angeles, CA (US)

( * ) Notice: Subject to any disclaimer, the term of this patent is extended or adjusted under 35 U.S.C. 154(b) by 156 days.

(21) Appl. No.: 17/935,541

(22) Filed: Sep. 26, 2022

(65) Prior Publication Data

US 2023/0100422 A1 Mar. 30, 2023

Related U.S. Application Data

(60) Provisional application No. 63/248,415, filed on Sep. 24, 2021, provisional application No. 63/271,205, (Continued)

(51) Int. Cl.
*G06Q 20/36* (2012.01)
*G06Q 20/12* (2012.01)
*G06Q 20/38* (2012.01)

(52) U.S. Cl.
CPC ..... *G06Q 20/3674* (2013.01); *G06Q 20/1235* (2013.01); *G06Q 20/3825* (2013.01);
(Continued)

(58) Field of Classification Search
CPC .......... G06Q 20/3674; G06Q 20/1235; G06Q 20/3825; G06Q 20/3829; G06Q 20/389;
(Continued)

(56) References Cited

U.S. PATENT DOCUMENTS 8,359,273 B2* 1/2013 Leleu .................... G07F 7/1008
705/902
10,984,117 B2* 4/2021 Shankar .............. H04L 63/0807
(Continued)

FOREIGN PATENT DOCUMENTS

WO 2015175566 A1 11/2015
WO 2023049908 A1 3/2023

OTHER PUBLICATIONS

International Preliminary Report on Patentability for International Application PCT/US2022/077039, Report issued Mar. 26, 2024, Mailed on Apr. 4, 2024, 9 Pgs.
(Continued)

*Primary Examiner* — John W Hayes
*Assistant Examiner* — Yingying Zhou
(74) *Attorney, Agent, or Firm* — KPPB LLP

(57) ABSTRACT

Systems and techniques to facilitate transaction management in NFT-directed environments within an NFT platform are illustrated. One embodiment embeds an anchor into an application for utilizing tokens, wherein the anchor includes a verifier and an identifier unique to the application. The method verifies, using the verifier of the anchor, that a token is compatible with the application. The method imports the token into the application. The method associates the anchor with a lock, wherein the lock governs access to content of the token. The method identifies a completed transaction that changes access rights associated with the token, wherein the transaction is identified using at least one of information included in the anchor and information included in the lock. The method transmits, to a party to the transaction, a lock value, wherein the lock value, when detected by the lock, allows the party to access the token.

20 Claims, 33 Drawing Sheets

Related U.S. Application Data filed on Oct. 24, 2021, provisional application No. 63/281,721, filed on Nov. 21, 2021, provisional application No. 63/312,859, filed on Feb. 23, 2022.

(52) U.S. Cl.
CPC ....... *G06Q 20/3829* (2013.01); *G06Q 20/389* (2013.01); *G06Q 2220/00* (2013.01)

(58) Field of Classification Search
CPC ........... G06Q 2220/00; G06Q 20/0655; G06Q 20/0855; G06Q 20/38215
See application file for complete search history.

(56) References Cited

U.S. PATENT DOCUMENTS

| | | | |
|---|---|---|---|
| 11,017,036 B2 | 5/2021 | Jakobsson | |
| 11,244,032 B1* | 2/2022 | Nguyen | G06F 9/547 |
| 11,348,099 B2* | 5/2022 | Vijayan | H04L 9/3247 |
| 11,374,756 B1* | 6/2022 | Myers | H04L 9/3213 |
| 2004/0221079 A1* | 11/2004 | Goldick | G06F 9/52 |
| | | | 710/200 |
| 2011/0153473 A1* | 6/2011 | Thomas | G06Q 40/123 |
| | | | 705/400 |
| 2011/0179477 A1* | 7/2011 | Starnes | H04L 63/0823 |
| | | | 726/9 |
| 2013/0179199 A1* | 7/2013 | Ziskind | G06F 21/10 |
| | | | 705/5 |
| 2015/0254664 A1* | 9/2015 | Bondesen | G06Q 20/367 |
| | | | 705/44 |
| 2017/0091758 A1* | 3/2017 | Kim | G06Q 20/227 |
| 2017/0142090 A1* | 5/2017 | Mahaffey | H04L 63/083 |
| 2019/0164151 A1* | 5/2019 | Doney | H04L 9/50 |
| 2019/0220836 A1* | 7/2019 | Caldwell | H04L 9/50 |
| 2020/0005284 A1* | 1/2020 | Vijayan | H04L 9/3247 |
| 2020/0186338 A1* | 6/2020 | Andon | H04L 9/0643 |
| 2021/0279305 A1* | 9/2021 | Goldston | G06F 16/41 |
| 2021/0374693 A1* | 12/2021 | La Salle | G06Q 20/0655 |
| 2022/0309491 A1* | 9/2022 | Shapiro | G06F 21/64 |
| 2023/0073859 A1* | 3/2023 | Matthews | G06Q 30/0641 |
| 2023/0086191 A1* | 3/2023 | Jakobsson | H04L 9/3231 |
| | | | 705/66 |

OTHER PUBLICATIONS

International Search Report and Written Opinion for International Application No. PCT/US2022/077039, Search completed Jan. 11, 2023, Mailed Feb. 16, 2023, 18 Pgs.

Ito et al., "A critical examination of the application of blockchain technology to Intellectual property management", Business transformation through blockchain. Palgrave Macmillan, Cham, 2019, 317-335, 2019. Retrieved on Jan. 10, 2023 from https://link.springer.com/chapter/10.1007/978-3-319-99058-3_12.

* cited by examiner

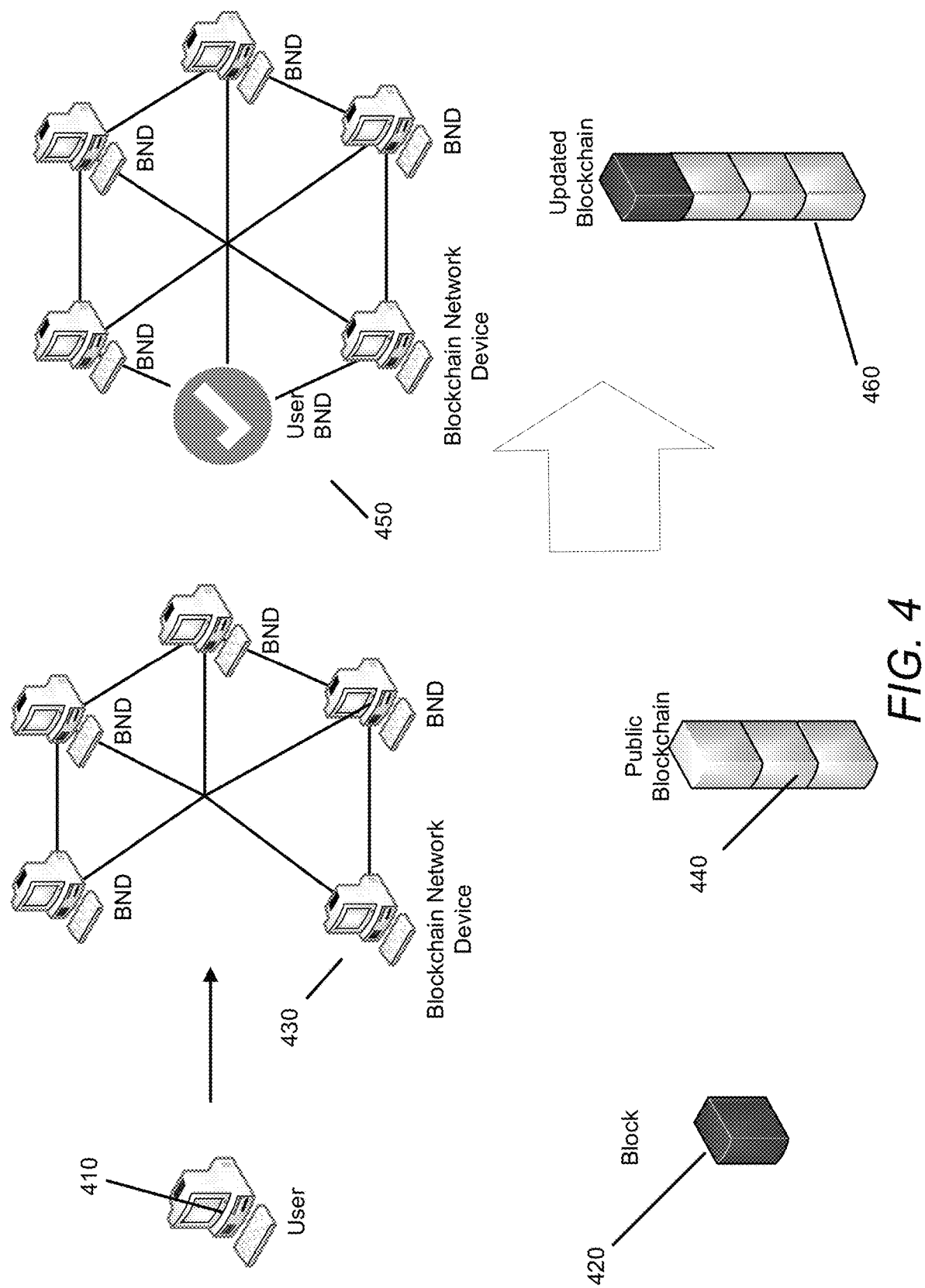

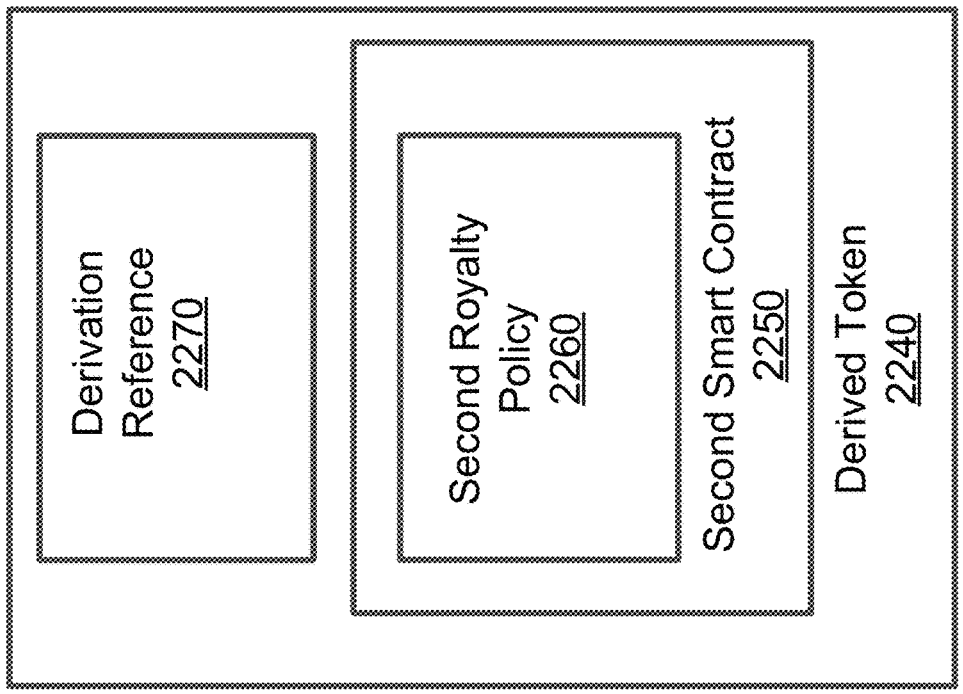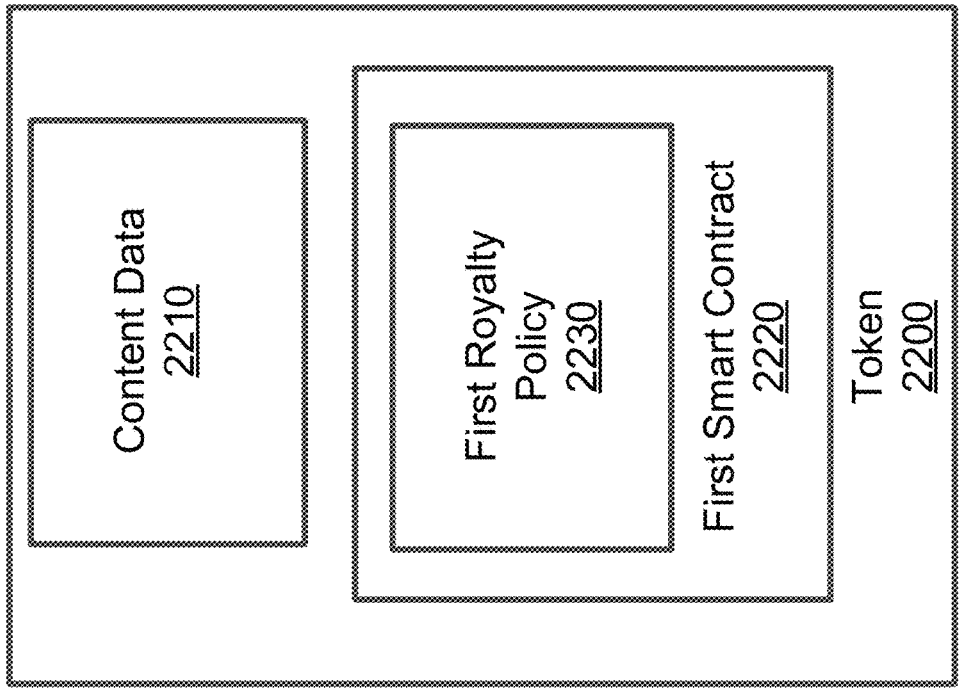
FIG. 22

SYSTEMS AND METHODS FOR TRANSACTION MANAGEMENT IN NFT-DIRECTED ENVIRONMENTS

CROSS-REFERENCE TO RELATED APPLICATIONS

The current application claims the benefit of and priority under 35 U.S.C. § 119(e) to U.S. Provisional Patent Application No. 63/248,415, titled "Control Mechanism to Constrain In-App Transactions," filed Sep. 24, 2021, U.S. Provisional Patent Application No. 63/271,205, titled "Automated Detection of Ponzi Structures," filed Oct. 24, 2021, U.S. Provisional Patent Application No. 63/281,721, titled "Royalty Sharing Method," filed Nov. 21, 2021, and U.S. Provisional Patent Application No. 63/312,859, titled "Abuse Safeguards Associated with Tokens," filed Feb. 23, 2022, the disclosures of which are hereby incorporated by reference in their entireties for all purposes.

FIELD OF THE INVENTION

The present invention generally relates to systems and methods directed to enabling transactions surround the transfer and use of tokens, including but not limited to the payment of token royalties.

BACKGROUND

Non-fungible tokens (NFTs) and other forms of tokens representing content, along with token-based derived works and configurable royalty policies, have the capability to bolster a number of industries including but not limited to art, music, and textual creations. Token royalties may be applied to stimulate the creation of art and content. Within token-directed environments, resale of tokens may enable content creators to obtain royalties for future sales of content they have created.

SUMMARY OF THE INVENTION

Systems and techniques to facilitate transaction management in NFT-directed environments within an NFT platform are illustrated. One embodiment includes a method to facilitate royalty payments related to changes in access rights associated with a token. The method embeds an anchor into an application for utilizing tokens, wherein the anchor includes a verifier and an identifier unique to the application. The method verifies, using the verifier of the anchor, that a token is compatible with the application. The method imports the token into the application. The method associates the anchor with a lock, wherein the lock governs access to content of the token. The method identifies a completed transaction that changes access rights associated with the token, wherein the transaction is identified using at least one of information included in the anchor and information included in the lock. The method transmits, to a party to the transaction, a lock value, wherein the lock value, when detected by the lock, allows the party to access the token.

In a further embodiment, the method transmits a royalty to a creator of the token after identifying the completed transaction. The method also provides a log of the transaction to an application authority that assesses the validity of the transaction.

In another embodiment, the token is stored in a container on the application; the container is encrypted at least in part through the lock; and the lock value includes a decryption key for the container.

In yet another embodiment, at least one of the anchor and the lock is a digitally signed value.

In still another embodiment, the access rights correspond to at least one of ownership rights, usage rights, and lessee rights.

In another embodiment, the application is made accessible in an application marketplace; and the embedding of the anchor in the application is performed prior to the application becoming accessible in the application marketplace.

In still yet another embodiment, verifying that the token is compatible includes assessing the identifier of the anchor matches an identifier of the token.

In another embodiment, the token is a non-fungible token (NFT).

In another embodiment, the anchor is embedded into the application by combining an executable file with an element of the anchor; and the element includes at least one of a library configured with respect to the identifier of the anchor, a sequence of code instructions referencing the identifier, and a binary to be integrated with the application.

In still another embodiment, the lock includes a smart contract element that, when executed, transmits a payment to a creator of the application.

One embodiment includes a non-transitory computer-readable medium storing instructions that, when executed by a processor, are configured to cause the processor to perform operations for changes in access rights. The processor embeds an anchor into an application for utilizing tokens, wherein the anchor includes a verifier and an identifier unique to the application. The processor verifies, using the verifier of the anchor, that a token is compatible with the application. The processor imports the token into the application. The processor associates the anchor with a lock, wherein the lock governs access to content of the token. The processor identifies a completed transaction that changes access rights associated with the token, wherein the transaction is identified using at least one of information included in the anchor and information included in the lock. The processor transmits, to a party to the transaction, a lock value, wherein the lock value, when detected by the lock, allows the party to access the token.

In a further embodiment, the processor transmits a royalty to a creator of the token after identifying the completed transaction. The processor also provides a log of the transaction to an application authority that assesses the validity of the transaction.

In another embodiment, the token is stored in a container on the application; the container is encrypted at least in part through the lock; and the lock value includes a decryption key for the container.

In yet another embodiment, at least one of the anchor and the lock is a digitally signed value.

In still another embodiment, the access rights correspond to at least one of ownership rights, usage rights, and lessee rights.

In another embodiment, the application is made accessible in an application marketplace; and the embedding of the anchor in the application is performed prior to the application becoming accessible in the application marketplace.

In still yet another embodiment, verifying that the token is compatible includes assessing the identifier of the anchor matches an identifier of the token.

In another embodiment, the token is a non-fungible token (NFT).

In another embodiment, the anchor is embedded into the application by combining an executable file with an element of the anchor; and the element includes at least one of a library configured with respect to the identifier of the anchor, a sequence of code instructions referencing the identifier, and a binary to be integrated with the application.

In still another embodiment, the lock includes a smart contract element that, when executed, transmits a payment to a creator of the application.

One embodiment includes a method for controlling access to content. The method provides, through a facilitating entity, an authorization for an accessing entity to access digital content through a non-fungible token (NFT). The method associates an expiration date with the authorization. The method selectively permits access to the content, by the accessing entity, through the token before the expiration date, wherein access is selectively permitted by associating the authorization with a digital wallet identifier corresponding to the accessing entity. The method detects that the expiration date has been reached. The method ceases the access to the content by the accessing entity.

In another embodiment, the selective permitting is based on a determination that the digital wallet identifier corresponds to a particular right.

In a further embodiment, the authorization allows the accessing entity the right to render the digital content in a digital interface.

In a still further embodiment, the authorization allows the accessing entity to render the digital content using a web browser.

In another further embodiment, the authorization allows the accessing entity to render the digital content in a user interface of a rendering entity.

In a further embodiment, rendering the digital content includes: performing a first confirmation that the accessing entity has unexpired authorization; and performing a second confirmation that a policy associated with the digital content indicates that the digital content may be compatible with the rendering entity.

In another embodiment, the facilitating entity provides authorization in response to at least one of: receiving a request for access from the accessing entity; and determining that a payment of a prespecified amount has been submitted by the accessing entity.

In a further embodiment, a determination that the payment has been made is performed by verifying data on a blockchain.

In another embodiment, the facilitating entity is associated with a unit selected from the group consisting of a wallet, a marketplace, a server, a cloud server, and a party running a web browser.

In another embodiment, the expiration date is a date that the digital content has been rendered a preset number of times.

One embodiment includes a method for safeguarding royalty payments for content associated with a transaction. The method detects that a digital wallet corresponding to an accessing entity has been used to access digital content through a token. The method confirms that the token corresponds to a recent transaction between the accessing entity and a facilitating entity, wherein the transaction includes at least one of a rental of the token and a sale of the token. The method determines, from a policy of the token, that the transaction requires the payment of a royalty. The method reviews a royalty record associated with the token to confirm that the royalty has not been paid. The method reports the non-payment of the royalty.

In a further embodiment, the method performs a security action to hinder access to the digital content.

In a further embodiment, the security action includes at least one of: reducing resolutions of the content available for rendering; disabling any future transfer of the token; blocking compliant services and methods associated with the token; blocking any rendering of the content; blocking the token from engaging in evolving; blocking the token from engaging in spawning; and blocking the token from engaging in peeling.

In another embodiment, the method determines that the facilitating entity and the accessing entity are associated with a common owner. The method reports that no royalty needs to be paid.

In another embodiment, confirming the token corresponds to a recent transaction includes at least one of: determining that selling the token and lending the token are prohibited; when the token represents a license for assets used on a licensed website, detecting that the assets are present on an unlicensed website; and accessing at least one public ownership record to determine that the token is associated with a public key that is different from a previous public key it was associated with.

In another embodiment, one or more public ownership records is a blockchain.

In yet another embodiment, the token is selected from the group consisting of a cryptocoin and an NFT.

In still another embodiment, confirming the token corresponds to a recent transaction is performed based on a triggering event includes at least one of: a predetermined point in time; a result of an inspection of the token and its policies; and a trigger provided by an oracle, wherein the oracle computes whether a function is verifiable.

In still another embodiment, the method reverses the security action once the royalty has been paid.

In yet another embodiment, the security action includes irrevocably destroying the token.

One embodiment includes a non-transitory computer-readable medium storing instructions that, when executed by a processor, are configured to cause the processor to perform operations for controlling access to content. The processor provides, through a facilitating entity, an authorization for an accessing entity to access digital content through a non-fungible token (NFT). The processor associates an expiration date with the authorization. The processor selectively permits access to the content, by the accessing entity, through the token before the expiration date, wherein access is selectively permitted by associating the authorization with a digital wallet identifier corresponding to the accessing entity. The processor detects that the expiration date has been reached. The processor ceases the access to the content by the accessing entity.

In another embodiment, the selective permitting is based on a determination that the digital wallet identifier corresponds to a particular right.

In a further embodiment, the authorization allows the accessing entity the right to render the digital content in a digital interface.

In a still further embodiment, the authorization allows the accessing entity to render the digital content using a web browser.

In another further embodiment, the authorization allows the accessing entity to render the digital content in a user interface of a rendering entity.

In a further embodiment, rendering the digital content includes: performing a first confirmation that the accessing entity has unexpired authorization; and performing a second confirmation that a policy associated with the digital content indicates that the digital content may be compatible with the rendering entity.

In another embodiment, the facilitating entity provides authorization in response to at least one of: receiving a request for access from the accessing entity; and determining that a payment of a prespecified amount has been submitted by the accessing entity.

In a further embodiment, a determination that the payment has been made is performed by verifying data on a blockchain.

In another embodiment, the facilitating entity is associated with a unit selected from the group consisting of a wallet, a marketplace, a server, a cloud server, and a party running a web browser.

In another embodiment, the expiration date is a date that the digital content has been rendered a preset number of times.

One embodiment includes a processor for safeguarding royalty payments for content associated with a transaction. The processor detects that a digital wallet corresponding to an accessing entity has been used to access digital content through a token. The processor confirms that the token corresponds to a recent transaction between the accessing entity and a facilitating entity, wherein the transaction includes at least one of a rental of the token and a sale of the token. The processor determines, from a policy of the token, that the transaction requires the payment of a royalty. The processor reviews a royalty record associated with the token to confirm that the royalty has not been paid. The processor reports the non-payment of the royalty.

In a further embodiment, the processor performs a security action to hinder access to the digital content.

In a further embodiment, the security action includes at least one of: reducing resolutions of the content available for rendering; disabling any future transfer of the token; blocking compliant services and processors associated with the token; blocking any rendering of the content; blocking the token from engaging in evolving; blocking the token from engaging in spawning; and blocking the token from engaging in peeling.

In another embodiment, the processor determines that the facilitating entity and the accessing entity are associated with a common owner. The processor reports that no royalty needs to be paid.

In another embodiment, confirming the token corresponds to a recent transaction includes at least one of: determining that selling the token and lending the token are prohibited; when the token represents a license for assets used on a licensed website, detecting that the assets are present on an unlicensed website; and accessing at least one public ownership record to determine that the token is associated with a public key that is different from a previous public key it was associated with.

In another embodiment, one or more public ownership records is a blockchain.

In yet another embodiment, the token is selected from the group consisting of a cryptocoin and an NFT.

In still another embodiment, confirming the token corresponds to a recent transaction is performed based on a triggering event includes at least one of: a predetermined point in time; a result of an inspection of the token and its policies; and a trigger provided by an oracle, wherein the oracle computes whether a function is verifiable.

In still another embodiment, the processor reverses the security action once the royalty has been paid.

In yet another embodiment, the security action includes irrevocably destroying the token.

One embodiment includes a machine-readable medium containing bytecode stored within an immutable ledger, where the bytecode encodes a royalty-directed token. The token includes one or more policies, wherein at least one policy is a royalty policy includes a rule specifying a future ownership of the token. The token includes a content element. The token includes an executable element to initiate a transfer of funds to an account corresponding to a public key of an entity, wherein the executable element executes in response to detection of a qualifying event.

In a further embodiment, the qualifying event includes at least one of: transferring ownership of the token; creating a derived NFT from the token; and rendering the content element.

One embodiment includes a method for conditionally establishing a royalty policy. The method receives an original NFT includes a reference to a content element. The method locates, in an ownership record on a blockchain, a public key of an entity associated with the original NFT. The method associates a smart contract with the original NFT, wherein the smart contract includes: a royalty policy includes a rule facilitating access rights to the original NFT; and an executable element to initiate a transfer of funds to an account corresponding to the public key. The method executes the executable element in response to detection of a qualifying event.

In a further embodiment, the qualifying event includes at least one of transferring ownership of the original NFT; creating a derived NFT from the original NFT; and rendering the content element.

In another embodiment, the association with the public key and the smart contract is performed by adding a record on the blockchain.

In another embodiment, the method generates a derived NFT from the original NFT, wherein the derived NFT includes: a derived reference to the content element; and a modified royalty policy. The method destroys the reference, in the original NFT, to the content element.

In another embodiment, a royalty policy of an NFT discloses a predetermined amount for the transfer of funds.

In another embodiment, the association with the public key and the smart contract is performed by adding a record on the blockchain.

In still another embodiment, the original NFT is a derived NFT.

In yet another embodiment, the entity is associated with a unit selected from the group consisting of a wallet, a marketplace, a server, a cloud server, and a party running a web browser.

One embodiment includes a non-transitory computer-readable medium storing instructions that, when executed by a processor, are configured to cause the processor to perform operations for establishing a royalty policy. The processor receives an original NFT includes a reference to a content element. The processor locates, in an ownership record on a blockchain, a public key of an entity associated with the original NFT. The processor associates a smart contract with the original NFT, wherein the smart contract includes: a royalty policy includes a rule facilitating access rights to the original NFT; and an executable element to initiate a transfer of funds to an account corresponding to the public key. The processor executes the executable element in response to detection of a qualifying event.

In a further embodiment, the qualifying event includes at least one of transferring ownership of the original NFT; creating a derived NFT from the original NFT; and rendering the content element.

In another embodiment, the association with the public key and the smart contract is performed by adding a record on the blockchain.

In another embodiment, the processor generates a derived NFT from the original NFT, wherein the derived NFT includes: a derived reference to the content element; and a modified royalty policy. The processor destroys the reference, in the original NFT, to the content element.

In another embodiment, a royalty policy of an NFT discloses a predetermined amount for the transfer of funds.

In another embodiment, the association with the public key and the smart contract is performed by adding a record on the blockchain.

In still another embodiment, the original NFT is a derived NFT.

In yet another embodiment, the entity is associated with a unit selected from the group consisting of a wallet, a marketplace, a server, a cloud server, and a party running a web browser.

One embodiment includes a method to facilitate detection of Ponzi structures. The method receives a hierarchy including a plurality of related tokens, wherein related tokens are tokens that are derived from the same original token; wherein the hierarchy includes two or more levels; and wherein a level refers to how far removed a token of the plurality of the related token is from the original token. The method derives a limitation score from the hierarchy; wherein the limitation score reflects a frequency of limitations within the hierarchy; and wherein limitations relate to barriers to generating further derived tokens from the plurality of related tokens. The method derives a pay flow score from the hierarchy; wherein the pay flow score reflects the frequency that token-based income flows towards owners of tokens at levels closer to the original token. The method determines a Ponzi score from the limitation score, the pay flow score, and the number of levels in the hierarchy; wherein the Ponzi score reflects a likelihood that the hierarchy is a Ponzi structure. When the Ponzi score exceeds a threshold, the method performs a remedial security action.

In another embodiment, limitations include: absolute barriers, wherein absolute barriers concern non-conditional barriers to generating derived tokens; price-based limitations, wherein price-based limitations concern substantial disparities in fees paid when generating derived tokens; and policy-based limitations, wherein policy-based limitations concern policies that conditionally influence a decision to generate derived tokens.

In another embodiment, a score is at least one of a binary value and an estimate of probability.

In still another embodiment, the security action includes initiating an alert associated with the hierarchy.

In a further embodiment, the alert is made to one or more of a digital wallet, an administrator, a financial institution, a prospective buyer of a token in the hierarchy, and a present owner of a token in the hierarchy.

In another embodiment, at least one of the plurality of related tokens includes an NFT.

In another embodiment, the security action includes at least one of adding one or more tokens associated with the hierarchy to a blocklist, generating a log entry summarizing the determinations, and preventing creation of new derived tokens from the hierarchy.

One embodiment includes a non-transitory computer-readable medium storing instructions that, when executed by a processor, are configured to cause the processor to perform operations for detecting Ponzi structures. The processor receives a hierarchy including a plurality of related tokens, wherein related tokens are tokens that are derived from the same original token; wherein the hierarchy includes two or more levels; and wherein a level refers to how far removed a token of the plurality of the related token is from the original token. The processor derives a limitation score from the hierarchy; wherein the limitation score reflects a frequency of limitations within the hierarchy; and wherein limitations relate to barriers to generating further derived tokens from the plurality of related tokens. The processor derives a pay flow score from the hierarchy; wherein the pay flow score reflects the frequency that token-based income flows towards owners of tokens at levels closer to the original token. The processor determines a Ponzi score from the limitation score, the pay flow score, and the number of levels in the hierarchy; wherein the Ponzi score reflects a likelihood that the hierarchy is a Ponzi structure. When the Ponzi score exceeds a threshold, the processor performs a remedial security action.

In another embodiment, limitations include: absolute barriers, wherein absolute barriers concern non-conditional barriers to generating derived tokens; price-based limitations, wherein price-based limitations concern substantial disparities in fees paid when generating derived tokens; and policy-based limitations, wherein policy-based limitations concern policies that conditionally influence a decision to generate derived tokens.

In another embodiment, a score is at least one of a binary value and an estimate of probability.

In still another embodiment, the security action includes initiating an alert associated with the hierarchy.

In a further embodiment, the alert is made to one or more of a digital wallet, an administrator, a financial institution, a prospective buyer of a token in the hierarchy, and a present owner of a token in the hierarchy.

In another embodiment, at least one of the plurality of related tokens includes an NFT.

In another embodiment, the security action includes at least one of adding one or more tokens associated with the hierarchy to a blocklist, generating a log entry summarizing the determinations, and preventing creation of new derived tokens from the hierarchy.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 4 is a conceptual diagram of a permissionless blockchain in accordance with an embodiment of the invention.

FIG. 22 illustrates a system for facilitating the modification of a royalty policy, in accordance with several embodiments of the invention.

DETAILED DESCRIPTION

Figure 1:
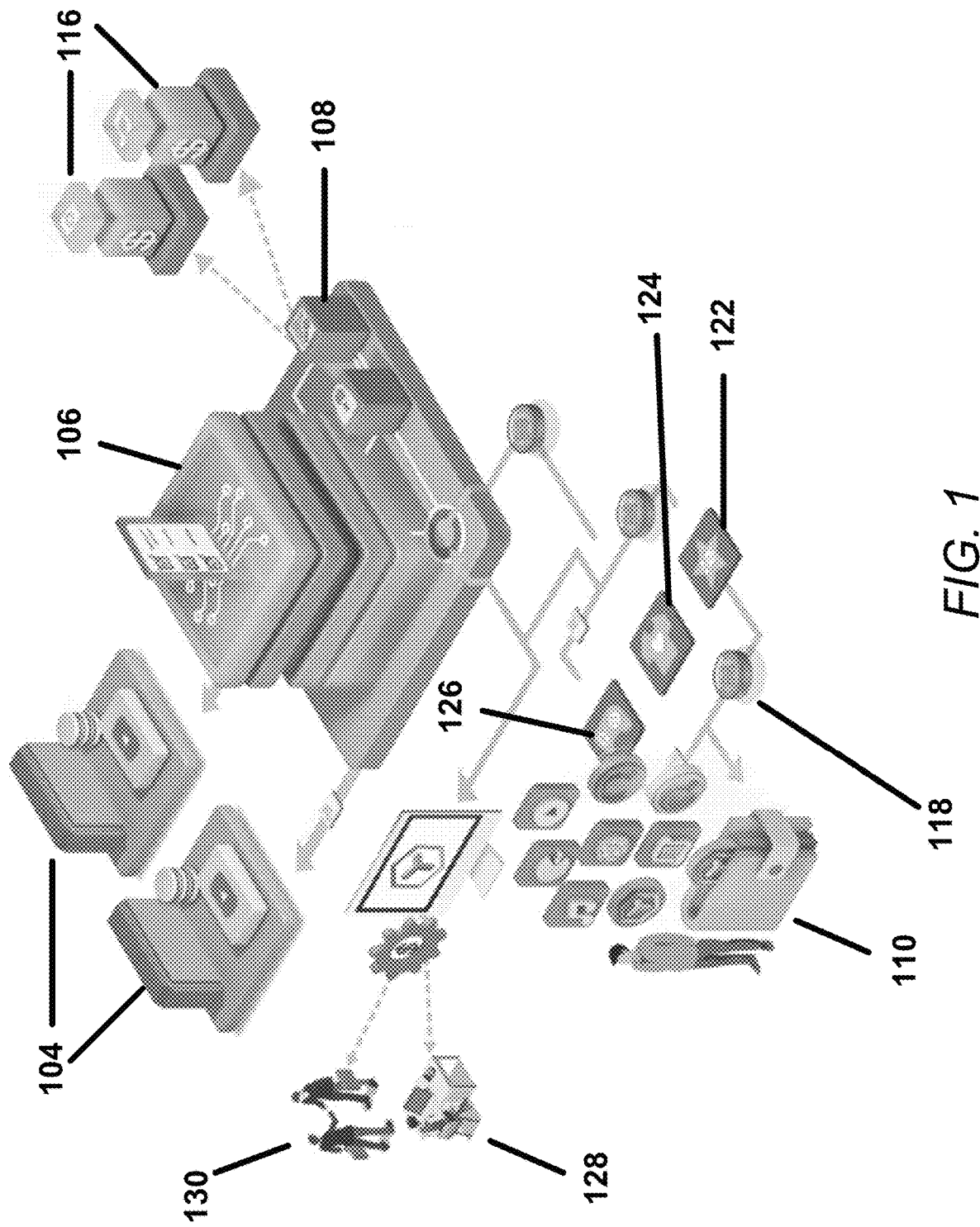
FIG. 1 is a conceptual diagram of an NFT platform in accordance with an embodiment of the invention.

Systems and methods for incorporating transaction-directed functionalities into non-fungible token (NFT) platforms, in accordance with many embodiments of the invention, are described herein. Transaction-directed functionality may include, but is not limited to configurations enabling the payment of royalties, access to token containers, establishment of token hierarchies for derived and/or spawned tokens, and protections against fraudulent token-based activity.

NFT platforms in accordance with a number of embodiments of the invention may implement various marketplace intermediaries to enable users to conduct token transactions. Such transactions may enable users to engage in the sale, rental, and/or loaning of tokens. Systems and methods in accordance with various embodiments may include the use of token anchors to tie tokens to particular applications, enabling users to access tokens over various applications. Additional techniques may enable users to lock and unlock token storage containers to enable third parties to access tokens.

Systems in accordance with certain embodiments of the invention may utilize royalty configurations to enable payment to content creators for token-directed activity. In response to actions including but not limited to spawning derivative NFTs, selling NFTs, and leasing NFTs, methods in accordance with some embodiments may allow content creators to automatically receive corresponding royalties. To operate as abuse safeguards, systems may interpret certain triggering actions to determine when royalty payments may be necessary.

Methods and techniques in accordance with many embodiments may incorporate analysis methods to confirm that token "family" hierarchies are not indicative of fraudulent activities. System mechanisms may review token policies and recent activity to determine whether Ponzi structures are being implemented. In accordance with a number of embodiments, systems may take various security actions in response to activity including but not limited to, fraudulent activity, attempts to access tokens without paying royalties, and non-compatible token use.

While various token and wallet configurations are discussed above, transaction-based functionalities that can be utilized within NFT platforms in accordance with various embodiments of the invention are discussed further below.
Non-Fungible Token (NFT) Platforms Turning now to the drawings, systems and methods for implementing blockchain-based Non-Fungible Token (NFT) platforms in accordance with various embodiments of the invention are illustrated. In accordance with several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In accordance with many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In accordance with many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In accordance with many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In accordance with several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In accordance with several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In accordance with many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In accordance with many embodiments, the verified users can be content creators that are vetted by an administrator of networks that may be responsible for deploying and maintaining the NFT blockchain. Once the NFTs are minted, users can obtain and conduct transactions with the NFTs. In accordance with several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In accordance with many embodiments, the fungible tokens can be fully converted into fiat currency and/or other cryptocurrency. In accordance with several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In accordance with several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In accordance with many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users 128. In addition, content creators can directly issue NFTs to the media wallets of specific users (e.g. by way of push download or AirDrop). In accordance with many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the users. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When users wish to purchase NFTs using fungible tokens, media wallet applications can request authentication of the NFTs directly based upon the public key of the content creators and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In accordance with several embodiments, the public blockchain is decentralized and universally accessible. Additionally, in a number of embodiments, private/permissioned blockchains are closed systems that are limited to publicly inaccessible transactions. In accordance with many embodiments, the permissioned blockchain can be in the form of distributed ledgers, while the blockchain may alternatively be centralized in a single entity.

Figure 2:
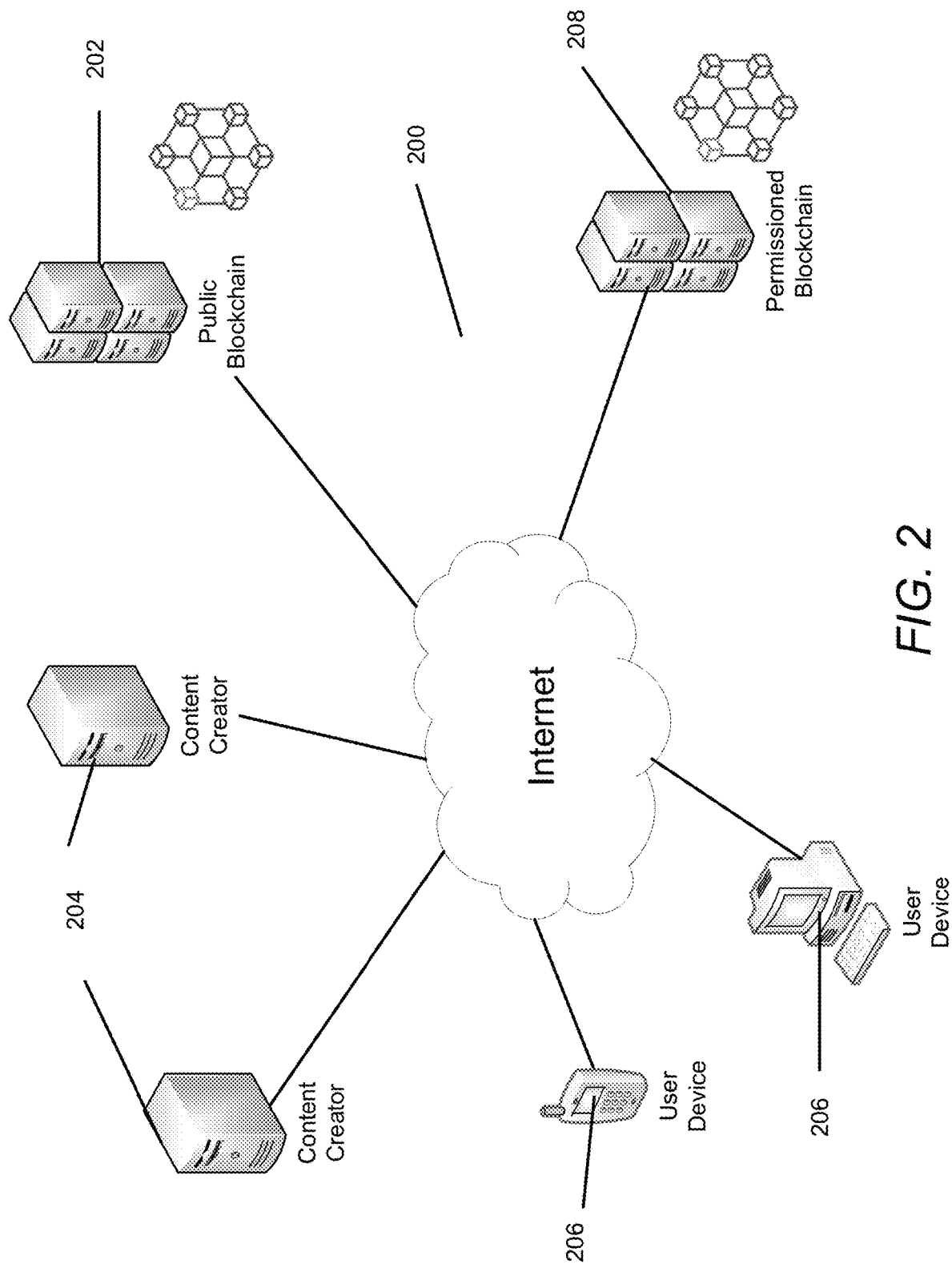
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with users based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In accordance with many embodiments, media wallets are smart device enabled, front-end applications for fans and/or consumers, central to all user activity on NFT platforms. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In accordance with many embodiments, NFT transaction data entries in the permissioned blockchain 208 are encrypted using users' public keys so that the NFT transaction data can be accessed by the media wallet application. In this way, users control access to entries in the permissioned blockchain 208 describing the users' NFT transactions. In accordance with several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In accordance with several embodiments, the permissioned blockchain 208 supports access control lists and users can utilize a media wallet application to modify permissions granted by way of the access control list. In accordance with many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In accordance with many embodiments, storage nodes within the permissioned blockchain 208 do not provide content creators with access to entire NFT transaction histories. Instead, the storage nodes simply provide access to encrypted records. In accordance with several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In accordance with several embodiments, the access to the data is determined by computer systems that implement permission-based data access services.

In accordance with many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In accordance with some embodiments, any of a variety of consensus mechanisms may be used by public blockchains, including (but not limited to) Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
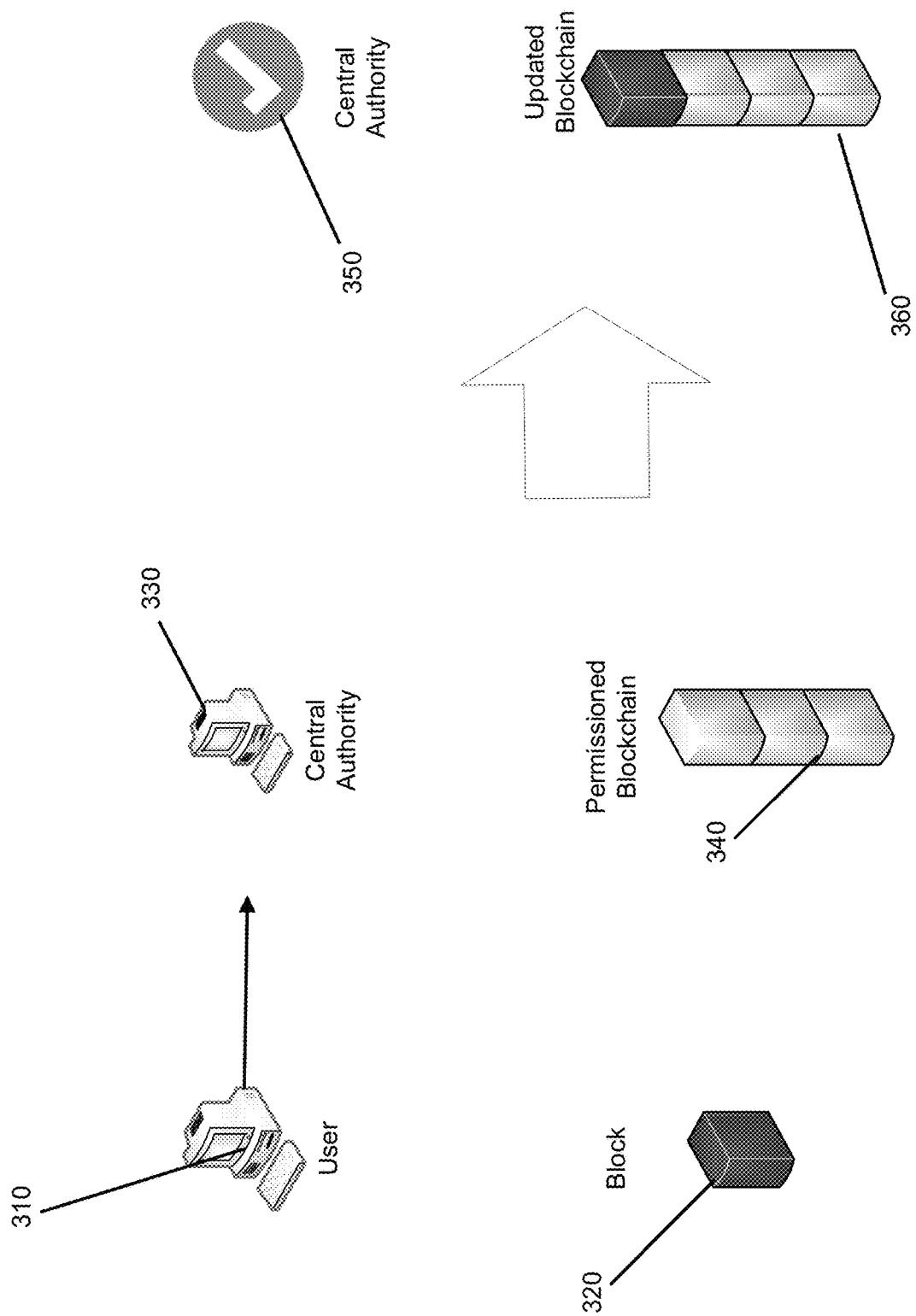
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In accordance with several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these modes. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In accordance with many decentralized blockchains, many blockchain network devices 430, in the decentralized system may have copies of the blockchain, allowing the ability to validate transactions. In accordance with many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the modes to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In accordance with many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In accordance with some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
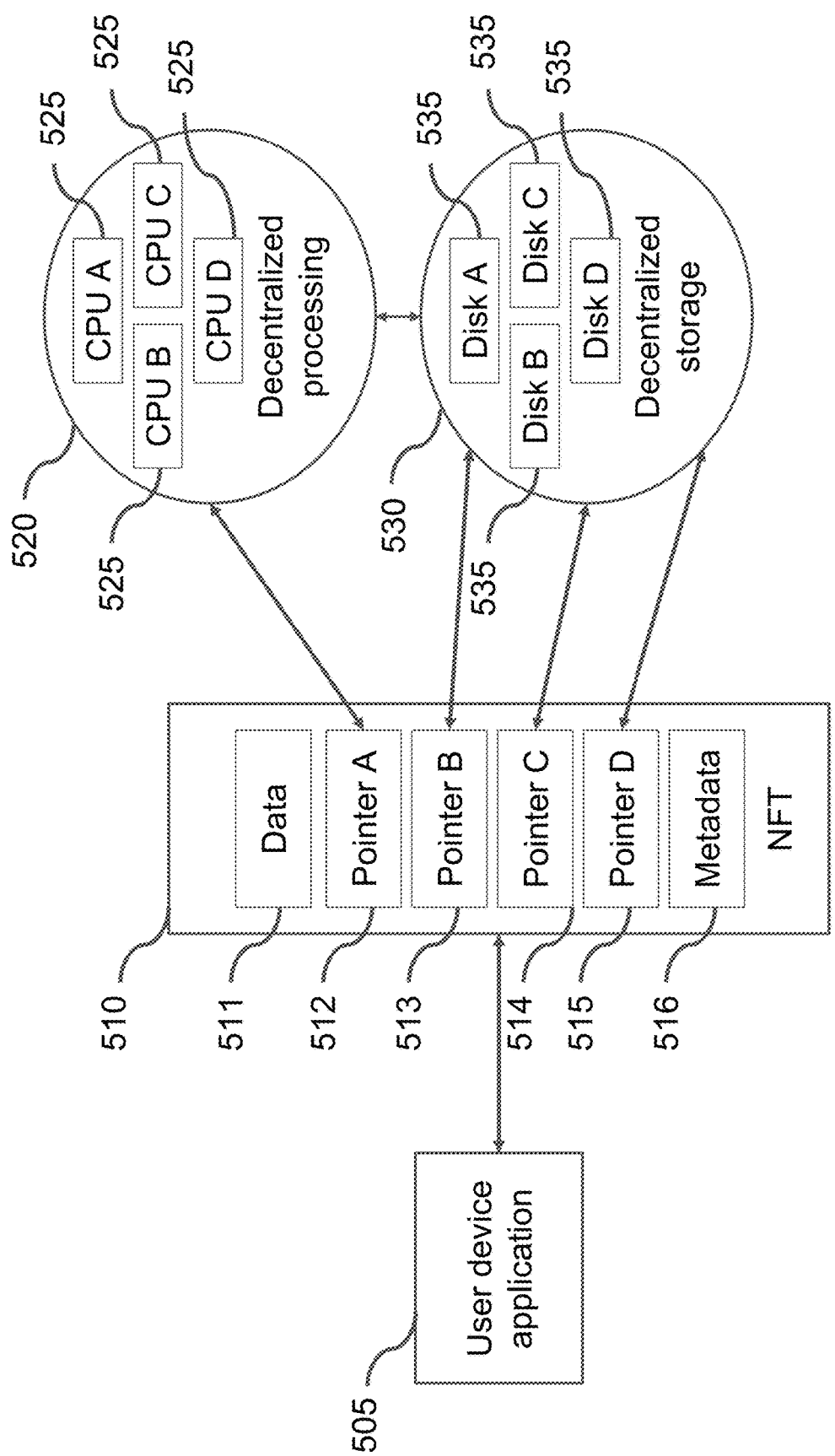
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In accordance with some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE) depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
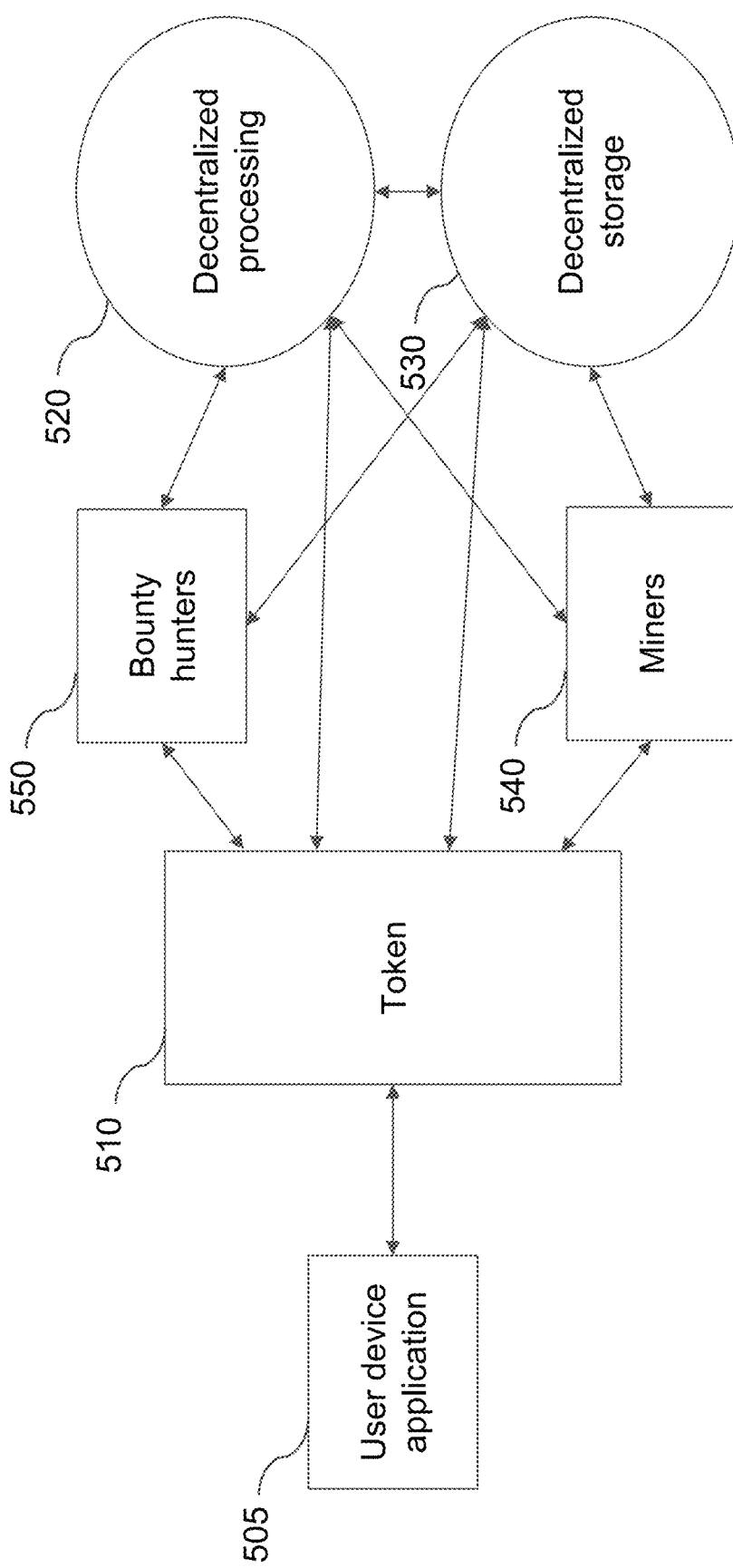

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In accordance with some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platform Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a mode of demonstrating non-trivial allocations of processing power. Proof of Space (PoS) mechanisms may be used as a mode of demonstrating non-trivial allocations of memory or disk space. As a third possible approach, Proof of Stake mechanisms may be used as a mode of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In accordance with several embodiments the network optimization challenge may be selected from any of a number of different challenges appropriate to the requirements of specific applications including graph pebbling. In accordance with some embodiments, graph pebbling may refer to a resource allocation game played on discrete mathematics graphs, ending with a labeled graph disclosing how a player might get at least one pebble to every vertex of the graph.

Figure 6:
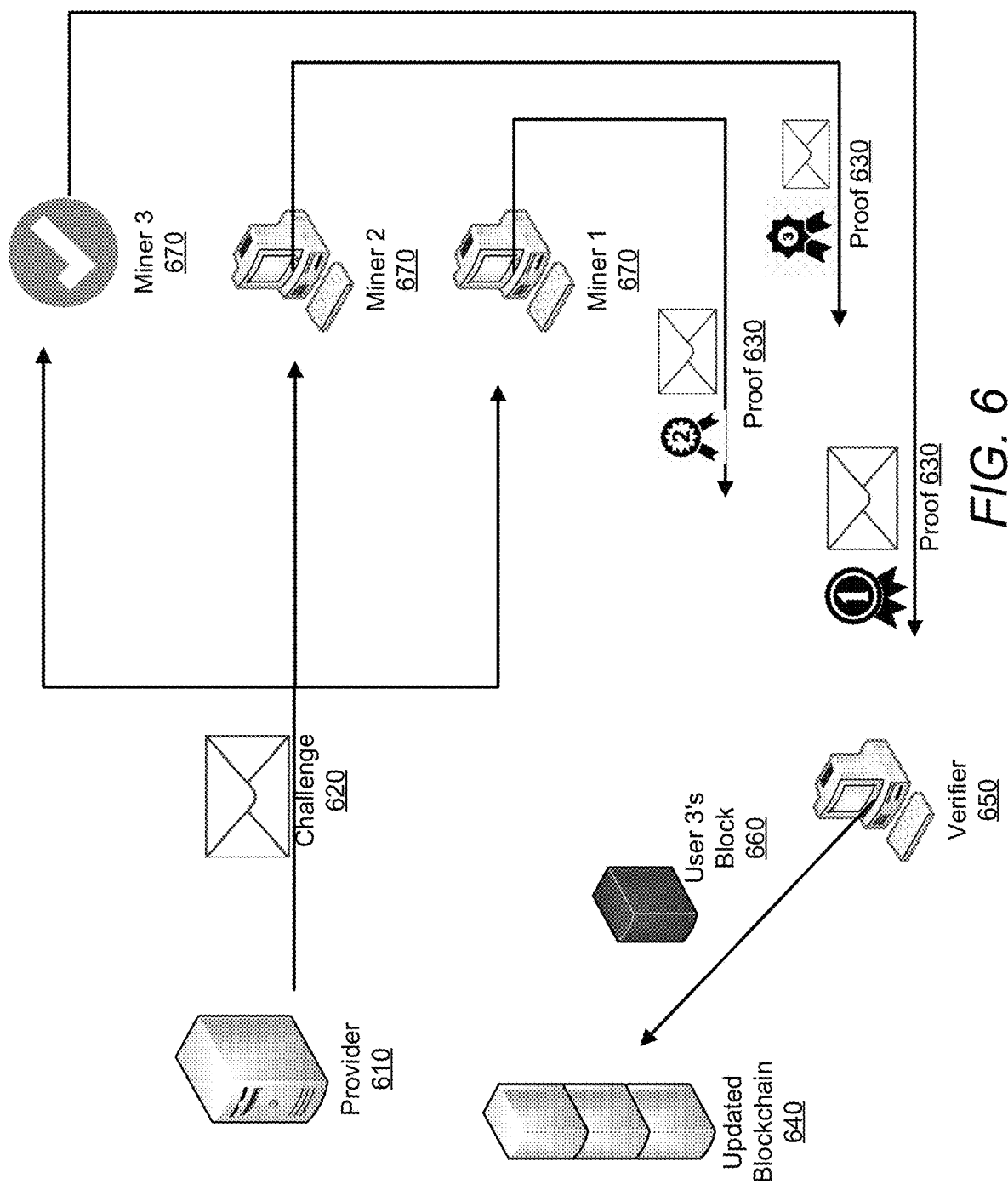
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
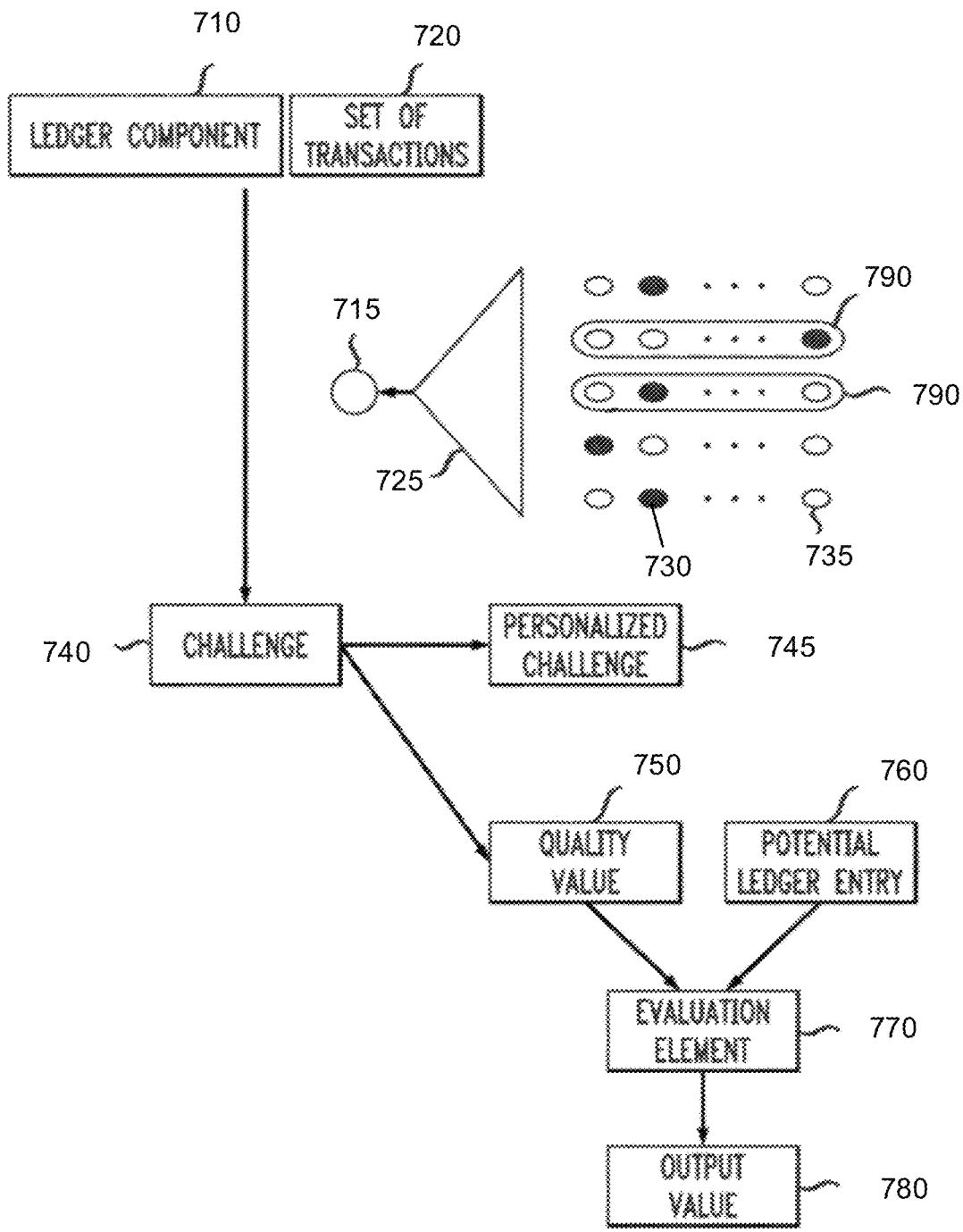
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In accordance with some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In accordance with several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In accordance with some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In accordance with some embodiments, non-proportional relationships may be created by modifying the function used to compute the quality value 750. When the evaluation 770 results in success, then the output value 780 may be used to confirm the suitability of the memory configuration and validate the corresponding transaction.

In accordance with many embodiments, nodes 730 and 735 can also correspond to public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In accordance with many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, In accordance with many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In accordance with many embodiments, the hybrid mechanism may incorporate a first and a second consensus mechanism. In accordance with several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
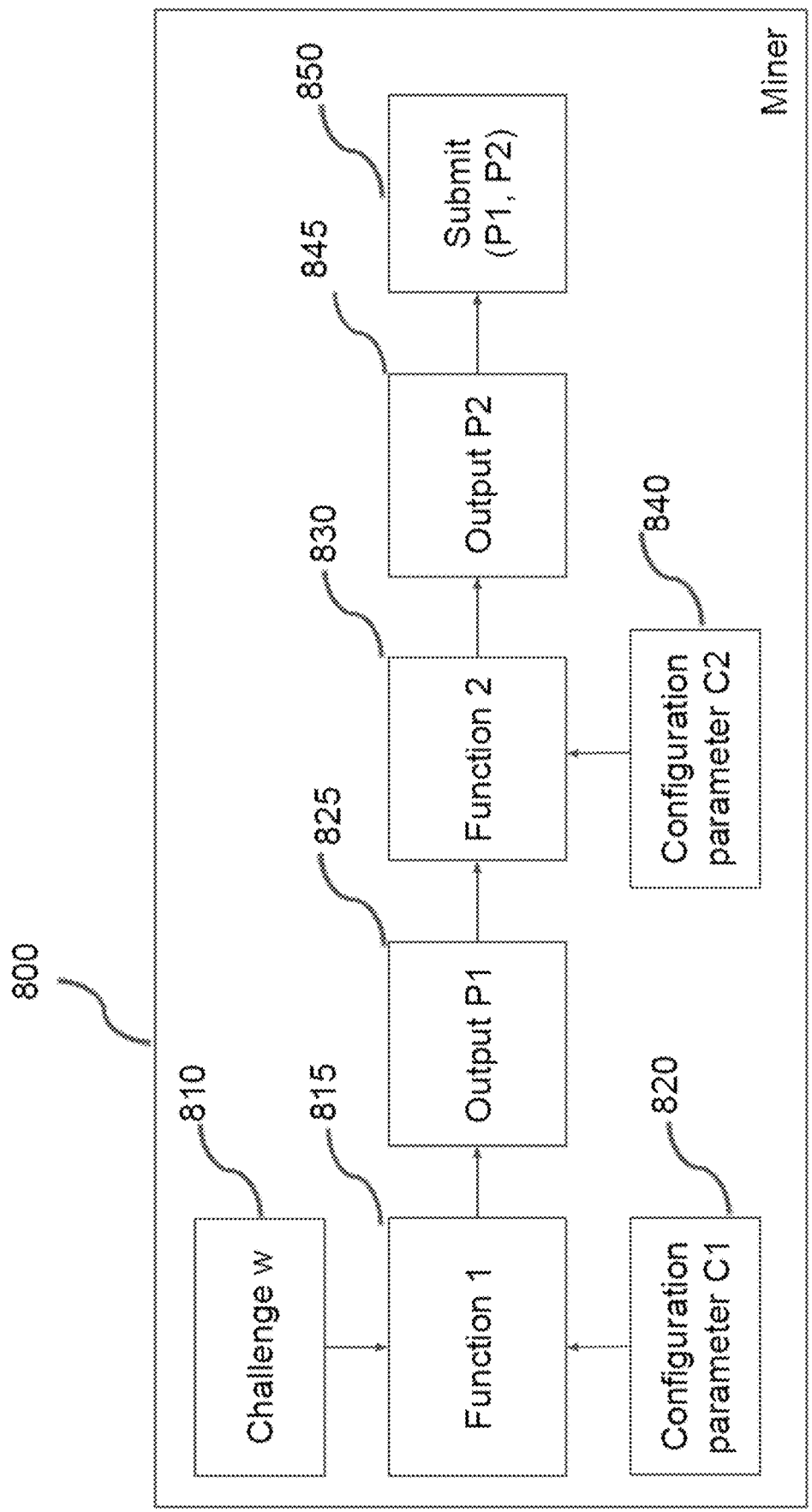
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In accordance with some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone™ or Intel SGX™ may provide assurances exist of integrity by virtue of incorporating private/isolated processing environments.

Figure 9:
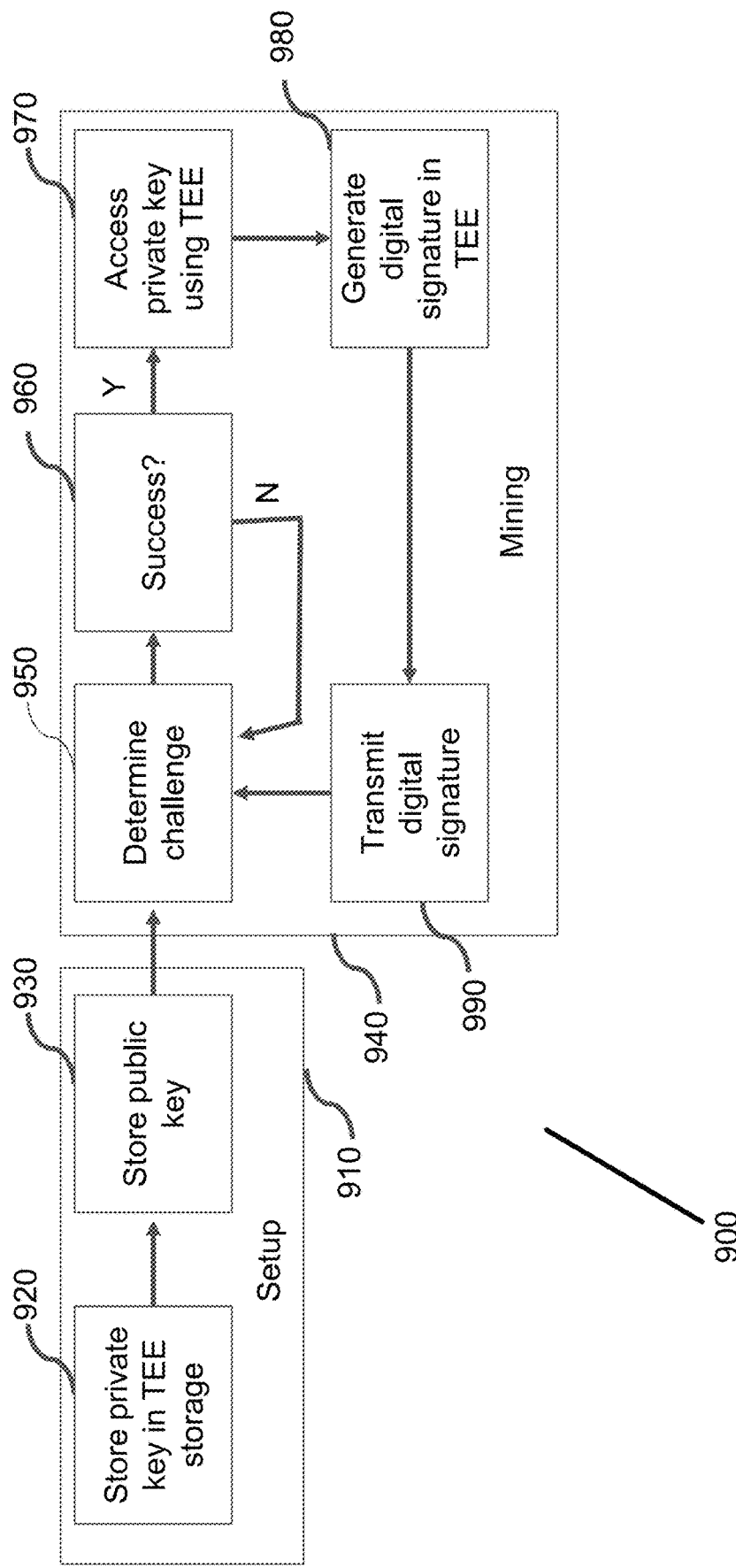
FIG. 9 illustrates a process followed by a Trusted Execution Environment-based consensus mechanism in accordance with some embodiments of the invention.

An illustration of sample process 900 undergone by TEE-based consensus mechanisms in accordance with some embodiments of the invention is depicted in FIG. 9. In accordance with some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In accordance with many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In accordance with some embodiments of the invention, the determination of success may result from some pre-set portion of the challenge matching a pre-set portion of the public key, e.g. the last 20 bits of the two values matching. In accordance with several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge.

In this context, process 900 can determine (950) a new challenge after the ledger contents have been updated and/or a time-based observation is performed. In accordance with several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In accordance with several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platform Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
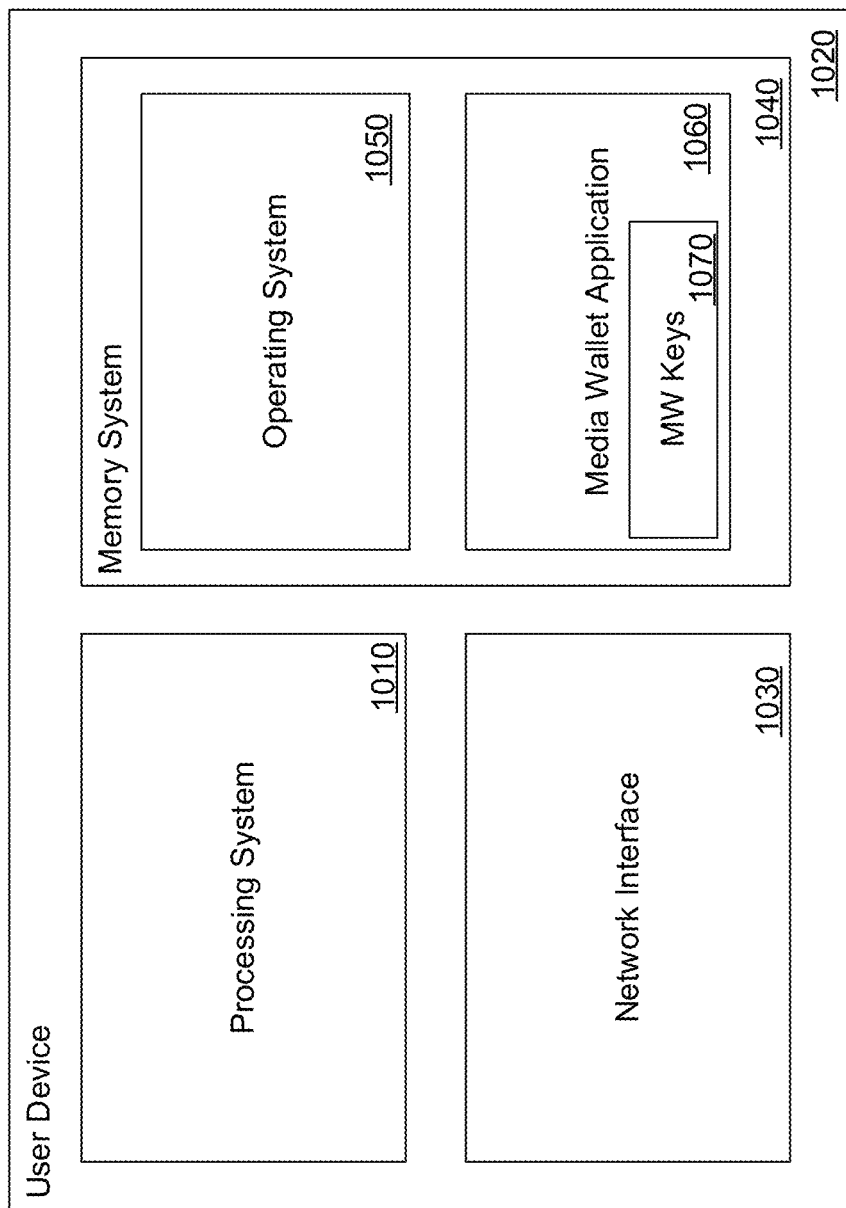
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In accordance with many embodiments, the media wallet application enables the user device to obtain and conduct transactions with respect to NFTs by communicating with an NFT blockchain via the network interface 1030. In accordance with some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
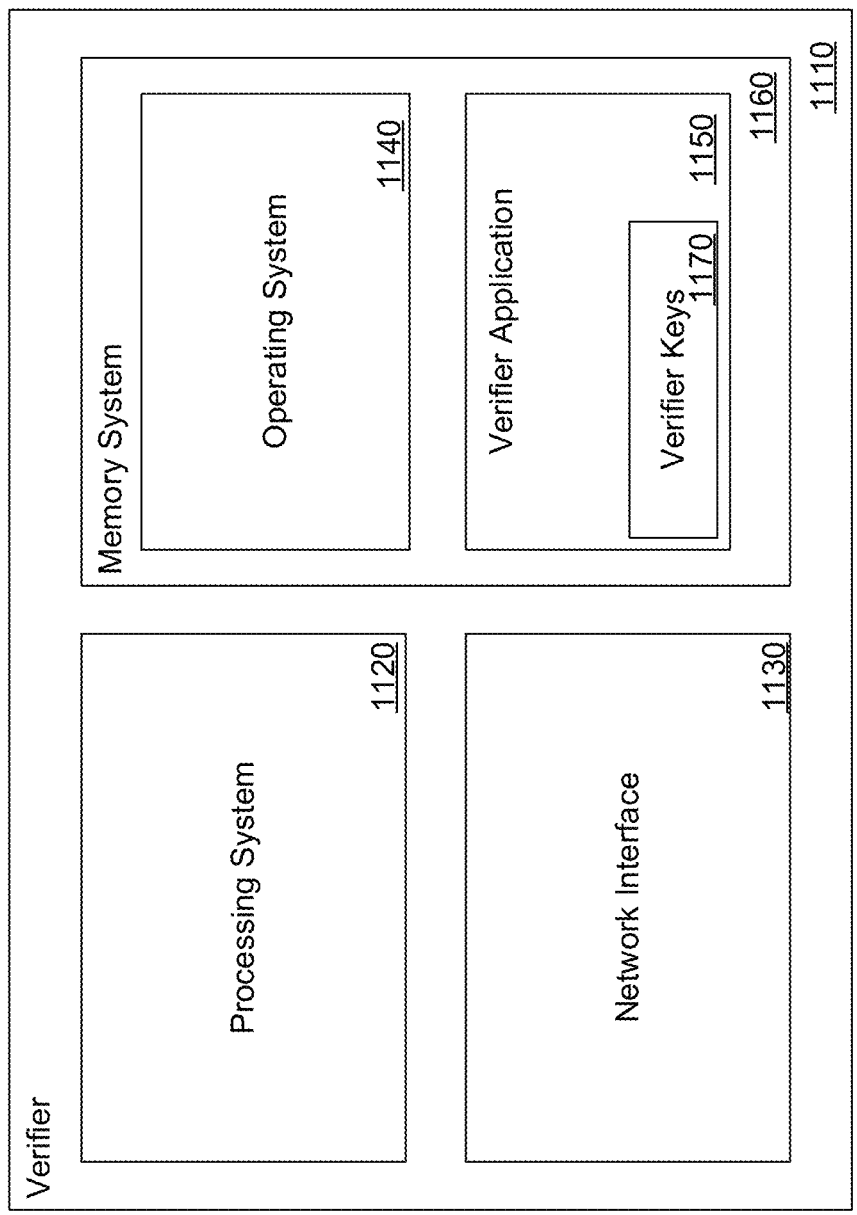

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
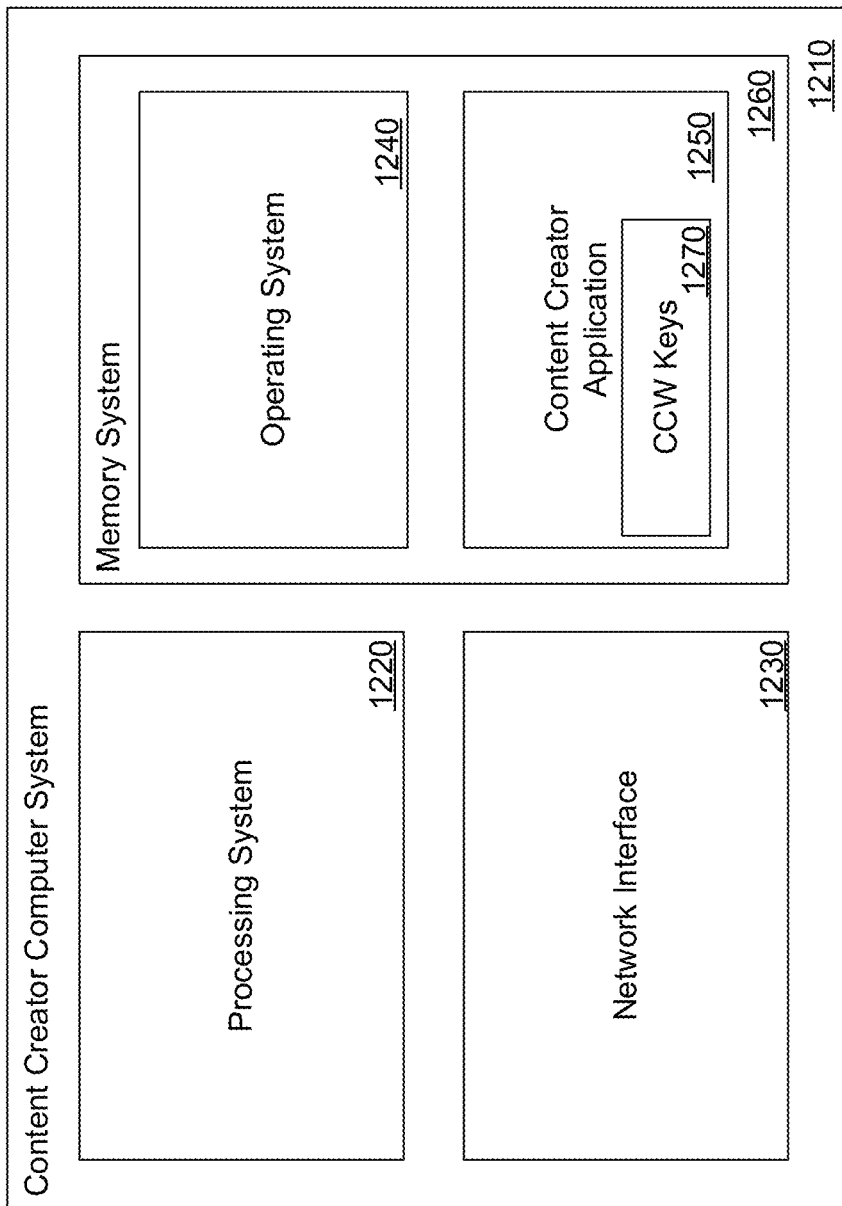

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In accordance with several embodiments, the digital wallet may securely store rich media NFTs and/or other tokens. Additionally, In accordance with some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
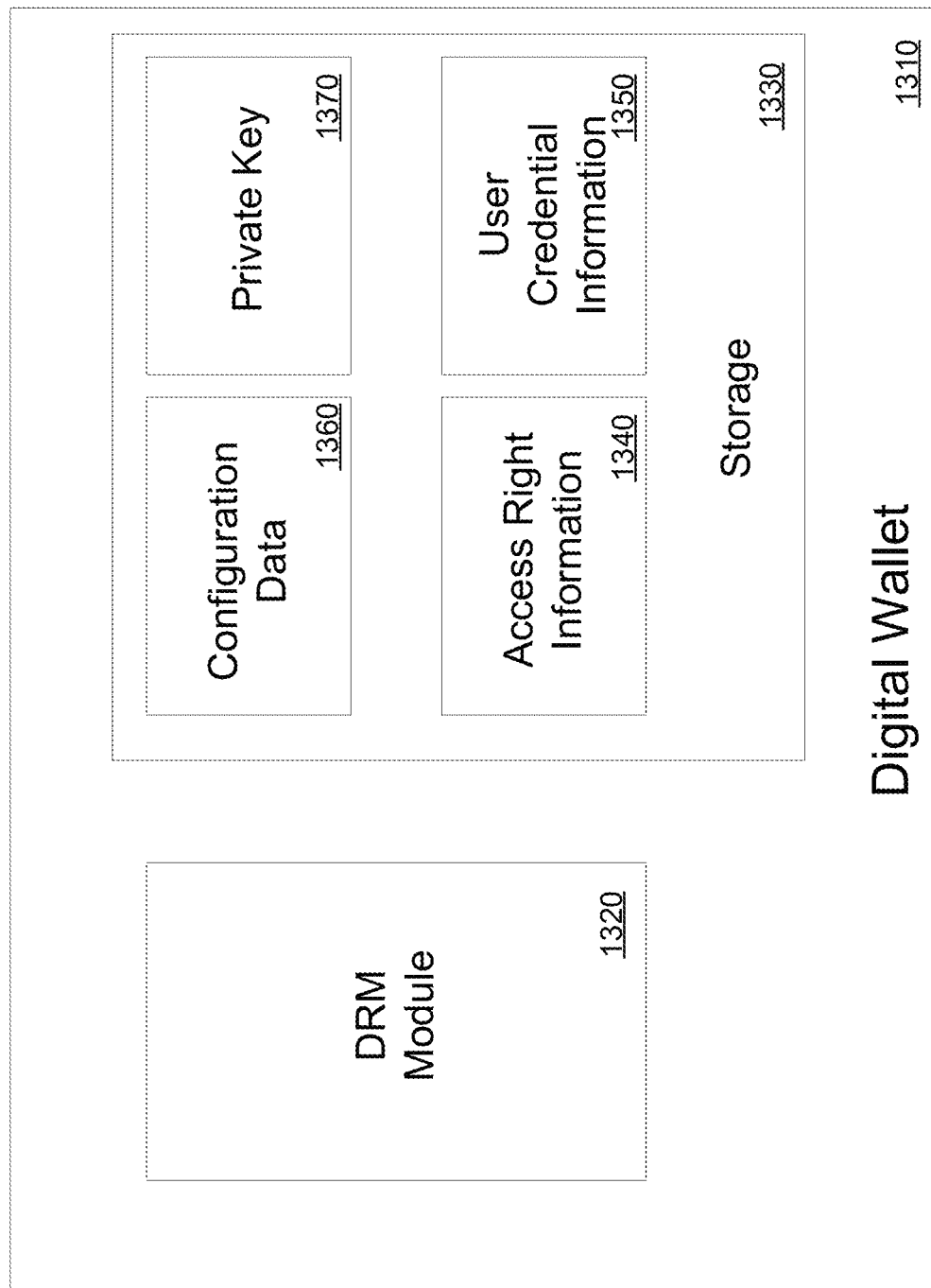
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including (but not limited to) decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 In accordance with some embodiments may also use one or more keys to communicate with a DRM server. In accordance with several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
FIGS. 14A-14C depicts user interfaces of various media wallet applications in accordance with a number of embodiments of the invention.
Figure 14A:
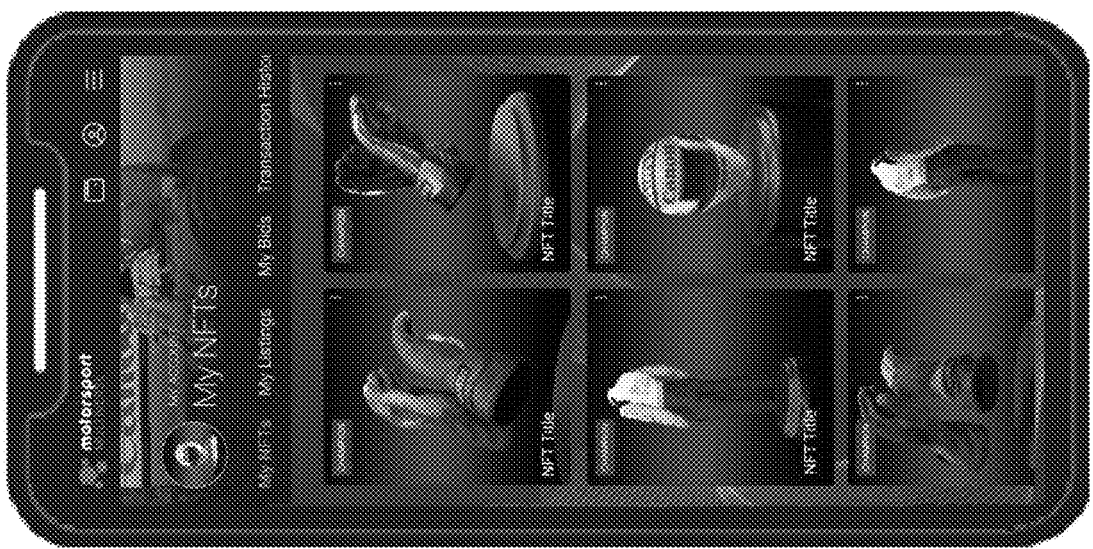
Figure 14C:

Operation of media wallet applications implemented in accordance with some embodiments of the invention is conceptually illustrated by way of the user interfaces shown in FIGS. 14A-14C. In accordance with many embodiments, media wallet applications can refer to applications that are installed upon user devices such as (but not limited to) mobile phones and tablet computers running the iOS, Android and/or similar operating systems. Launching media wallet applications can provide a number of user interface contexts. In accordance with many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In accordance with several embodiments, a first user interface context is a dashboard (see, FIGS. 14A, 14C) that can include a gallery view of NFTs owned by the user. In accordance with several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs. This classification may be performed using a visual user interface. Users interface may enable users to create a visual partition of a space. In accordance with some embodiments of the invention, a visual partition may in turn be partitioned into sub-partitions. In accordance with some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In accordance with some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In accordance with some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In accordance with some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In accordance with some embodiments, the first social NFT may then be associated with some rights and capabilities, which may be expressed in other NFTs. Additional rights and capabilities may also be directly encoded in a policy of the social security number NFT.

Figure 15:
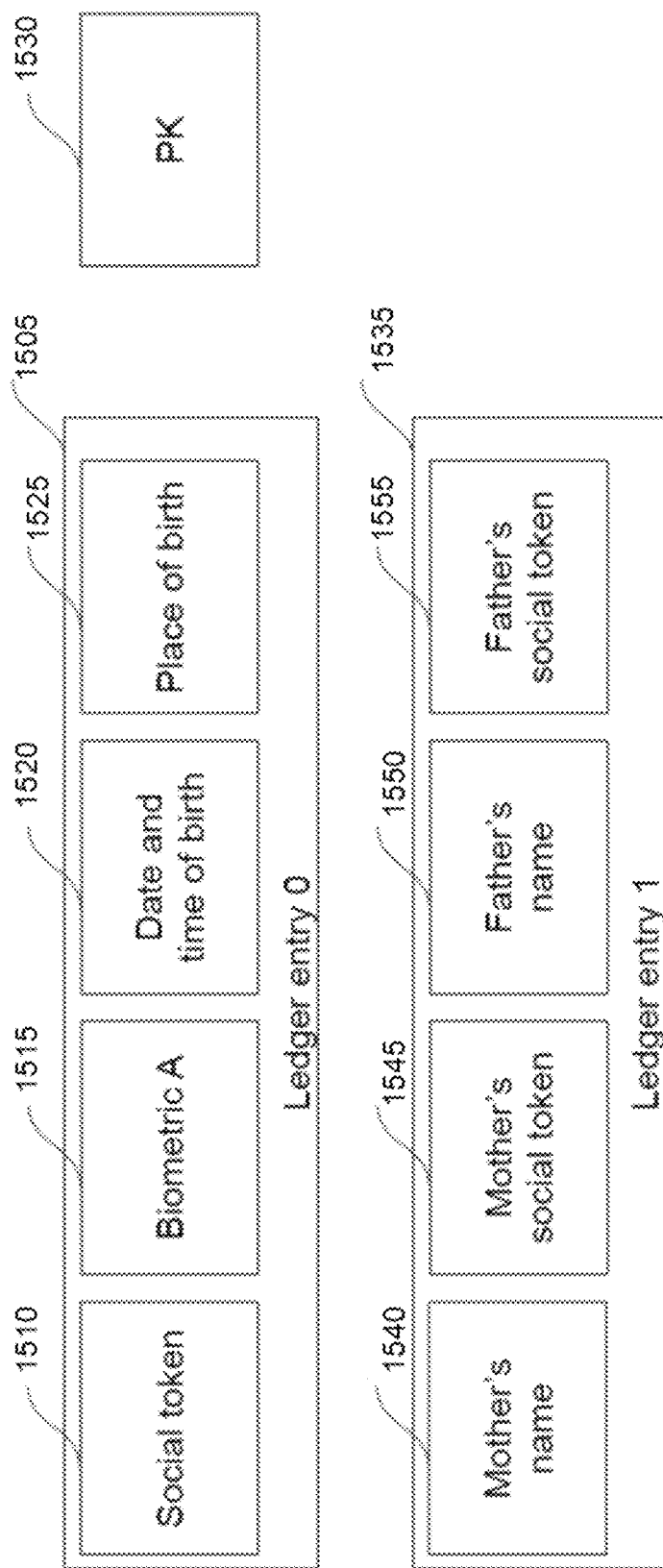
FIG. 15 illustrates an NFT ledger entry corresponding to an NFT identifier in accordance with several embodiments of the invention.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including (but not limited to) mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In accordance with some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In accordance with many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements can be generated one from the other. In accordance with some embodiments, an agreement in a machine-readable form may include, but is not limited to, a policy and/or an executable script. In accordance with some embodiments, an agreement in a human-readable form may include, but is not limited to, a text and/or voice-based statement of the promise.

In accordance with some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In accordance with some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In accordance with some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In accordance with some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In accordance with some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In accordance with some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. Anchored NFT may tie to another NFT, which may make it both anchored and relative. An example of such may be called pseudonym NFTs.

Pseudonym NFTs may be a kind of relative NFT acting as a pseudonym identifier associated with a given social NFT. In accordance with some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including (but not limited to) what portions of a building employees may access, and what computer system employees may utilize. In accordance with several embodiments, employee NFTs may incorporate their owner's biometrics, such as a face image. In a number of embodiments, employee NFTs may operate as a form of promise NFT. In accordance with some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In accordance with some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including (but not limited to), licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including (but not limited to) traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In accordance with some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g. script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
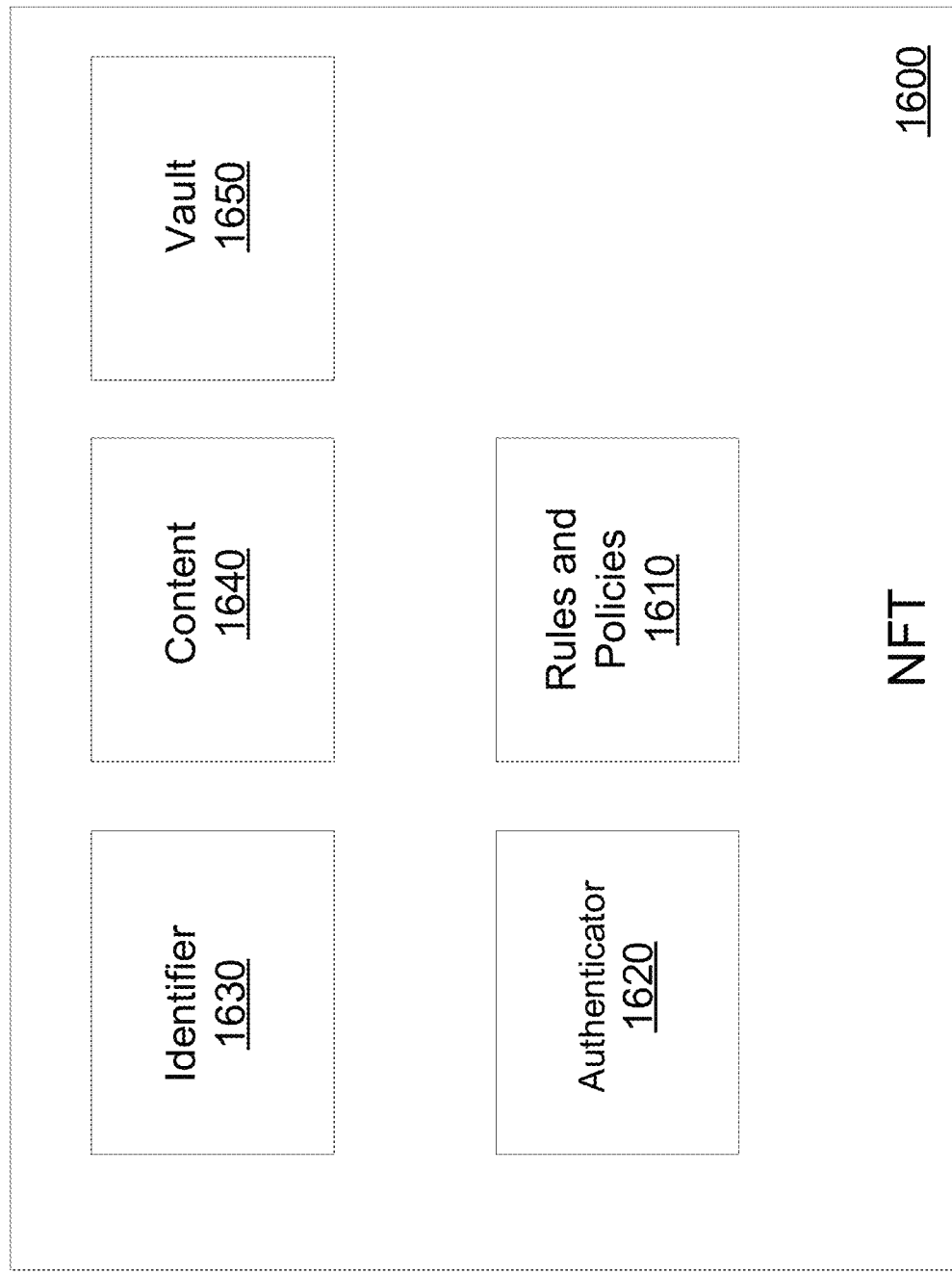
FIGS. 16A-16B illustrate an NFT arrangement relationship with corresponding physical content in accordance with some embodiments of the invention.
Figure 16B:
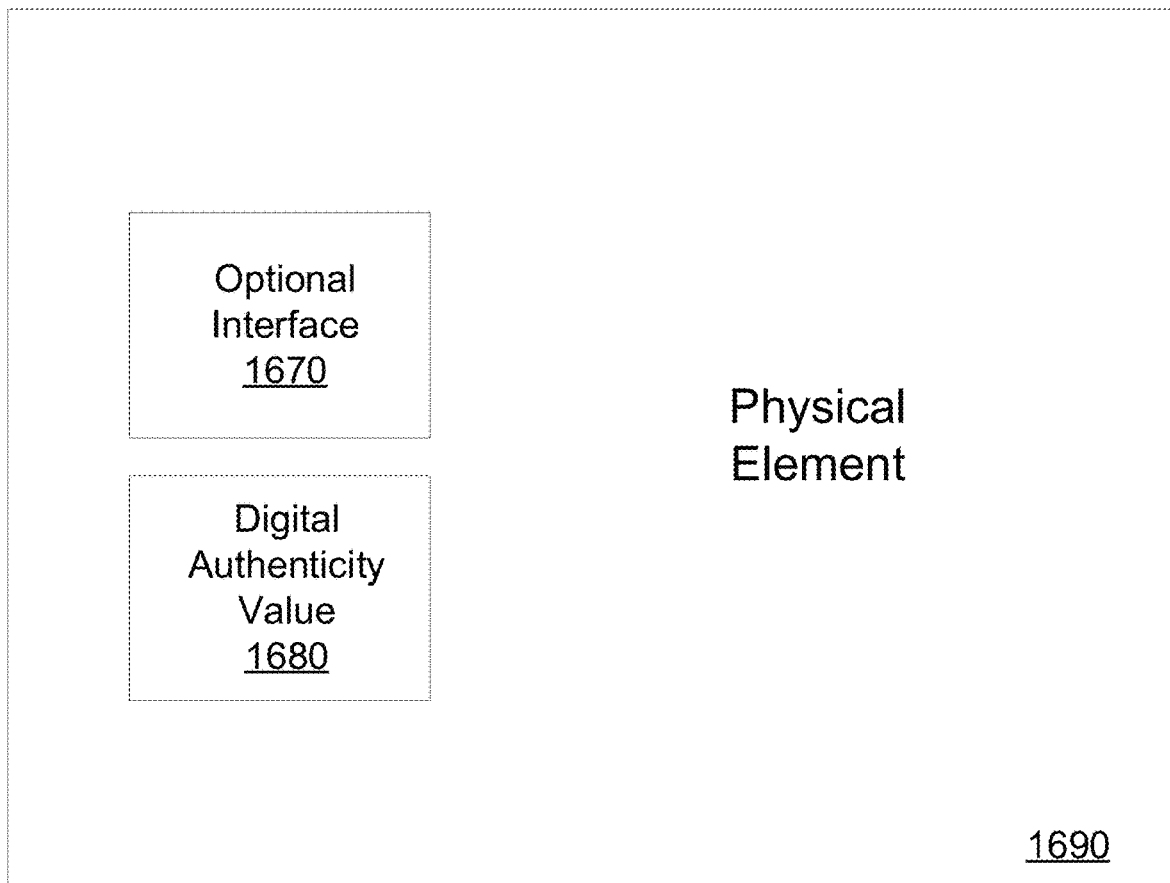

An example NFT which may be associated with specific content in accordance with several embodiments of the invention is illustrated in FIG. 16. In accordance with some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In accordance with some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In accordance with some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

An example of a physical element 1690 corresponding to an NFT, in accordance with some embodiments of the invention is illustrated in FIG. 16. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV) 1680 may be therefore be associated with a physical element 1690 and a digital element. A digital authenticity value may be a value that includes an identifier and a digital signature on the identifier. In accordance with some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In accordance with some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In accordance with some embodiments, the encoded value may also be represented in an authenticity database. Moreover, the physical interface 1670 may be physically associated with the physical element. One example of such may be a QR tag being glued to or printed on the back of a canvas. In accordance with some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In accordance with some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
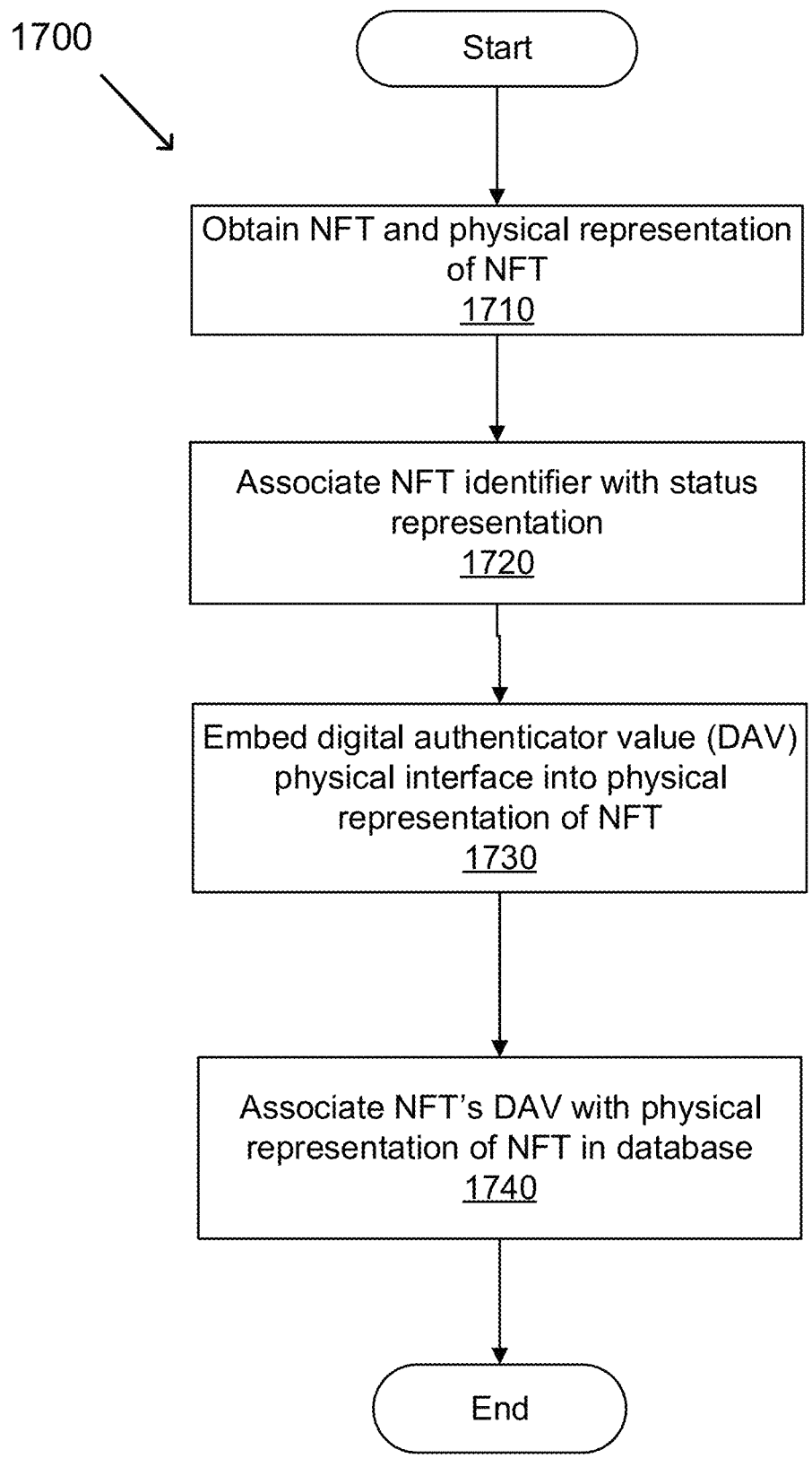
FIG. 17 illustrates a process for establishing a relationship between an NFT and corresponding physical content in accordance with a number of embodiments of the invention.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In accordance with some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

Transaction-Directed Functionality on NFT Platforms

NFT platforms in accordance with many embodiments of the invention may implement systems directed to various transaction-based capabilities. Transaction-enabling functionality can be applied to protecting tokens, obtaining royalties for content, and protecting against fraudulent activity.

A. Facilitating Token Transactions in NFT Platforms

Systems and methods in accordance with a number of embodiments of the invention may implement identifiers, associated with tokens, that indicate one or more intermediaries that may be associated with app stores and/or other marketplaces.

Intermediaries may be used to constrain what marketplaces can be used to initiate exchanges related to the token. For example, one identifier may specify that the token with which the identifier is associated can only be traded on the "XYZ" marketplace. Additional or alternative uses of the intermediaries may include identifying recipients of funds in transfers involving particular tokens. Systems operating in accordance with many embodiments, in referring to tokens, may involve NFTs and/or crypto funds. In such cases, the quantity of the funds may be determined by policies associated with the token(s) and/or the intermediaries. Such functionality may enable tokens to be traded on a multiplicity of approved marketplaces. Additionally or alternatively, lists identifying what marketplaces are approved may be incorporated into tokens and/or associated with intermediaries.

Methods operating in accordance with some embodiments of the invention may include content locking methods applicable to one or more containers associated with individual tokens. For example, a first container may hold descriptions of the content included in other containers, including but not limited to trial versions, movies, screenshots, textual descriptions, and/or references to any of these items. A second container may hold executable content, configuration data that may encode character personalities in games, digital assets used in a game, unlock keys used to enable select functionalities of software associated with the token, etc. A third container may hold game-based content: artwork to be used in a game; extensions, plugins, and references for the game; representations of value in the game, etc. Any or all containers associated with sets of tokens may be locked, limiting access to the data stored within.

Utilizing the content locking methods, containers may be locked and unlocked, enabling compatible readers to access information in the containers. Containers being locked may limit access rights associated with the containers and/or the corresponding token(s), including but not limited to transfer capabilities associated with the token(s) and access to the information in the containers by users. In accordance with some embodiments, locked containers may require actions by specified intermediaries to be used and/or unlocked by receiving parties. Locked content portions may be associated with lock values, where lock values can be used to unlock locked content portions. Lock values may be sent in response to identifying completed transactions. Lock values may include, but are not limited to, decryption keys and/or digital rights management (DRM) capabilities, like digitally-signed access values.

Additionally or alternatively, systems configured in accordance with some embodiments of the invention may implement anchors to govern various rights, including but not limited to the importation of tokens into application environments. Anchors may operate as key values embedded in software units and be used to access tokens and/or containers. In accordance with certain embodiments, anchors may have matching identifiers (e.g., an identifier of X intermediary) and/or matching representations of lock values. For example, individual applications configured in accordance with numerous embodiments of the invention may be enabled to import tokens (to be used on the application) when anchors match at least one of the identifiers associated with the tokens. Additionally or alternatively, locks associated with locked content portions of certain tokens may, upon matching with an anchor, be unlocked and allow access to the content portions. Different versions of applications may correspond to different anchor values. Different downloads of individual applications may correspond to different anchor values. In accordance with a number of embodiments, tokens, including but not limited to NFTs, can be imported to application environments according to matches to anchors.

Anchors may include but are not limited to digitally-signed values. In such cases, the digital signature may be generated by, enabled in full, and/or enabled in part by entities representing the application provider(s). The verification of anchors, in such situations, may be performed using the public key of the signer. The value(s) that are digitally-signed may be, but are not limited to, the identifier(s) of the intermediaries, portion(s) of such values, and/or derived from such values. The identifiers of the intermediaries, likewise, may include digital signatures on anchors. Such signatures may correspond to the marketplace, and/or portions of data associated with the related anchor.

Figure 18A:
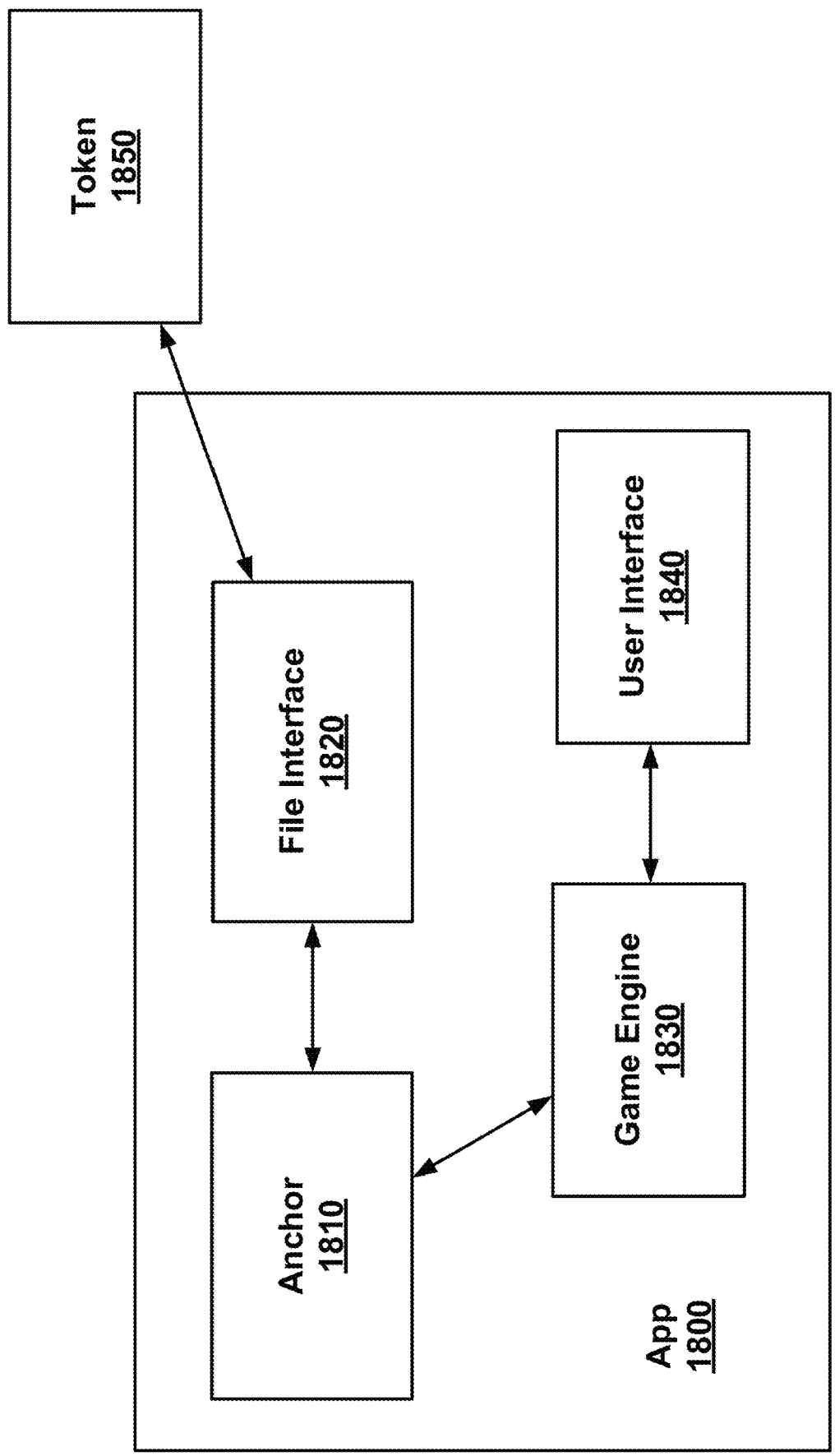
FIGS. 18A-18B illustrate representations of an application configuration operating in accordance with many embodiments of the invention.
Figure 18B:
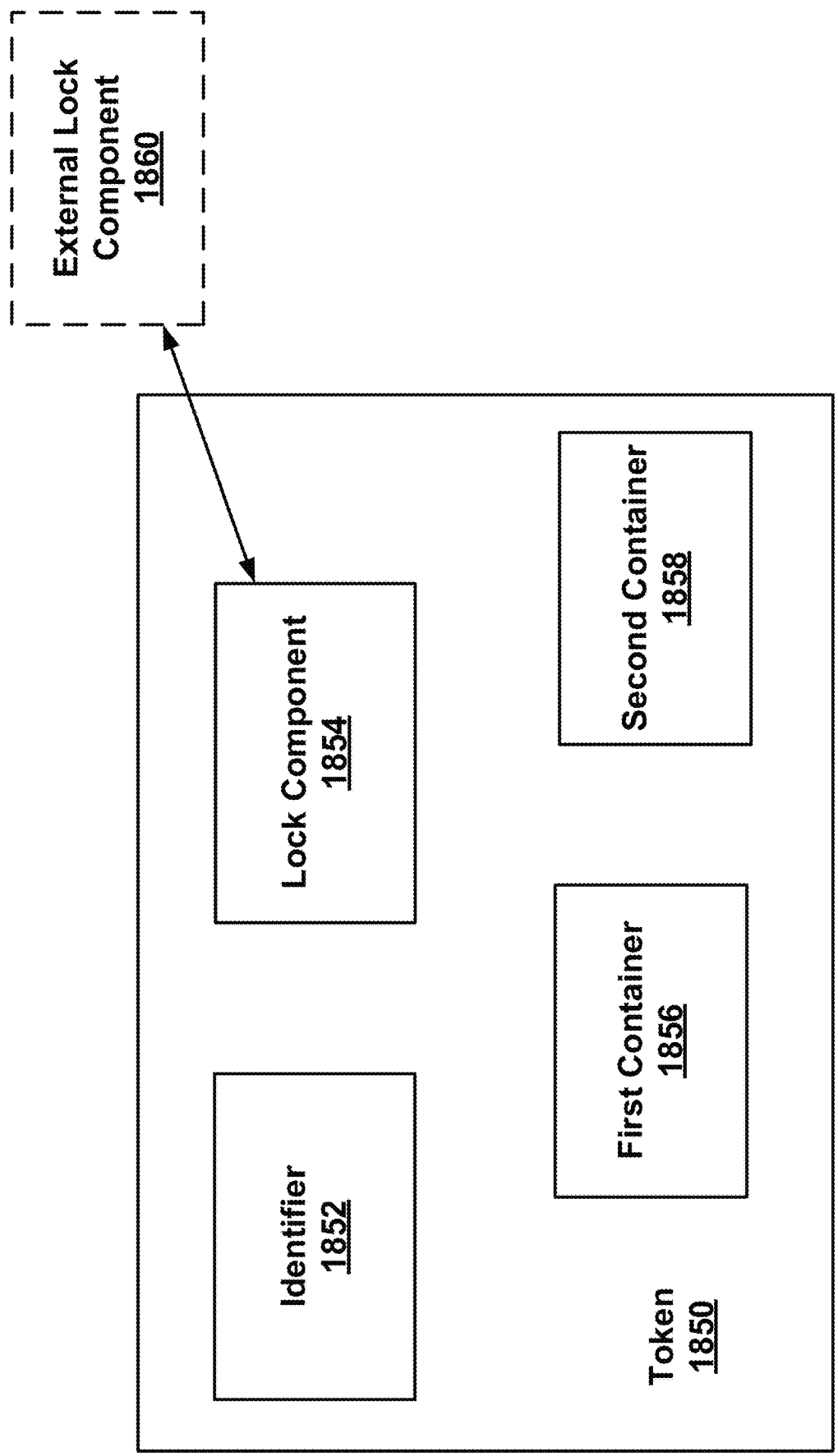

A representation of an application configuration operating in accordance with many embodiments of the invention is illustrated in FIGS. 18A-18B. Applications 1800 may include, but are not limited to, game engines 1830, user interfaces 1840 for communication with users, and file interfaces 1820 for communication with the Internet. In accordance with some embodiments, anchors 1810 may be inserted between game engines 1830 and file interfaces 1820, and be used to verify interactions with tokens 1850. The presence of anchors 1810 can be verified by servers associated with providers of the application 1800 (e.g., an application store). Anchors 1810 may take various forms, including but not limited to binary values. Anchors 1810 may act as filters between file interfaces 1820 and game engines 1830. Anchors 1810 may engage in actions including but not limited to enabling token transfers, blocking token transfers, enabling elected portions of functionality associated with tokens 1850, and disabling elected portions of functionality associated with tokens 1850. Anchors may operate by, but are not limited to associating and/or disassociating lock functionality with tokens and/or containers of tokens 1850. Users, utilizing user interfaces 1840 may initiate token 1850 transfers to and/or from applications 1800 (i.e., importing/exporting). In such cases, anchors 1810 may be used to verify that the token(s) 1850 are in conformance with rules, including but not limited to, rules identifying what tokens may be imported/exported from/to the application 1800. Rule compliance can be determined by matches between data associated with anchors 1810 and data associated with tokens 1850. Anchors 1810 may, in response to user actions, generate logs to be sent to intermediaries including but not limited to servers associated with application providers.

Tokens 1850, in accordance with numerous embodiments of the invention, may include but are not limited to identifiers 1852, lock components 1854, and one or more containers 1856, 1858. In accordance with some embodiments, the lock components 1854 may be associated with optional external lock components 1860. As indicated above, identifiers 1852 may facilitate actions upon matching anchors 1810. Lock components 1854 and external optional lock components 1860 may control access to at least one of the first container 1856 and second container 1858, Control may involve but is not limited to at least one of enabling access by facilitating and/or performing decryption, and enabling access by facilitating and/or performing access control determinations. In accordance with various embodiments, access control determinations may be based on one or more policies included in the lock component 1854 and/or external optional lock component 1860. External lock components 1860 may be operated by servers that are controlled by the application provider that provides the anchor element.

Locks configured in accordance with several embodiments of the invention may include smart contract elements. Smart contract elements may, when activated, initiate payment to parties associated with, but not limited to, intermediary identifiers. In such cases, the size of the payment may be determined based on the transaction(s) causing the activation of the relevant smart contract. Additionally or alternatively, smart contracts may initiate an unlocking of locked containers.

In accordance with numerous embodiments, at least a portion of the lock element/components may be located externally to the tokens. For example, lock components may be stored in database records maintained by and/or accessible by intermediaries. Entities including but not limited to, keys to decrypt locked containers may be stored in such databases and/or obtained in response to the reporting of a transaction being performed. Interactions with lock elements may trigger book-keeping events by intermediaries and lead to charging third parties (e.g., application creators) pre-agreed amounts, and/or amounts based on transaction values.

Figure 19:
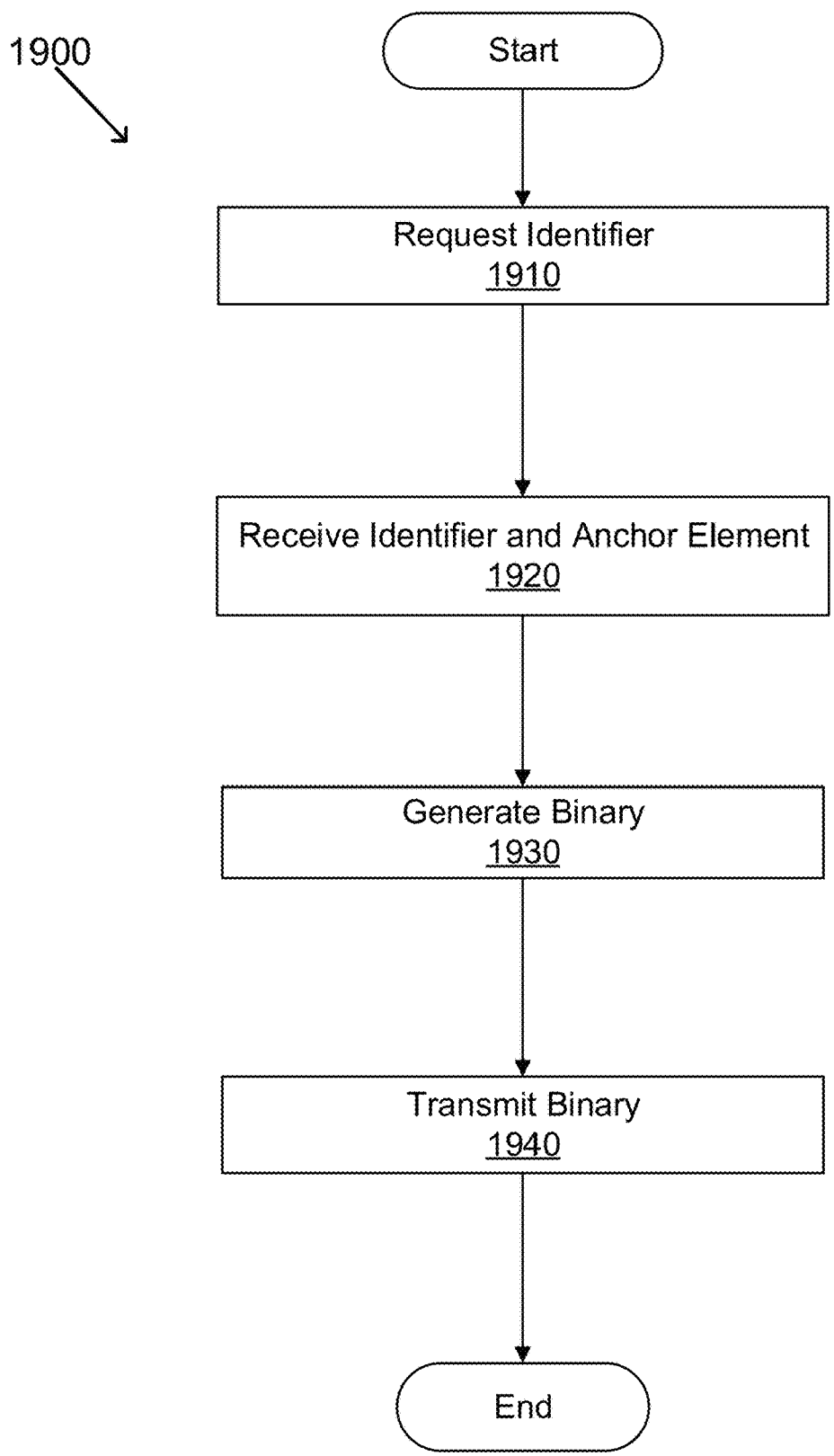
FIG. 19 conceptually illustrates the application creation process from an application developer's perspective, in accordance with numerous embodiments of the invention.

The application creation process from an application developer's perspective, in accordance with numerous embodiments of the invention, is illustrated in FIG. 19. Process 1900 requests (1910) an identifier. Requests may be integrated with the application development software of an application store. This application development software may be specific to developers, to particular applications, and/or to particular versions of particular applications. Requests for identifiers may involve, but are not limited to agreements to terms of service. Process 1900 receives (1920) the identifier and an anchor element. Anchor elements may be received in various forms including but not limited to libraries configured with respect to the identifiers, as sequences of source code instructions where at least one of the instructions references an identifier, and/or as binaries to be integrated with the applications. In some implementations, developers may configure libraries using received identifiers, thereby creating representations of the anchor from already available code sequences. Process 1900 generates (1930) a binary from the application source code and the anchor. Process 1900 transmits (1940) the binary to a server associated with the application store, wherein the server determines the presence and validity of the anchor. Verifying the validity of binaries may include, but is not limited to determining the presence in the binary of the identifier, and determining a valid sequence of machine code instructions in a segment of the binary that corresponds to the location of the detected identifier.

In accordance with several embodiments of the invention, application creators may integrate anchors into the code of the underlying application. Specifically, application creators may integrate anchors with specified formats (i.e., anchor elements) within the source code. Anchor elements that reference the anchor(s) and include executable elements may be combined (e.g., compiled) with executable files corresponding to applications. When an anchor element is incorporated into executable code, the resulting file (the "submitted application") may be submitted to app marketplaces (e.g., the iTunes™ application store). Submitted applications may take the form of binaries. Upon receipt, marketplace servers may process the submitted applications and determine the presence of the anchor(s) in the submitted application. Servers may verify the validity of the anchors. For example, a marketplace server may verify an anchor by confirming that an associated binary segment includes an identifier associated with the submitted application. Such an identifier may be the same identifier as included in the tokens described above. In such cases, identifiers may, for example, be included in locks within the tokens. Servers operating in accordance with several embodiments of the invention can perform additional verification actions, including but not limited to determining that there are no known malicious code segments in the submitted application, that static code analysis does not reveal known problems, and/or that dynamic code analysis does not reveal known problems. Possible code issues may include but are not limited to infinite loops and/or constructs that are against the terms of service. Servers, when provided with the source code for the submitted application can perform additional analysis on the code. For example, servers may confirm that the submitted application only uses marketplace-approved, unmodified libraries. Alternatively or additionally, in accordance with some embodiments, the analysis can also be performed using de-compilers to determine possible source code.

In accordance with a number of embodiments, anchors may include code that is provided by application stores and/or marketplaces to application creators. Code associated with anchors can facilitate verifications of tokens imported to the application(s). Verifications may be used to determine that tokens are in compliance with sets of rules. For example, systems operating in accordance with some embodiments of the invention may verify that tokens have been transacted in permitted marketplaces, have been unlocked, include valid digital signatures identifying them as valid, etc. Digital signatures may be generated by and/or with the collaboration of servers controlled by application providers. As a result, application providers may be protected against tampered applications generating tokens of the valid format but that nevertheless do not mesh with the functionality of the non-tampered application code. Anchors may include identifiers that are unique to the applications (in which they are to be incorporated), to the application instance (e.g., the copy of the code running on a given device and/or on the devices of given users), and/or to families of applications created by the same application creator. Such identifiers can be used to imprint identifiers in tokens that are exported by the relevant applications. Additionally or alternatively, identifiers may be used to create audit trails in the form of logs generated by the application when import and/or export transactions are initiated, performed, and/or concluded.

Anchors may serve as trusted API interfaces between application(s), as designed by application creators, and servers associated with the intermediaries. By restricting how tokens are imported, exported, accessed, modified, and/or read, by requiring anchors to be used as interfaces, application providers (e.g., application stores) can impose constraints and restrictions on the use of tokens. This control can be used instead of and/or in addition to the other functionality disclosed herein. Application providers can scan submitted applications to determine various configurations including but not limited to that the submitted application uses the anchor to interact with tokens, and that no other types of token interaction are detectable. Scans for irregularities can be determined through modes including but not limited to using static and/or dynamic code analysis, by experimental testing, and/or by detection of log irregularities. One type of log irregularity may include a deviation between logs reported by different entities. Another manner to scan for irregularities may be to identify the anomalous generation of tokens by applications in light of the imported tokens and recorded usage actions.

For systems operating in accordance with a number of embodiments, when tokens are traded on marketplaces that correspond to specified intermediaries, the intermediaries may facilitate the transfer of tokens. Intermediaries can use decryption keys to unlock the locked content, verify their authenticity, and designate them for new users (e.g., prospective buyers). The designation of locked content to buyers may include, but is not limited to, providing access rights to buyers, and/or encrypting at least portions of one or more containers using a public key associated with buyers. Buyers and sellers can, in accordance with several embodiments, be represented by symmetric keys. Symmetric keys may be unique to these entities and/or accessible by the relevant marketplaces. As such, stored symmetric keys may be used to designate content to buyers. The designation may, alternatively or additionally, be in the form of access tokens including but not limited to digital signatures by the intermediaries. The digital signatures may be used to specify that the buyers, identified by values including but not limited to a public key and/or other entity-specific identifiers, can be allowed access. Combinations of encryption and access control may be utilized by certain systems. In such cases, a transaction overseen by the intermediaries can include a change in access control by changing ciphertexts, distribution of keys, and/or generation of authentication tokens, including but not limited to digital signatures.

Systems and methods operating in accordance with a number of embodiments of the invention may be able to limit the circumstances for which token transactions and/or content access are allowable. When users attempt to trade tokens using marketplaces different from those indicated by token identifiers, the exchange may be prevented from permitting full access to the content contained in the tokens. Additionally or alternatively, access to content may be prevented, due to having been encrypted using keys that the intended buyers do not have access to.

Systems configured in accordance with some embodiments, may enable content to be rented and/or loaned. Systems may temporarily provide authorization to access content including but not limited to digital content. Access to content may be determined subject to expiration dates wherein access is ceased when the expiration date is reached. Expiration dates may be set conditionally in scenarios such as digital content being rendered a preset number of times. In accordance with certain embodiments of the invention, interfaces including but not limited to digital interfaces, user interfaces, and web browsers may enable rentals and/or loans.

Additionally or alternatively, access may be precluded when the content is not associated with access controls that can enable buyer execution environments to access the content. In accordance with many embodiments, execution environments may be expressed as hardware constraints, including but not limited to TrustZone; as operating system constraints, including but not limited to the use of a DRM platform to execute applications on; and/or as applications verified to comply with the requirements of associated application stores. As such, different mechanisms of blocking access may be associated with different requirements on the associated client hardware and/or software. In some contexts, both encryption and access control techniques may be used to limit access.

Figure 20:
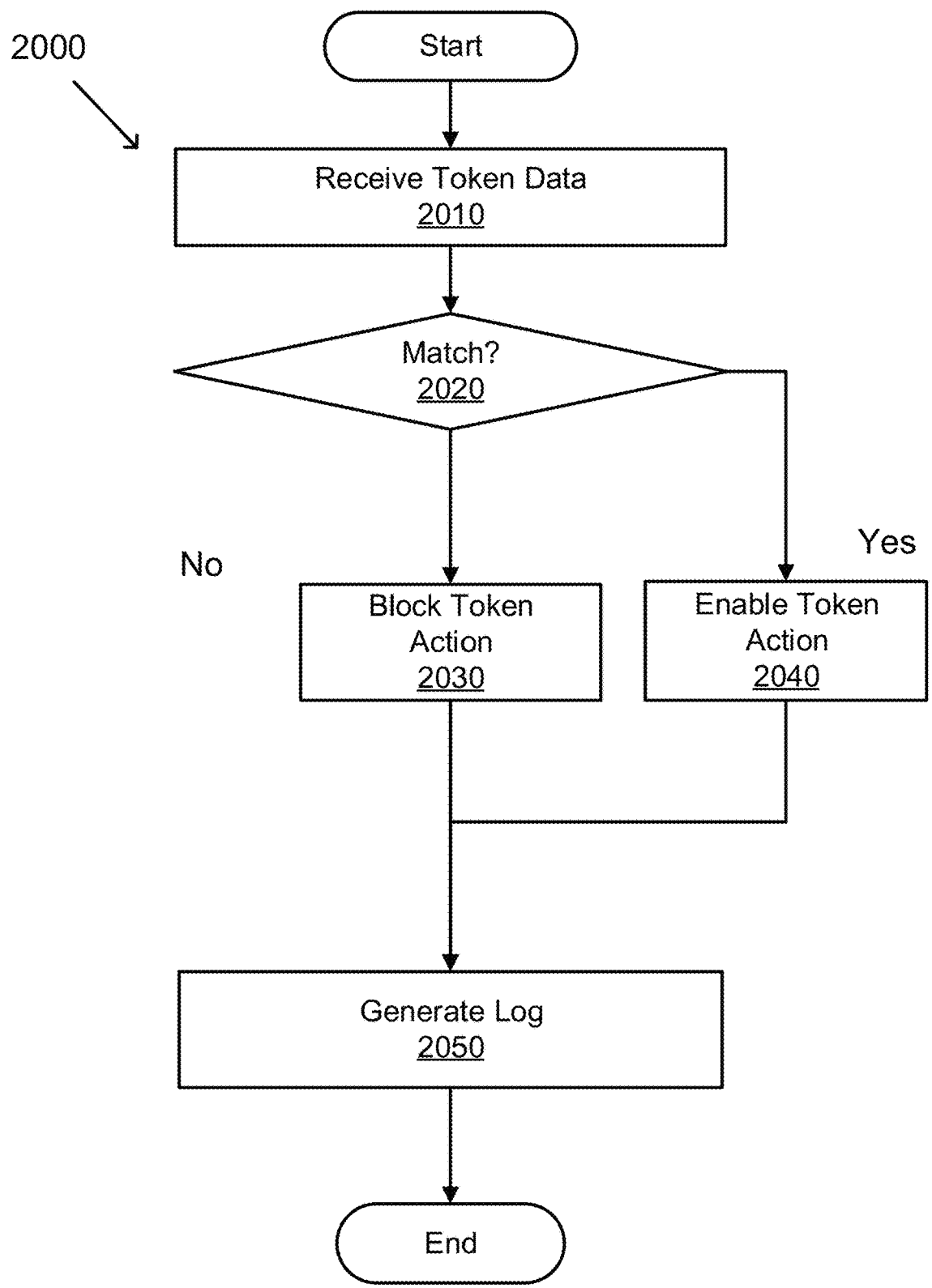
FIG. 20 illustrates a process followed by an application interacting with token data, in accordance with transactions performed in accordance with various embodiments of the invention.

A process followed by an application interacting with token data, in accordance with transactions performed in accordance with various embodiments of the invention, is illustrated in FIG. 20. Process 2000 receives (2010) token data. Token data may refer to, but is not limited to, tokens, requests for tokens to be imported, and/or requests for tokens to be exported. Process 2000 determines (2020), using anchor data and token data including but not limited to the identifier, lock component and/or optional lock component, whether there is a match between the token and anchor. For example, a match may be determined to have occurred when an identifier associated with the anchor is the same as the identifier associated with the token. Alternatively or additionally, a match may be determined based on digital signatures included in the lock components being valid and corresponding to the identifiers received (e.g., step 1920). Alternatively or additionally, matches may be determined based on whether digital signatures included in the anchor matches values associated with the token identifiers and/or lock components. Lock components and/or optional lock components may include keys used to decrypt content held in containers. When such decryption succeeds, systems may determine that there is a match. There may be several variations of how a match can be determined including but not limited to, using decryption, verification of digital signatures, verification of message authentication codes and/or verifications of checksums and/or hash-based authentication techniques.

Depending on the results of a match, systems operating in accordance with numerous embodiments may respond accordingly. When a match is determined, process 2000 enables (2040) a token action. This may include the extraction of decrypted data, for example. When the match fails, process 2000 blocks (2030) the token action. Process 2000 generates (2050) a log entry describing the result of the comparison process. In the case that a match exists and extraction is enabled, the log entry may identify and/or characterize the content extracted. Log entries may include but are not limited to log identifiers and secured log entries. Secured log entries may include but are not limited to encrypted and authenticated data values. The determination of what keys to use to decrypt and/or validate secured log entries may be based on key lookups. Systems may look up keys stored in records in databases managed by the one or more servers wherein the database may be indexed by the log identifier. Logs may be later transmitted to servers associated with application stores.

Figure 21:
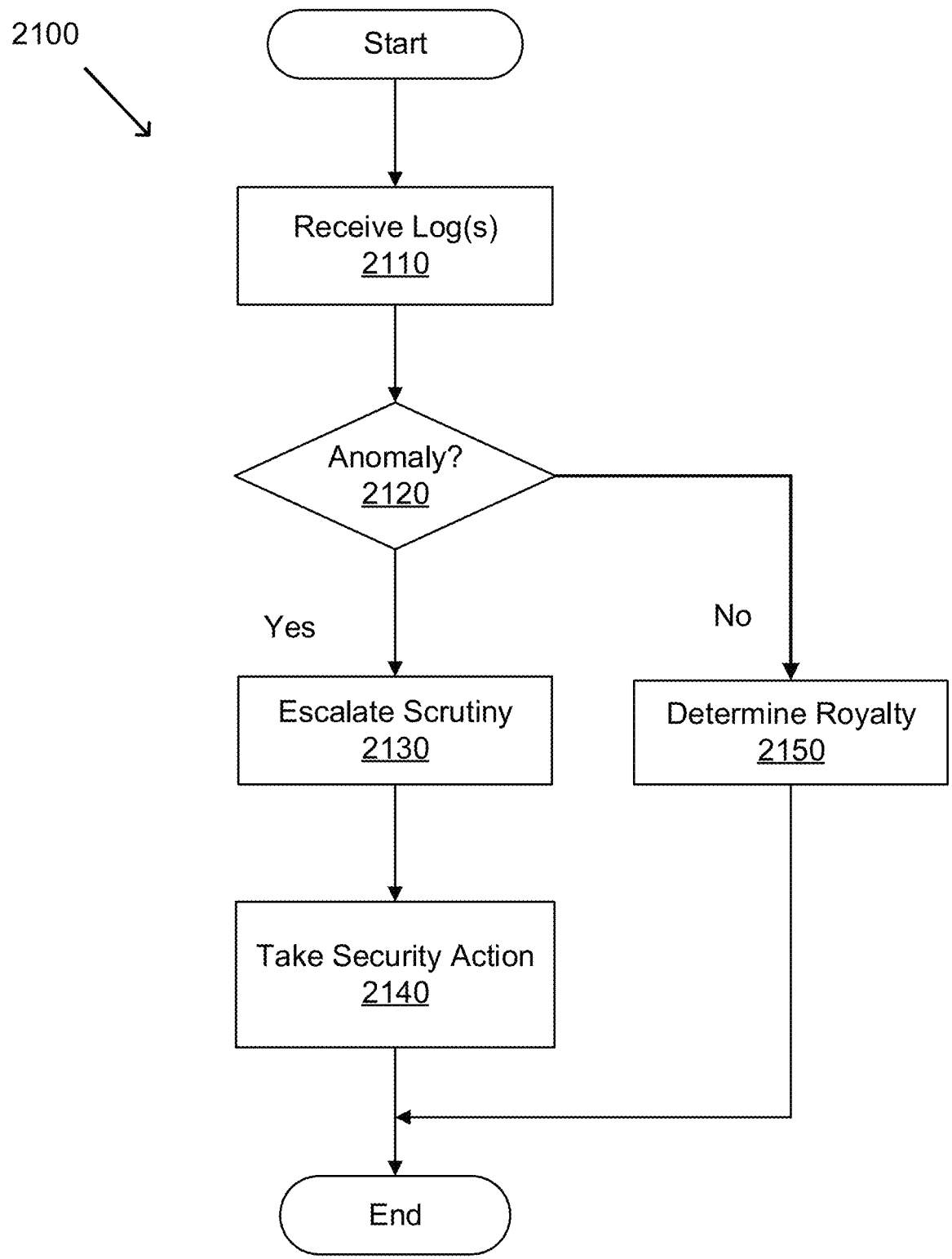
FIG. 21 conceptually illustrates an application log processing and system securing method, followed by one or more servers associated with application stores operating in accordance with many embodiments of the invention.

An application log processing and system securing method, followed by one or more servers associated with application stores operating in accordance with many embodiments of the invention, is illustrated in FIG. 21. Process 2100 receives (2110) one or more log entries. Log entries may be in encrypted and/or authenticated formats. Log entries may use one or more symmetric keys specific to the corresponding application, where the one or more keys may be contained in anchors. Keys may be stored in, but are not limited to server-accessible databases that enable servers to decrypt and verify log entries. Process 2100 determines (2120) whether an anomaly exists. Anomaly determinations may be performed by, but are not limited to comparing two log entries with each other to determine anomalies suggested by a failure of the two log entries to reference the same event (e.g., transaction). Log entries generated by applications may be compared to log entries generated by entities including but not limited to application stores, application providers, and marketplaces. When no anomaly is detected, process 2100 determines (2150) a royalty. Royalties may apply to enabling a first content producer (such as a musician) to create content that a second content producer (such as a game studio) uses, wherein the first content producer may be paid a royalty based on the sale, licensing and/or use of content of the second content producer. As indicated throughout this application, in accordance with various embodiments of the invention, collections of marketplaces can enable the exchange of content, including but not limited to tokens. These marketplaces may be required by terms of service to perform and/or facilitate royalty payments associated with the transfer of rights of tokens associated with the application.

When an anomaly is detected, Process 2100 optionally escalates (2130) scrutiny. Scrutiny escalation may, for example, involve the review of log data by one or more administrators. Process 2100 takes (2140) a security action based on the anomaly detected (2120) and/or the escalated scrutiny (2130). Example security actions may include, but are not limited to, revoking certifications associated with digital signatures associated with applications, updating revocation list entries (which may be part of external lock components), banning applications from application providers, and/or placing holds on royalties paid to the applications developers. Security actions may also include enabling the use by the application of the token associated with the one or more log entries received (2110).

Marketplaces may, additionally or alternatively, be required to provide logs indicating transactions to controlling marketplace services. Logs generated by marketplaces may be compared with logs generated by applications as they import tokens. The comparison of marketplace and application logs may be used for, but not limited to, identifying non-compliant token marketplaces that should not be allowed to act as intermediaries. For such entities, capabilities to perform the designation (and similar configuration of access rights) can be withdrawn. For non-compliant marketplaces, rights may be withdrawn by methods including but not limited to adding the public key of misbehaving entities on certificate revocation lists (CRL), refusing to renew certifications, and/or refusing to distribute new decryption keys to such entities while updating the encryption keys used to lock content exported from applications to tokens.

Systems and techniques directed towards enabling in-app transactions, in accordance with various embodiments of the invention, are not limited to use within NFT platforms. Accordingly, it should be appreciated that applications described herein can be implemented outside the context of an NFT platform network architecture and in contexts unrelated to transactions directed to fungible tokens and/or NFTs. Moreover, any of the systems and methods described herein with reference to FIGS. 18A-21 can be utilized within any of the NFT platforms described above.

B. Sharing Royalties Over NFT Platforms

Systems and methods in accordance with several embodiments of the invention may be applied to enable one or more parties to receive royalties from one or more token sales. Royalties for tokens may be received based on royalty policies associated with the tokens.

Receipt of and rights to royalties may be based on identifiers of the paying and/or receiving entities. Identifiers may correspond to, but are not limited to, public keys associated with users and/or digital wallets. Alternatively or additionally, identifiers may correspond to wallet addresses. Systems operating in accordance with some embodiments may assume that each buyer has provided a personal identifier beyond their wallet address, and/or uses their wallet address as the identifier. As such, under resale examples, buyers that do not share their identifier, when required, may not qualify for royalty sharing upon resale. Additionally or alternatively, privacy-minded buyers and sellers may use pseudonyms. In accordance with numerous embodiments, pseudonyms may be associated with identifiers, real-life identities, and/or public keys tied to entities.

Associations may be performed in manners in which the identifier, real-life identity, and/or public key can only be determined based on quorum actions. For example, quorum actions may be based on catalyst events including but not limited to abuses like money laundering. Additionally or alternatively, quorums may consist of collections of collaborating trusted entities. In accordance with numerous embodiments, royalty determinations may be performed based on the potential spawning of additional NFTs, as disclosed in U.S. patent application Ser. No. 17/929,894, titled "Methods for Evolution of Tokenized Artwork, Content Evolution Techniques, Non-Fungible Token Peeling, User-Specific Evolution Spawning and Peeling, and Graphical User Interface for Complex Token Development and Simulation," filed Sep. 6, 2022, which is incorporated by reference in its entirety. As such, royalty stream policies may also define the same and/or different royalty structures for spawned NFTs.

Royalty systems may take any number of forms. One example royalty structure may give the first user 1% of future sales, a second user 0.5%, a third user 0.25%, and an $i^{th}$ buyer $2^{i-1}$%. Thus, each buyer can get a cut of future sales in the form of a royalty. Receiving parties may not have to be specified at the time of the creation of the policy, and can be determined based on triggering actions. One triggering action for royalty policies may be when the corresponding token is sold by and/or to the given party. For example, a policy associated with an NFT may specify that the content creator receives a 10% royalty on every sale of the NFT, and that the five first owners of the token each receive a 1% royalty on every sale of the NFT that takes place after their identity has been added. In such instances, for the first owner, the triggering actions, to the policy associated with the NFT, may include every sale from the second onward. Thus, when an artist sells an NFT to user A, who then sells the NFT to user B for $100, then the transaction between A and B provides the artist with $10. When user B later sells the NFT to seller C for $200, the artist gets a $20 royalty and user A gets a $2 royalty. When user C further sells the NFT to user D, e.g., for $400, then the artist gets $40, user A gets $4, and user B gets $4.

In accordance with certain embodiments, content creators can specify policies associated with royalties provided to others. For example, content creators may select that a subset of the sales of a token (e.g., 5% of the sales) will be provided to users that trigger a royalty mechanism associated with the token. An example mechanism may impart royalties onto the first N users to buy the token, where N can a number that may be specified by the content creators and/or system parameters. Content creators may, additionally or alternatively, specify that a total of 10% royalty will be given for each qualifying sale, where this royalty may be shared according to a given formula. For example, formulas may specify that content creators get half of the royalty, after which the remaining royalty may be shared equally among all the other qualifying royalty receivers associated with the token. Formulas may, alternatively or additionally, specify that the first-established qualified royalty recipient after the content creator can be given one percentage unit of the sale, the second-established royalty recipient given half a percentage unit, the third-established royalty recipient given a quarter of a percentage unit, and the content creator(s) being given any remaining royalty. In accordance with some embodiments, rules, specifying royalty payments, may be encoded as part of the token and/or referenced by the token but stored external to the token.

In accordance with numerous embodiments, the sharing of royalties may conditional on events. For example, royalties may depend on the resale price when the associated artifact exceeds a threshold value, (e.g., $500, ETH 4.25). For example, a qualifying royalty recipient, not counting the content creator, may be provided a royalty when the value of a resale exceeds this threshold. Additionally or alternatively, a qualifying royalty recipient may be provided a royalty when the value has reached a triggering value, including but not limited to twice the value that this party sold the artifact for. Additionally or alternatively, qualifying royalty recipients may be provided royalties when the value of the transaction represents gains over the prior sales. Such rules can also be encoded as part of the policies specifying royalty payments and stored and evaluated with other royalty policies.

In accordance with many embodiments, content creators may specify the royalties to be paid to qualifying royalty recipients but without specifying the total breakdown. For example, a particular royalty policy may be limited to the transaction between the first qualifying royalty recipient and the subsequent qualifying royalty recipient(s). Such policies can be implemented by the first qualifying recipient, who may be determine that a total of 5% of the sales price of tokens can be provided as royalties to qualifying recipients, after which this first qualifying recipient may specify that he wants a quarter of this amount, i.e., 1.25% of the sales price. This may leave the remaining qualifying recipients, e.g., future buyers, to share 3.75% of the sales price, i.e., the remaining royalties to qualifying recipients. The second qualifying recipient may, after buying the token, specify the policy that he wants 2% of the sales price, leaving 1.75% to the third qualifying recipient and other future qualifying recipients. Under systems operating in accordance with numerous embodiments qualifying recipients may not demand a higher portion than what remains. Additionally or alternatively, they may not modify the portion given to previously-specified royalty recipients. Qualifying recipient can use royalty simulators to determine how to best choose the portion of the royalties to take. The simulators may provide guidance to users potentially interested in acquiring tokens, allowing the users to assess likely recovery amounts prior to purchasing the tokens.

In accordance with a number of embodiments, the triggering action associated with individual users and given tokens may be user actions. One example of such actions may mandate that the user sends at least one tweet referencing the token. Another example of an action may be that the user provides a positive review of the token. Accordingly, user wallets may include policy evaluators that determine whether individual tokens, are associated with policies that have negative effects. Digital wallets may determine when certain events occur, and note the events. For instance, a digital wallet may indicate that certain positive reviews are event-based to flag them as being potentially biased.

In accordance with a few embodiments, triggering actions may be associated with the achievements of users. An example achievement may include but is not limited to a user owning above a minimum amount (e.g., at least five tokens) from the same content creator. Thus, users who own only four tokens from the content creators may not be qualifying royalty recipients, and therefore may not receive royalties on future sales of any of these four tokens. However, when the above user acquires one more token from the same content creator, the triggering action would take place and the user would receive future royalties. Royalty policies may state complex rules determining whether a tentative buyer would qualify to receive royalties from the future sales of tokens. Digital wallets may include assessment units that read the royalty policies and determines whether users qualify and when not, what is required for them to qualify. This information can be conveyed to users, both as they are reviewing tokens potentially for sale (e.g., in a marketplace) and/or whether they interact with tokens that they have already acquired.

Information related to the current and past ownership of a token, including but not limited to tokens, can be stored with the token, e.g., in the form of one or more derived tokens, as disclosed in U.S. patent application Ser. No. 17/808,264, titled "Systems and Methods for Token Creation and Management," filed Jun. 22, 2022, incorporated by reference in its entirety. Derived (or spawned tokens) can be generated using the techniques of token derivation, can inherit properties of the underlying tokens from which they were generated. In accordance with certain embodiments, as a token spawns, the resulting spawned token can be associated with the same (and/or a version of the) royalty policy as the token it was derived from. Ownership information may also be stored on blockchains that, for example, detail a series of ownerships of tokens, where new tokens may be minted to represent the addition of new owners to the list of current and past owners. The addition of new owners may be performed by creating derived tokens from previous ownership tokens associated with assets and records of the current owner. This may end up creating new ownership tokens for assets.

Systems and methods in accordance with several embodiments may implement multiple types of royalties. Possible categories may include but are not limited to royalties based on the sale of tokens, royalties based on the renting out of tokens, and royalties based on profits acquired due to the ongoing ownership of tokens. These royalties may coexist in tokens, and provide different benefits. For example, the first type of royalties may provide the content creators with 10% of the sales revenue, and the first two owners, other than the content creator, each 1% of the sales revenue for sales that exceed $100. At the same time, the second type of royalties may provide the content creators 20% of the rental revenue, and the three first owners of the token each 0.25% of the rental revenue. Here, rental of a token may correspond to limited access to the content by one or more users, at a fee that may be specified at least in part by the content provider. For example, the content provider may specify that the rental cost may not be less than $0.10 per access.

Systems operating in accordance with numerous embodiments may facilitate token access for pre-specified time periods (e.g., 1 week). Possible access rights may refer to the right to render tokens, such as tokens associated with game artifacts. For example, tokens may correspond to in-game artifacts, like a shield. An example policy associated with content creators may specify that this can be rented out to at most 100 users at a time, and that each user must pay at least $1 per 24 hours of access rights. After users complete the rental periods, e.g., by explicitly returning the item and/or by not renewing the rental, rentable tokens can be rented by other users. In the above example, renting may correspond to the right to render an artifact, like the shield, in a specified game.

In some instances, artifacts can be used in multiple contexts. Some artifacts may have uses in one or more contexts (like games), but also have properties that can be rendered in other applications. For example, the above shield artifact may be used in a given game, but also be rendered on users' social media profiles. When rendered, the shield artifact may, for instance, cause the user's outgoing messages to be displayed in a brighter color than the messages published by other social media users.

Ongoing ownership of tokens may be profitable to owners through producing residual profits. Residual profits may come in various forms, including but not limited to loaning, staking, and/or indirect revenue. Example indirect revenue may be when a shield is used in a game to make a player wealthier in battle. Staking may refer to the act of placing a token in escrow for the duration of a membership of a group that performs validation for a Proof of Stake blockchain. A group member who misbehaves, according to a sufficient number of other members, may have a portion of their stake slashed, e.g., taken away from the escrow, not to be returned to the owner as the owner leaves the group.

Tokens can represent investments that provide the holder with an income stream. For example, the buyer of token A may acquire the rights to 0.1% of the profits of the sale of widget B by company C, minus any royalties owed to other stakeholders. As long as this user holds on to token A, he can be provided with such profits. However, token A may also have an associated royalty policy that specifies that a precious owner of token A gets 5% of the royalties that the buyer receives. When the sale of widget B results in a $10,000 profit, the current holder of token A may be given 95% of $10, and the previous owner may be given 5% of $10.

Content creators can specify a range of royalties that may be provided to (any number of) future owners. Content creators may, for example, specify that each of the future owners can take no more than 0.5% of the revenue of a transaction, but are free to take less to increase the incentive for promotion of future owners.

In accordance with many embodiments, token owners can determine their royalties for future sales of the token, within some bounds. Example limitations may include but are not limited to how much is left to be distributed in terms of royalties and boundaries that are set by content creators and/or previous token owners. In accordance with a number of embodiments, current token owners may be prevented from setting their own royalties and/or may be able to set the royalties of the next owner, also subject to some limitations.

In accordance with various embodiments, royalty policies may be associated with roles tied to purchasing tokens. For example, a royalty may be specific to the third buyer of a token. In some cases, royalty policies may be associated with creating derived tokens that meet certain criteria. Example criteria may include but is not limited to being viewed by at least one million users, being sold for more than ETH 60, and/or being rented more than 1000 times, each rental being done at a cost that exceeds $0.25. Thus, the royalty policies can be associated with any role, event and/or achievement that is specified in the royalty policy, even when the party that can satisfy the role is unknown.

Systems and methods in accordance with various embodiments may enable the assignment of royalties to users whose identities are not yet known. For example, certain policies may enable the assignment of royalties based on roles, including but not limited to "first party to purchase the NFT", "Fifth party to purchase the NFT", and/or "First marketplace to mint the NFT" (for instances like when a marketplace curator is involved in improvements to the asset). In accordance with a few embodiments, royalties can be determined a priori. For instance, royalties may be determined before the purchase and/or minting that they relate to. As an example, a content creator can determine the royalty assignment for different roles. Royalty assignments may be a priori known, which may allow those inspecting a token to be able to determine what royalty will be earned for what role (e.g., the second buyer of this NFT).

Royalty assignments may, alternatively or additionally, be hidden. For example, users may not be able to determine the royalties until they acquire/purchase the relevant tokens. In accordance with certain embodiments, hidden assignments may be configured by referencing and/or incorporating an encrypted and/or otherwise hidden royalty policy, to be later revealed. Revealing hidden assignments may be performed by the disclosure of decryption keys by content creators and/or trusted parties. For example, a reveal may occur via a first decryption key being used to decrypt a first ciphertext that reveals the royalty for the first buyer. Decryption key(s) can be obtained by buyers after having purchased the NFT and proving ownership to the entity holding the decryption key(s).

In accordance with many embodiments, each owner may determine their royalty percentage from portions that remain. As such, parties that select high royalty rates may discourage others from buying the NFT, thereby reducing the chances of the royalty being paid. On the other hand, parties that select lower royalties may encourage more future buyers to participate in promoting the NFT in order to get their royalties paid, thereby potentially increasing the total royalties paid to everybody.

Additionally or alternatively, in accordance with various embodiments, content creators may be able to configure the percentage of royalties they will receive. A first content creator may require a 10% royalty. A second content creator may require a 50% royalty. Tentative buyers of content from the latter content creator may be dissuaded to buy content from them due to knowing how large a portion of each sale of the content will go to the content creator, as opposed to the seller. This may entice content creators to choose their royalties wisely, to maximize their likely recovery. Systems operating in accordance with some embodiments may implement royalty simulators that can provide estimates for content creators of optimal royalty percentages. Estimates may be based on, but are not limited to historical observations derived from public distributed ledger technology of the result of particular royalty demands. Estimates of optimal royalties may enable content creators to select the options that seem most desirable.

Systems operating in accordance with certain embodiments may prevent users from self-dealing by selling NFTs to themselves, and/or otherwise repurchasing NFTs to increase the total royalties owned. By associating public keys, used to identify users, with real-life identities, systems may determine when users self-deal. Additionally or alternatively, some systems may deal with this issue by correlating digital wallets with each other to determine that multiple wallets are controlled by one party, which may correspond to one user and/or a small number of colluding users. Certain systems may also be self-governing in the form that performing abuse like this would be similar to setting a large royalty rate in that it dissuades other users from purchasing the NFT(s), reducing the net royalty payments as a byproduct. Therefore, it may be in the best interests of buyers not to abuse systems operating in accordance with numerous embodiments of the invention.

Configuring entities including but not limited to content creators may identify a first royalty cut for particular tokens, to refer to the first party that can receive a royalty. Cuts in this context may refer to shares of profits and/or royalties. The first party can be the content creator, the first party to curate the token, the first to acquire the token associated with the royalty policy, etc. The first entity cut may be a flat percentage (e.g., 1% of a sales revenue), a context-dependent percentage, and/or a context-dependent percentage, and/or a context-dependent amount (e.g., 0.01 for each sale for which the sale price exceeds ETH 0.25). Additionally or alternatively, royalties may depend on actions and/or ownerships. Example royalty policies for a token may be based off of the first entity, be conditional on the first party making the token publicly viewable, depend on the party owning at least three tokens by the same token creator, etc. Configuring entities may also identify subsequent royalty cuts up to an $n^{th}$ entity cut. Each one of the cuts may be expressed by one or more policies. The sum of the cuts may correspond to a pre-specified percentage and/or amount, where this percentage and/or amount may be determined by third parties including but not limited to marketplaces, token minting entities, common agreement, etc. While some policies may relate to royalties paid at the transfer of ownership, alternative or additional policies may also be associated with other types of revenue events, including but not limited to the renting out of tokens, responses to dividends being paid to token owners, etc.

In accordance with many embodiments of the invention, entities may select cuts to be provided to them, from available portions and/or amounts. A first entity can specify the cut for the first entity, up to some maximum portion and/or amount. This may be expressed by one or more rules and/or policies. A second entity, having acquired the token from the first entity, specifies a cut for the second entity, up to some maximum portion and/or amount that remains after the first party's cut. A third entity, having acquired the token from the second entity, specifies the third party's cut, in the same way. Eventually, an $n^{th}$ party specifies that its cut is the entire remainder, at which time future owners of the token may no longer be asked to specify cuts for themselves for the token. After initial entities transfer ownership of tokens to other entities, the initial entities can no longer modify the royalty policies. Thus, the right to modify and/or append additional policies can only be performed by entities with ownership rights. These policies may relate to, but are not limited to, royalties paid at the transfer of ownership.

In accordance with certain embodiments, the royalty policy can be included in smart contracts associated with tokens, including but not limited to NFTs. Changes in royalty policies can be performed by using the technique of a derived token, where the new token may include a smart contract that refers to the old token, augmenting the royalty of the smart contract of the old token by adding additional rules, for example. Derived tokens are disclosed in U.S. patent application Ser. No. 17/808,264, titled "Systems and Methods for Token Creation and Management," filed Jun. 22, 2022, incorporated by reference in its entirety.

A system for facilitating the modification of a royalty policy, in accordance with several embodiments of the invention, is illustrated in FIG. 22. Tokens 2200 configured in accordance with several embodiments, may include but are not limited to content data 2210; smart contracts 2220, 2250; and royalty policies 2230, 2260. Content data 2210 may exist in the form of addresses indicating where content is stored, information encoding content, and/or a combination of this including but not limited to information encoding thumbnail images and references to full-size image files. A token 2200 may include a first smart contract 2220 that includes a first royalty policy 2230.

Derived tokens 2240 can include derivation references 2270 to indicate the tokens 2200 from which they are derived. Derivation references 2270 may operate by indicating identifiers of tokens 2200 and/or unique storage locations of tokens 2200, including but not limited to locations on blockchains. Derived tokens 2240 may also include a second smart contract 2250 that includes a second royalty policy 2260. Derived tokens 2240 may be valid when original tokens 2200 allow derivatives to be generated, the second smart contract 2250 is in compliance with the first smart contract 2220, and the second royalty policy 2260 is in compliance with the first royalty policy 2230.

For example, the first royalty policy 2230 may state that the owner of a token 2200 receives a 1% royalty, and that additional future owners receive a combined 2% royalty, with none of them receiving more than 0.5%. When the second royalty policy 2260 states that the owner of derived tokens 2240 receives a 1% royalty, that can be in conflict with the cap established by the rules of the first royalty policy 2230. When a second royalty policy 2260 conflicts with a first royalty party, derived tokens 2240 may be rendered invalid. However, when the second royalty policy 2260 states that the owners of derived tokens 2240 receives 0.25% royalties, that may be in compliance with the first royalty policy 2230. As derived tokens 2240 may be bound by the first royalty policy 2230 and the second royalty policy 2260, in the above example, the owners of a derived token 2240 may each receive a 0.25% royalty up to the ninth owner, at which point the combined royalty would exceed the established cap on combined royalties (2%).

In accordance with some embodiments of the invention, derived tokens 2240 may be used as mediums to transfer the assets of original tokens 2200. As such, once derived tokens 2240 are minted and assigned to owners, the corresponding original tokens 2200 may cease to exist as free-standing tokens, only existing in the context of the derived tokens 2240. Original tokens 2200 may therefore transfer assets including but not limited to content data 2210 governed by the first smart contract 2220, to the owner(s) of the derived token(s) 2240. The ownership of tokens 2200 may be encoded in the tokens 2200 themselves and/or recorded on blockchains. Additionally or alternatively, the ownership of derived tokens 2240 may be encoded in the derived tokens 2240 themselves and/or recorded on blockchains. In the situations where tokens include ownership data, they may include digital signatures by previous owners, transferring the ownership of the tokens 2200, 2240 to the new owners, including but not limited to the owners of the derived tokens 2240.

Systems operating in accordance with a number of embodiments may create incentives for early investors to identify valuable content, including but not limited to content that is likely to become trendy. By incentivizing investors, systems may help artists promote content. For example when a recognized early investor makes an acquisition of an art piece: the fact that this art piece becomes associated with this investor may make the art piece more valuable to other users who may then be willing to pay more for it. Such arrangements can benefit the artists as well as each early investor who successfully identifies what content is likely to become valuable. This may enable content recommendation methods, wherein the brand of early investors can be associated with the content they buy, thereby acting as recommendation mechanisms.

Systems operating in accordance with numerous embodiments of the invention may utilize roles that can be associated with royalties (in royalty policy elements): influencers. In some examples, systems may select influencers from lists of pre-registered influencers associated with service providers tied to content creators. Rules associated with such systems may identify that any sales and/or conversions associated with tokens that preapproved influencers generate from individual tokens can qualify for rewards. An example reward can be a percentage of sales related to this derived token. Thus, the notion of derived tokens, disclosed in U.S. patent application Ser. No. 17/808,264, titled "Systems and Methods for Token Creation and Management," filed Jun. 22, 2022, incorporated by reference in its entirety, can be used for an influencer to attach associations with tokens through influencer identifiers. For example, this may be done by including influencer identifiers and/or references to them in derived tokens that reference the original tokens. The original tokens may include the relevant royalty policy data and/or a reference to them. As users interact with the derived token(s), their interactions may be recorded. When interactions, including but not limited to rendering a token and/or performing a purchase related to a token, are recorded a reward can be generated for the influencer(s) associated with the token. Rewards may depend on the type and quantity of interactions matching a rule in the royalty policies of the tokens.

Figure 23:
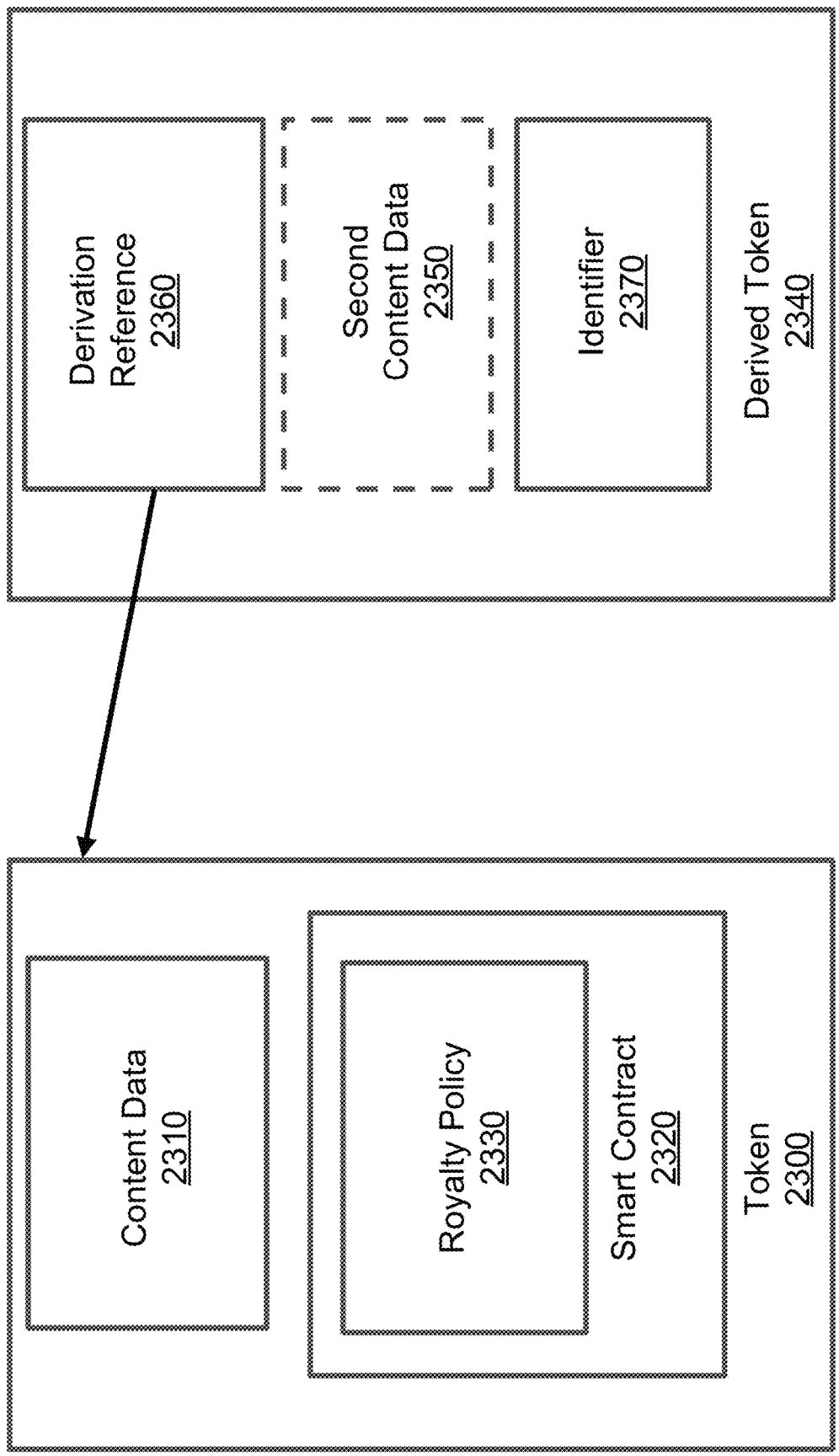
FIG. 23 illustrates a system enabling the use of royalty sharing with influencers in accordance with some embodiments of the invention.

A system enabling the use of royalty sharing with influencers (and other promoters) in accordance with some embodiments of the invention, is illustrated in FIG. 23. Tokens 2300 generated by content creators may include, but are not limited to first content data 2310 and a smart contract 2320, which in turn includes a royalty policy 2330. The royalty policy 2330 may state that when users with influencer identifiers matching identifier 2370 promote the token 2300, then the user(s) corresponding to the identifier 2370 can qualify for royalties.

The right to royalties may be based on actions taken relative to derived tokens 2340 generated by this user, and derived from token 2300. Under systems operating in accordance with many embodiments of the invention, as indicated above, derived tokens 2340 can include derivation references 2360 indicating they are derived from the original token 2300. Derived tokens may include second content data 2350 which may be caused by a combination of content related to first content data 2310 and content added in the derivation (e.g., second content data 2350). For example, the second content data 2350 may be a movie in which an influencer says that "this is a great product" and shows the product, after which an advertisement of the product, corresponding to first content data 2310, is shown. When rendering derived tokens 2340, the combined movie may be played.

Derived tokens 2340 can include one or more identifiers 2370. For example, the first content data 2310 may include a reference that enables a purchase to be made by a view of content corresponding to the first content data 2310. User Alice may render derived token(s) 2340, causing the combination of content corresponding to first content data 2310 and second content data 2350 to be played on Alice's terminal. Alice may like the advertised product and indicate that she is interested in making a purchase. This request can cause information associated with the initial token 2300 and the derived token 2340 to be transmitted to sellers, and the sale recorded. The information recorded about sales may include but is not limited to at least a portion of the identifier 2370. In accordance with certain embodiments, this information can correspond to a statistics token as is disclosed in U.S. Provisional Patent Application No. 63/279,146, titled "Usage Statistics Tokens and Applications," filed Nov. 14, 2021, which is incorporated by reference in its entirety.

The royalty policy 2330 may state that users with identifier 2370 can be provided royalties in response to a sale. Therefore as the seller receives the payment from Alice, a portion of this payment may be assigned to the identifier 2370, causing the influencer to be paid. Royalties do not need to be tied to sales and can also be tied to other events, including but not limited to rentals, requests for information, creation of accounts, etc. In accordance with many embodiments, the qualifying event(s) tied to the payment of royalties may be the generation of tokens derived from the derived token 2340. For example, this may happen through user Alice retweeting the derived token 2340 and/or retweeting references to it.

Systems and techniques directed towards enabling royalty payment, in accordance with some embodiments of the invention, are not limited to use within NFT platforms. Accordingly, it should be appreciated that applications described herein can be implemented outside the context of an NFT platform network architecture and in contexts unrelated to royalties concerning fungible tokens and/or NFTs. Moreover, any of the systems and methods described herein with reference to FIGS. 22-23 can be utilized within any of the NFT platforms described above.

C. Abuse Safeguards within NFT Platforms

Systems operating in accordance with various embodiments of the invention may protect content creators against abuses in relation to the dissemination of royalties. Specifically, systems may prevent entities from evading royalty policies by transferring ownership between two parties without the involvement of marketplaces and/or smart contract execution (e.g., "private sales").

Additionally or alternatively, systems operating in accordance with various embodiments of the invention may be configured to detect evolution attempts in relation to tokens. Evolution is disclosed U.S. patent application Ser. No. 17/933,659, titled "Systems and Methods for Token Content Unlocking, Biometric Authentication using Privacy-Protecting Tokens, Ownership-Based Limitations of Content Access, Policy-Based Time Capsule Technology, and Content Lock Mechanisms," filed Sep. 20, 2022; U.S. patent application Ser. No. 17/823,014, titled "Methods for Conditional Transaction Tokens, Secure Sharing of Token Assets, Wallet Spam Protection, and User Interfaces for Acceptance of Terms," filed Aug. 29, 2022; U.S. patent application Ser. No. 17/929,894, titled "Methods for Evolution of Tokenized Artwork, Content Evolution Techniques, Non-Fungible Token Peeling, User-Specific Evolution Spawning and Peeling, and Graphical User Interface for Complex Token Development and Simulation," filed Sep. 6, 2022; U.S. Provisional Patent Application No. 63/254,062, titled "Token Evolution with Physical Embodiment," filed Oct. 9, 2021; and U.S. Provisional Patent Application No. 63/291,411, titled "Robust Personalization with Applications to NFT Evolution," filed Dec. 19, 2021, incorporated by reference in their entireties.

Triggering events for royalty requirements may take various forms. In one example use, the triggering event may be a known time, such as midsummer 2023 at noon EST. In another example use, the triggering event may be unknown, and maybe not be possible to determine by inspection of the NFT and its policies. Royalty requirements may, for example, rely on triggers provided by oracles, wherein the oracles compute functions that are not publicly known. In such cases, the oracle-computed functions may be verified through entities including but not limited to the creator(s) of the tokens.

Upon detection, systems operating in accordance with certain embodiments may implement various defense mechanisms including but not limited to: determining that tokens have been (or are in the process of being) transferred without royalties having been paid; performing verifications to determine whether royalties should have been paid; and performing security actions when the verification indicates that royalties should have been paid. Security actions can optionally be reversed when appropriate royalties have been paid. Alternatively or additionally, security actions may return tokens to their creators; burn tokens; and/or forward tokens to escrow-like accounts where the asset(s) may await further processing by authorities.

Figure 24:
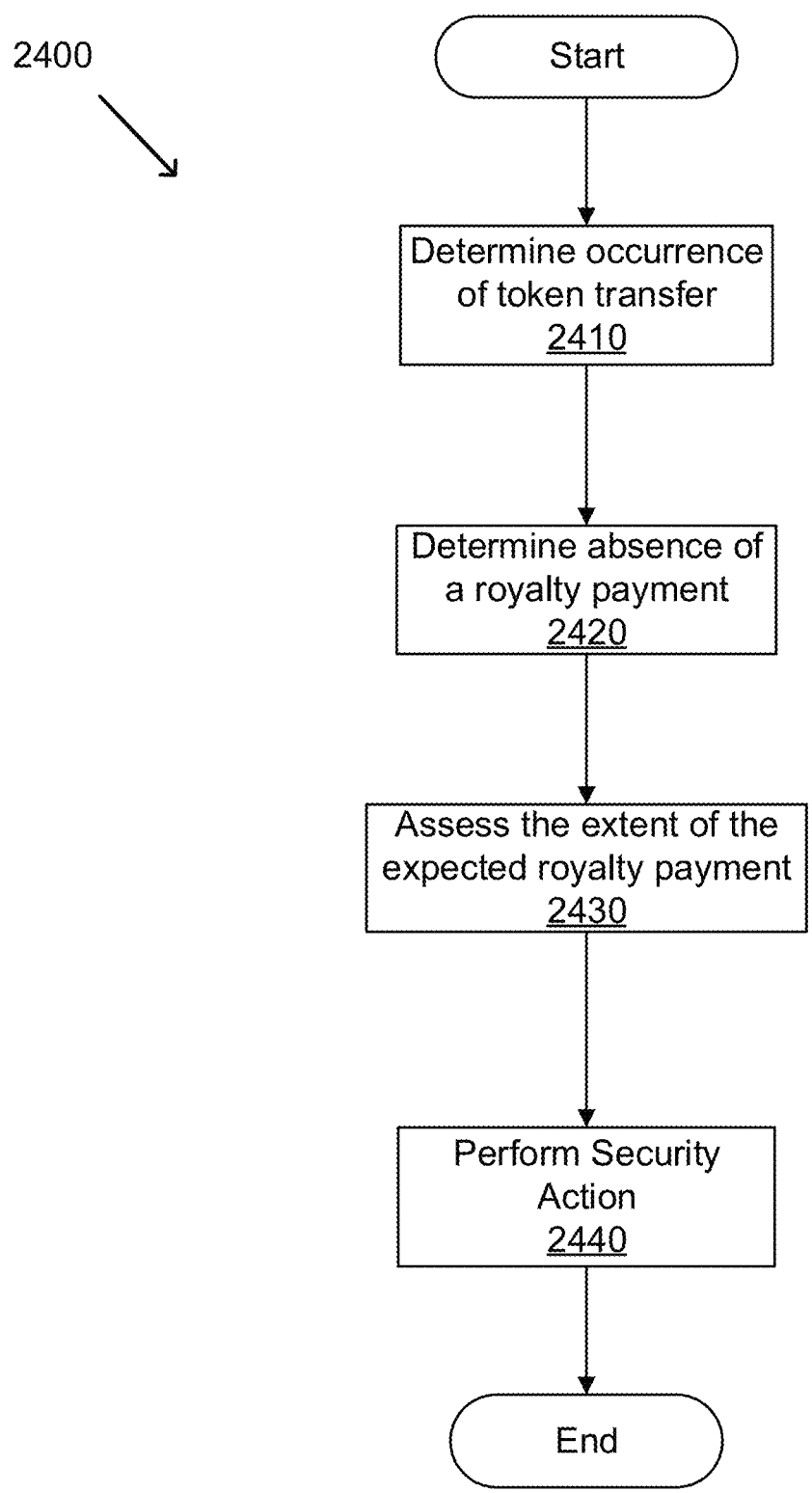
FIG. 24 conceptually illustrates a process followed by abuse safeguards operating in accordance with numerous embodiments of the invention.

A reflection of the process followed by abuse safeguards operating in accordance with numerous embodiments of the invention is illustrated in FIG. 24. Process 2400 determines (2410) the occurrence of token transfers of ownership. Determinations may be performed by, but are not limed to inspection of blockchain records indicating ownership transfers of tokens (such as NFTs). Inspections may be performed by parties with read access to the relevant blockchains. Inspections may be performed by, but are not limited to Digital Rights Management (DRM) modules of digital wallets, where the associated wallet is involved in the transaction(s). Process 2400 determines (2420) that a royalty was not paid. These determinations relative to transactions may be done by inspections of blockchain records and/or royalty records indicating transfers of ownership and/or funds. Additionally or alternatively, systems operating in accordance with certain embodiments of the invention may match senders, recipients and/or amount information of the expected royalties associated with the relevant transactions (e.g., ownership transfers). Process 2400 assesses (2430) the extent of the expected royalty payment. Royalties may be assessed by inspection of payment records, specifically by matching the ownership transfers of the tokens determined in step (2410). Systems may determine the royalties that should be paid by way of the royalty rate(s) specified in the smart contract(s) of the token(s) whose transfer(s) were determined in step (2410). Process 2400 performs (2440) a security action. Security actions may include, but are not limited to reporting an event, blacklisting a wallet, blacklisting users (e.g., a buyer and/or seller), reporting digital wallets and/or users to authorities, causing digital wallets associated with abuse to receive degraded service, blocking actions taken by offending digital wallets (including actions involving evolution), levying of penalties on misbehaving users etc. Combinations of the above actions may be taken. Actions may be taken by a variety of parties, including but not limited to marketplaces, service providers, content creators, digital wallets complying with standards requiring adherence to royalty payment policies, etc. In accordance with some embodiments, multiple actions can be taken by multiple parties, upon the detection of likely abuse. Parties for whom security actions are applied can, in some instances, appeal the security actions to the system by providing evidence that its actions were not inappropriate.

Systems and methods in accordance with some embodiments of the invention, when initiating security actions, may prevent the transfer of tokens. Transfer prevention may be based on policies specifying how the relevant tokens can be transferred. For example, tokens may specify that they are tied to a given biometric identification, not allowed to be severed unless a triggering event takes place. Biometric identifications may be expressed by biometric tokens. Triggering events may refer to, but are not limited to, specified actions (e.g., the sale of the token); the passing of predetermined durations (e.g., 5 years) from the time of specified actions; the deletion of system accounts, indicating the death of their owners; specified signals obtained from specified oracles, etc. Biometric tokens are disclosed in co-pending applications U.S. patent application Ser. No. 17/808,264, titled "Systems and Methods for Token Creation and Management," filed Jun. 22, 2022; U.S. patent application Ser. No. 17/933,659, titled "Systems and Methods for Token Content Unlocking, Biometric Authentication using Privacy-Protecting Tokens, Ownership-Based Limitations of Content Access, Policy-Based Time Capsule Technology, and Content Lock Mechanisms," filed Sep. 20, 2022, incorporated by reference in their entireties. The tokens for which transfers are prevented may, additionally or alternatively, be tied to various different types of authentication tokens.

In accordance with a number of embodiments of the invention, security actions may involve placing token identifiers on blocklists. Blocklists may be used to signal that lists of compliant exchanges will refuse to transact using tokens added therein. For example, by placing a crypto funds token identifier, such as its associated public key, on a blocklist, the blocklist may inform other users that the crypto funds token cannot be used as acceptable payment (on particular exchanges). Additionally or alternatively, adding NFTs to blocklists may inform users that they may not initiate and/or request transactions using those NFTs.

In accordance with some embodiments, security actions may involve reporting digital wallets, buyers, and/or sellers to authorities. Authorities may include but are not limited to tax authorities, mediators, representatives of content creators, etc. Reporting digital wallets, buyers, and/or sellers may enable parties to take legal actions against abusive parties.

In accordance with many embodiments, security actions can be chosen from a variety of possible security measures. Some (or all) token functionality may be made unavailable. In such cases, only a low-resolution version may be made available for rendering, and not a high-resolution version. Additional ownership transfers, using compliant services and methods, may be denied, and/or may require the unpaid royalty, potentially with a surcharge, to be paid. The content of NFTs may be blacklisted so that other players cannot play the content. One approach of doing so is disclosed in co-pending application titled U.S. patent application Ser. No. 17/933,659, titled "Systems and Methods for Token Content Unlocking, Biometric Authentication using Privacy-Protecting Tokens, Ownership-Based Limitations of Content Access, Policy-Based Time Capsule Technology, and Content Lock Mechanisms," filed Sep. 20, 2022, incorporated herein in the entirety, wherein suppression of content is disclosed based on externally applied rules. One such externally applied rule may be related to the security actions. For example, security actions may cause content to not be rendered in compatible browsers, and/or be blocked from being delivered to browsers. Certain security actions may cause content to be blocked from evolving, spawning and/or peeling. Many other types of limitations can be placed on tokens, on the token content, and/or on the token functionality. In accordance with some embodiments, the selection of security actions may depend on rules. Such rules may be based on, but are not limited to risk scores that may be measures of the extent to which transfers are assessed to be undesirable; and/or the estimated value of the transaction. In accordance with some embodiments, rules may be used to determine whether other security actions were successfully applied.

Security actions can be taken directly by digital wallets. When digital wallets refuse to take security actions in compliance with one or more policies, then such digital wallets may be blacklisted. Blacklisted digital wallets may be refused from performing transactions, including but not limited to purchases, sales and/or evolutions. Marketplaces may be in charge of determining whether given brands of digital wallet, versions of digital wallet, and/or instances of digital wallet are out of compliance, and level penalties on such digital wallets. For example, certain marketplaces matt be configured to refuse non-complying digital wallets. Additionally or alternatively, marketplaces that do not comply with such constraints may, in turn, be penalized by other entities, including but not limited to wallets in compliance with policies.

When undesired transfers occur, such as transfers that should have involved the royalty payments, systems operating in accordance with numerous embodiments of the invention may enable detection by digital wallets and/or bounty hunters. As indicated above, users may be identified by their wallet identifiers. Therefore determinations can be made that tokens have been transferred, for example, using the digital wallets used to render, transfer and/or otherwise take actions relative to the tokens.

Digital wallets may determine token transfers by accessing public ownership records, including but not limited to blockchains. For example, a digital wallet may determine that a token is currently associated with a public key that is different from a previous public key it was associated with, and confirm that no royalty payment has been made in the meantime. Additionally or alternatively, royalty payments can be confirmed by accessing public databases and/or proprietary databases, including but not limited to databases that record payments to content creators.

Detections of undesired transfers can, additionally or alternatively, be made by scripts associated with the relevant tokens. For example, detection measures may take the form of executable scripts that are referenced by the corresponding tokens. Detections of undesired transfers can be done as tokens are being used, and/or independently of the functionality of the digital wallets they are stored in. Scripts may be used, for example, to perform verifications. Conditional on the success of verifications, scripts may be configured for decrypting content associated with the tokens. Scripts may be executed in trusted execution environments (TEE), and/or be part of the inputs to digital rights management (DRM) modules. As in the example above, detections can be performed using combinations of public records and private records.

Additionally or alternatively, detections can be made by third-party computational entities, which may be referred to as "bounty hunters". Bounty hunters are disclosed in U.S. Pat. No. 11,017,036, titled "Publicly Verifiable Proofs of Space," filed Mar. 14, 2019; and U.S. patent application Ser. No. 17/808,264, titled "Systems and Methods for Token Creation and Management," filed Jun. 22, 2022, incorporated by reference in their entireties. Bounty hunters may be used for, but are not limited to, enforcing reporting requirements, fact-finding, etc. Bounty hunters can be incentivized to participate in such efforts by natural vigilance, by being directed by representatives of content owners, and/or by receiving incentivizes (e.g., cash prizes) provided as they report abuse. Bounty hunters may scan public records to identify ownership changes, and then flag those for which no associated royalty payment has been recorded. As the bounty hunters may be incentivized by rewards to report any and all transfers as having no associated royalty payment, in accordance with some embodiments, bounty hunters may be required to stake, deposit, and/or lock up assets in order to participate in the enforcing of reporting requirements. In such cases, the assets may be reduced and/or seized as a penalty for making incorrect determinations of abuse. Such penalties may vary, depending on whether the incorrect determination is made accidentally and/or willfully.

In accordance with many embodiments, tokens may represent licenses for assets used on websites, marketplaces, and/or platforms. In accordance with a number of embodiments, royalty payments may be governed by one or more licenses. These assets might be licensed for a single URL, and/or for multiple URLs owned by entities and/or organizations. The assets may be tagged and uniquely identified using embedded codes. Scanners may be used to detect when these assets are present on unlicensed sites, marketplaces, and/or platforms. Scanners may be deployed by entities including but not limited to bounty hunters and/or licensors. Additionally or alternatively, tokens may represent licenses for software installed on one or more machines. Methods and variants of determining that ownership has changed without the proper payment of royalties may be utilized individually or in tandem.

Additionally or alternatively, mechanisms to prevent ownership transfers that are unauthorized can be implemented. In accordance with some embodiments, tokens may include smart contracts that cause the transfer of ownership rights to pre-specified parties, including but not limited to token creators, when transfer conditions are not met. For example, a condition may be that all royalties have been paid in previous transfers. Such smart contract clauses may be applied to discourage abuse involving non-payment of royalties. Other methods of discouraging and/or blocking unauthorized transfers can be implemented by the smart contracts of tokens.

In accordance with a number of embodiments, tokens may not require the payment of royalties when transferred from one address to a second address in certain cases. For instance, the addresses may be determined to be hierarchically determined using non-hardened public key derivation. Alternatively or additionally, methods, where sets of public keys can be demonstrated to belong to the same digital wallet (i.e. derived from the same seed phrase and/or private key), may be utilized. Such methods may be utilized without revealing any private keys. In some embodiments, these methods of determining hierarchy and/or derivation may rely on zero-knowledge proofs.

In accordance with various embodiments, some types of transfers may be permissible without the payment of a royalty. For example, users may be permitted to transfer tokens from one wallet address to another, provided the ownership structure of both wallets is the same and/or overlaps according to some policy. One or more rules identifying permissible royalty-free transfers of ownership may be expressed in policies. These policies may be expressed and/or referenced in the token(s), affirmed by the entities performing the determinations, and/or be related to jurisdictions associated with the location of residence of the digital wallet owner(s). The determination of whether the policies are satisfied may be governed by heuristic techniques, which may be expressed using machine learning (ML) scripts.

In accordance with certain embodiments of the invention, verifications of detected transactions can be performed in a variety of manners. For example, a rule may specify that users are allowed to transfer ownership rights to a wallet with the same owner. The verification associated with such a rule may determine whether two addresses belong to the same user, according to heuristic approaches including but not limited to determining associations to social media profiles, the geolocation associated with related wallets, and/or by other means, some of which may require biometric identification, provision of additional documentation, etc. The scrutiny associated with verifications may depend on the estimated value of the transferred resource. The transfer of tokens with estimated values over a threshold (e.g., $250) may require more stringent verification involving more steps. Verification mechanisms configured in accordance with some embodiments may use, but are not limited to machine learning techniques, anomaly detection methods identifying the likelihood of the two wallets belonging to the same user based on past transactions, etc.

In accordance with some embodiments, verifications may, additionally or alternatively, assess risk of events other than the evasion of royalty payments. Such risk assessment may be performed independently of verifying whether royalties were paid and/or should have been paid. For example, another example verification may assess the risk of a transaction being associated with an unwanted activity including but not limited to money laundering, drug sales, licensing fees, and/or tax evasion. Based the outcome of the verification, systems operating in accordance with many embodiments may initiate security actions. Such security actions may depend on but are not limited to the jurisdictions associated with one of the wallets involved; whether the wallet(s) have been registered; and/or other status information associated with the transaction. Digital wallets can be registered by, but are not limited to, associating them with biometric identifiers and/or the users' jurisdictions; by associating the wallets with enterprises; by associating the wallet with the ownership of the wallet to a third party, like a law enforcement entity, a tax authority, etc.

In accordance with several embodiments, an assessment of a transaction being associated with unwanted activity may be made based on prior transactions with the addresses used in the present transaction. Upon review, systems operating in accordance with several embodiments may affirm whether the addresses have been connected with and/or flagged as being associated with unwanted activity. Such connections may be direct, for example, the receiving and/or sending address may previously have sent and/or received assets from a flagged address. Connections may be indirect, for example by the address being present in a chain of transactions, for which one or more of the senders and/or recipients have been flagged. Addresses may, in some embodiments, be ranked with scores and/or weighting, based on factors including but not limited to the number of flagged transactions and the distance of the address from such flagged transactions. Verifications may fail when addresses fail to meet a given threshold of certainty. Thresholds may be set by, but are not limited to, set per asset, set per asset class, and/or set per asset instantiating contract. Additionally or alternatively, verification may be based on the length of time that has passed since the flagged transaction and/or transactions occurred.

Verifications that fail may result in their own security actions. For example, it may be confirmed that tokens have not triggered royalty requirements and/or experienced ownership transfers even though there has been a transfer between digital wallets. Systems operating in accordance with numerous embodiments may then require the relevant user to tie the two associated wallets to the same ownership data. Digital wallets may be associated with the same ownership data by the generation of digital signatures, verifiable using the public key of one of the digital wallets, on a statement that specifies that the owner of one wallet may transfer ownership rights of items in the other wallet. In such cases, subsequent transfers may be initiated by signing ownership transfer statements using the private key associated with the public key associated with at least one of the wallets. Digital wallets may be tied mutually and/or in only one direction. The limitations on tying digital wallets may be based on policies. In accordance with some embodiments, additional ways of associating a first wallet with a second wallet can be performed. One example may be for wallet A to enable wallet B to have some access rights to elements of wallet A, where such rights can be modified using a challenge-response protocol. Such an approach was disclosed in U.S. Provisional Patent Application No. 63/300,202, titled "Dependent Wallet Technology," filed Jan. 17, 2022, incorporated by reference in its entirety. Should security actions not be taken by the associated user(s) within a set period of time (e.g., 24 hours), then additional security actions may be initiated.

Security actions can be reversed once the appropriate royalty has been paid. This can be done in a variety of ways, including but not limited to removing token identifiers from blocklists used to suppress functionality associated with tokens. The determination of what constitutes appropriate royalties can be made in a variety of ways, including but not limited to determining the recent sales price of related tokens in the marketplace, along with estimates of trends and error margins.

Some security actions may be non-reversible. For example, one security action may involve burning the underlying token. This can be done, for example, by transferring tokens, and/or tokens, to one or more unusable wallet addresses. The unusable addresses may be publicly listed as burn addresses where the seed key and all transaction capabilities may have been destroyed. Unusable addresses can be created in ways that provide publicly verifiable evidence that somebody knowing the associated private key is unfeasible. For example, evidence may involve generating a random value R from a seed, and declaring that R|R is the public address, where | denotes concatenation. In such a case, it may be clear that this type of address is so unlikely to be generated from a private key that the wallet address is secure. Additional evidence can be obtained by publishing the seed, S, and/or by using the string S|R as the address. Another example of a largely non-reversible security action may be reverting ownership of the token to the original creator(s), subject to abuse prevention. Examples of such abuse prevention may include methods to ascertain that content creators cannot cause the reversing of ownership rights in a malicious manner. Non-malicious intent can be ascertained by reviewing the possible consequences of token policies, block policies and/or combinations of policies that have undesirable effects. Such tasks can be performed by third-party services associated with minting and/or the parties considering acquiring the NFT.

Systems may not be limited to situations in which ownership transfers are performed, as these may not be the only situations with royalty payment requirements. They may also, for example, be required when tokens are rented and/or loaned, regardless of which party pays the royalty. The royalty requirement in an instance where Alice loans an NFT to Bob may be specified by a rule associated with the NFT, for example. The determination that royalty payments are due in such situations may be performed differently from those involving the determination that ownership transfers have been performed. Specifically, the way of determining may depend on the nature of the royalty-associated action. For example, in the example of token rentals, the determinations may be performed by, but are not limited to, digital wallets associated with renters and/or rentees, rendering units associated with the renters and/or rentees, marketplaces that act as intermediaries for renting, the digital wallets of token owners, and/or bounty hunters that collect indications (such as ratings of content) that users (such as Bob) have had access to content (such as the content of Alice's NFT).

In accordance with some embodiments, rendering entities may report fingerprints of content that they are being used to render, where these reported fingerprints may be indicative of content being rendered. Additionally or alternatively, such reports can be used as evidence of use. When these uses are associated with required royalty payments, but no such payment was made, the reports of the uses may serve as indications of the need to penalize (e.g., direct security actions to) parties associated with the content/transactions.

Whereas the focus so far in this disclosure has been on detecting transfers and other actions that do not satisfy royalty policies, the same techniques that have been disclosed can also be used to address transfers and other actions related to tokens, including but not NFTs, where non-royalty policies are violated, ignored, bypassed and/or otherwise not adhered to.

Systems and techniques directed towards protections against royalty abuse, in accordance with many embodiments of the invention, are not limited to use within NFT platforms. Accordingly, it should be appreciated that applications described herein can be implemented outside the context of an NFT platform network architecture and in contexts unrelated to abuse protection for fungible tokens and/or NFTs. Moreover, any of the systems and methods described herein with reference to FIG. 24 can be utilized within any of the NFT platforms described above.

D. Detection of Ponzi Structures within NFT Platforms

Systems in accordance with some embodiments may be able to detect two or more associated tokens for which there is a hierarchical association (e.g., derived and/or spawned tokens). Two tokens may be associated in a hierarchy context when one token is derived from the other token, and/or both tokens are derived from the same parent token. Additionally or alternatively, two or more tokens may be associated with each other when at least one of them includes a reference to the other(s). An example reference type may be one where the "referring" token(s) include a script and/or a content element that depends on data related to the "referred" token.

Token associations can be expressed in terms of tokens that are derived works relative to other tokens. In accordance with many embodiments, token associations may apply to the distribution of royalties. As indicated above, royalties may facilitate a first content producer to create content that a second content producer uses, wherein the first content producer is paid based on the sale, licensing and/or use of content of the second content producer. In accordance with various embodiments, the first content producer, being the recipient of royalty payments, may be referred to the destination. The second content producer, indicating the origin of the royalty payment, may be referred to as the source. In accordance with a number of embodiments, royalty payments may be governed by one or more licenses. For example, usage licenses may provide the right to incorporate music produced by the first producer in the example above into a game that corresponds to tokens created by the second producer.

In accordance with certain embodiments of the invention, tokens can be at least one of a source and a destination. A given token may be the source relative to one token and a destination relative to another token. The terms source and destination may be used to indicate a relationship between tokens. In one example context, the terms may be used to indicate whether the tokens are expected to have a net inflow (destination) and/or a net outflow (source) relative to a current and/or potential configuration.

Systems in accordance with several embodiments may be governed by sets of constraints referred to as limiters (also referred to as limitations in this disclosure). An example limiter may be that a first token can only be used to create 10 derived tokens. Each of the derived tokens may be limited in that each one can only be used to create 10 derived tokens. Thus, while the first token ("the root"), may have up to 10 "children", it may additionally have up to 100 "grandchildren". Limiters for each level (i.e., generation) of the root's derived tokens (i.e., descendants) may have different characteristics. For example, grandchildren tokens may have their own limiters that enable them to create up to 20 derived tokens, each one of which would be a great-grandchild of the root token.

Figure 25:
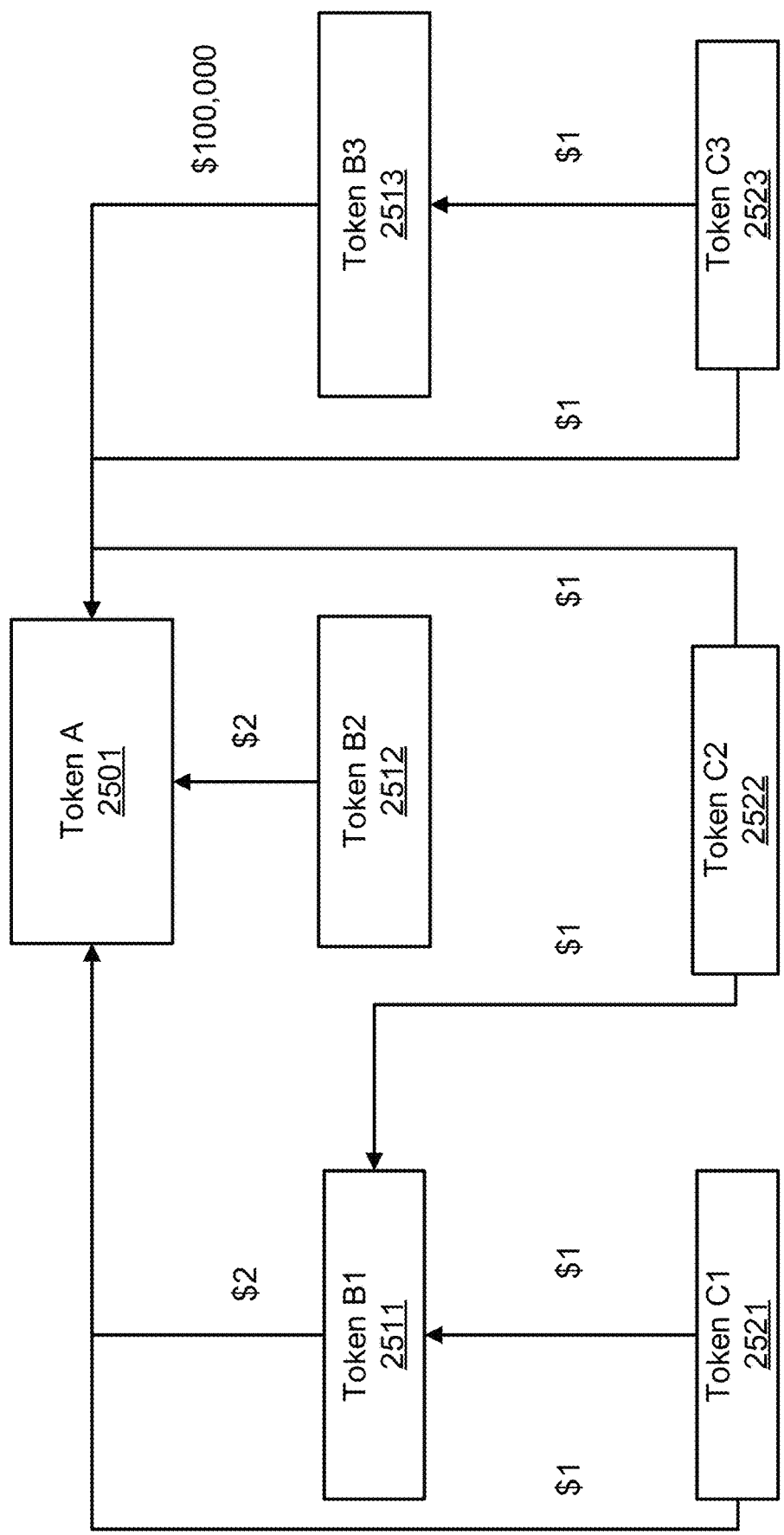
FIG. 25 illustrates a payment flow for a hierarchy of nodes, including sources and destinations configured in accordance with several embodiments of the invention.

An example payment flow for a hierarchy of nodes, including sources and destinations configured in accordance with several embodiments of the invention, are illustrated in FIG. 25. As indicated above, the initial token (e.g., tokens A 2501) may be referred to as the root. Tokens B1 2511, B2 2512 and B3 2513 may correspond to tokens derived from token A 2501. Tokens C1 2521 and C2 2522 are both generated from tokens B1 2511, whereas tokens C3 2523 is generated from tokens B3 2513. Additional tokens may be generated from tokens B1 2511, B2 2512 and B3 2513. Yet additional tokens may be generated from tokens C1 2521, C2 2522 and C3 2523.

Each of the derived tokens in FIG. 25 corresponds to a fee. Fees may be payable as the associated tokens are transferred and/or generated. Prospective fees may be charged for actions including but not limited to changes in ownership, tokens being used to derive other tokens, etc. Tokens B1 2511 and B2 2512 are each associated with a $2 fee, paid to the owner of token A 2501 in exchange for the use of the derived token. Token B3 2513 has a fee of $100,000 associated with it. While generating token C3 2523 is theoretically possible, it is unlikely to come into existence. Specifically, because token C3 2523 would be derived from token B3 2513, generating it would be characterized as using token B2 2512, thereby inducing the $100,000 fee.

As shown in FIG. 25, owners of derived tokens may be tasked with paying fees to multiple entities. Token C2 2522 is derived from token B1 2511, and has two fees associated with it: one fee of $1 associated with token B1 2511 and another fee of $1 associated with token A 2501. That means that when the triggering action, such as sale and/or token derivation, takes place then two actions are performed. One action would require a fee paid to the owner of token A 2501. Another action mat require a fee paid to the owner of token B1 2511.

Limiters may induce constraints on token characteristics beyond the allowable number of derived tokens. For instance, limiters may exist as a side-effect of the costs of acquisition for tokens. In accordance with some embodiments, tokens may be limited such that some derived tokens (e.g., the first twenty) have significantly higher or lower costs than others (e.g., the twenty-first token and after). As an example, each one of the first twenty derived tokens may require a payment of $1 to a third party, like a content creator. Such a configuration may mean that the sales price of one of the first twenty derived tokens would need to be at least $1 to avoid the seller selling at a loss. In contrast, the twenty-first token may require a payment of $100,000 to the third party. In such a case, the configuration may mean that the sales price of the twenty-first token needs to be sold for at least $100,000 to avoid a loss to the seller. In the above example, the twenty-first token may have limiters when compared to the first twenty.

Figure 26:
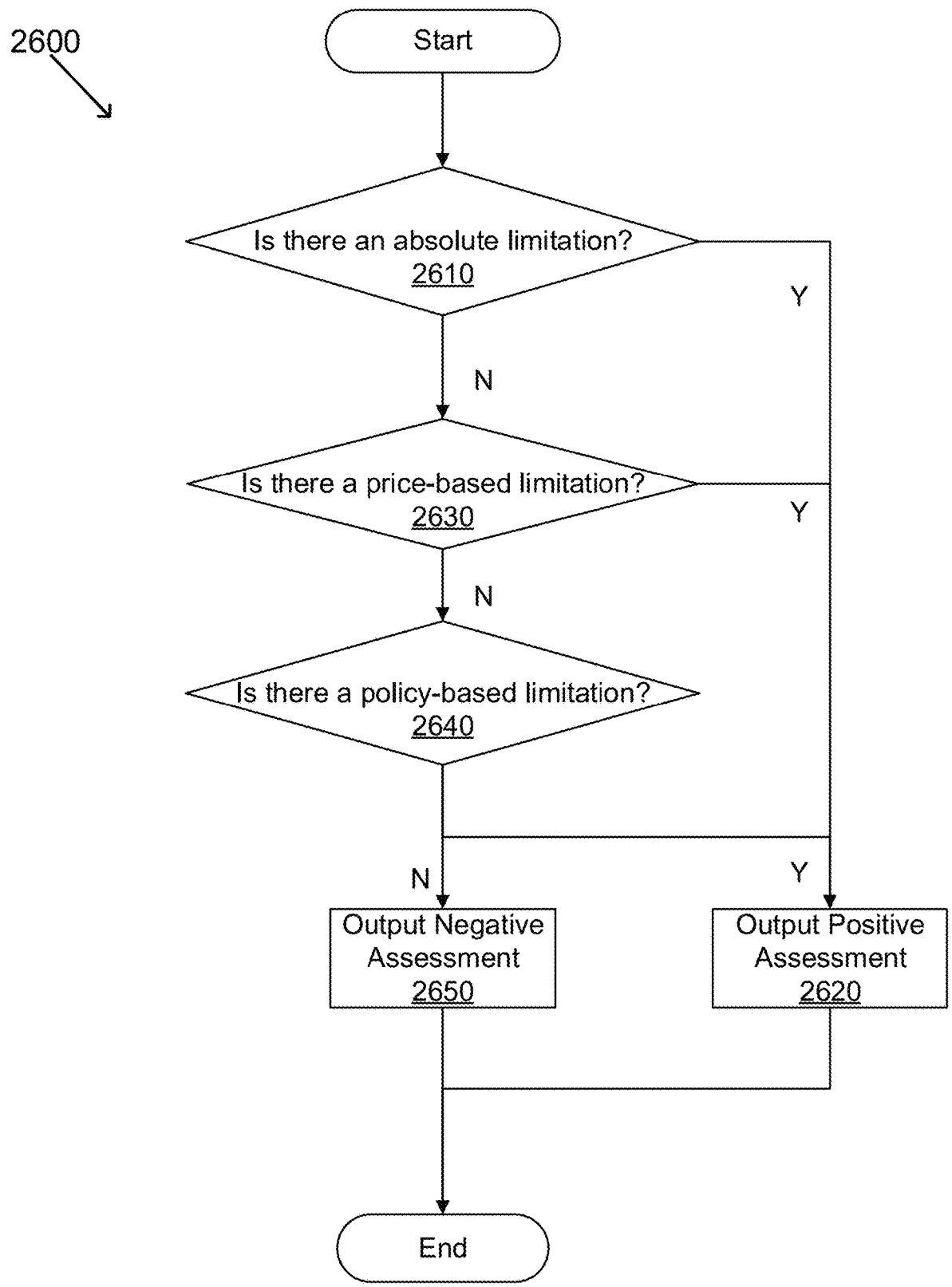
FIG. 26 illustrates a process followed in the identification of limiters, in accordance with various embodiments of the invention.

A process followed in the identification of limiters, in accordance with various embodiments of the invention is illustrated in FIG. 26. As indicated above, limiters may refer to barriers to the generation of and/or ability to attain derived tokens. Process 2600 assesses (2610) whether there is an absolute limitation associated with a first token. Absolute limitations may refer to hardline, non-conditional limitations, such as token policies, that affect the number of descended tokens that may be generated. An example of an absolute limitation may be the policy that only 100 tokens may be derived from a first token. Another example may be that only 100 tokens with a particular property may be derived from the first token, wherein the owners of the derived tokens have some access right and/or some privilege stated in a policy. When the assessment (2610) determines that there is an absolute limitation, process 2600 outputs (2620) a positive assessment.

When there is not an absolute limitation, process 2600 assesses (2630) whether there is a price-based limitation. Price-based limitations in relation to a first token may refer to limitations that affect the fees paid in relation to using the first token. Price-based limitations may be detected through sharp changes in the likelihood of associated fees being paid. The determination of price-based limitations may use thresholds that compare the fees paid by tokens at the same level and/or different levels in the hierarchy. One example price-based limitation may exist where one token has an associated fee of $100,000, while another token of the same generation has an associated fee of $2. Here the token with the $100,000 fee may have a limitation compared to the $2 token. In accordance with some embodiments, price-based limitations may exist when a ratio between fees paid by different tokens exceeds a particular threshold. For instance, when the ratio is greater than 100, there may be a determination that there is a price-based limitation. Other thresholds can also be used, to determine price-based limitations concerning the likelihood of the fee being paid. When the assessment (2630) determines that there is a price-based limitation, process 2600 outputs (2620) a positive assessment.

When there is not an absolute and/or price-based limitation, process 2600 assesses (2640) whether there is a policy-based limitation. Policy-based limitations may concern policies (beyond those concerning the fees paid when the token is used) that nonetheless are likely to impact the decision to generate additional tokens. One example of this may be a policy that states that the owner of a token will receive an amount of $1 per transaction event, unless the number of derived tokens exceeds a certain threshold, after which a significantly smaller amount (e.g., such as $0.001 per transaction event) is received. Another example of this may be a policy that affects the value of any offspring token (e.g., how much fees will be paid to owners from the tokens derived from the first token). For example, token A may specify that derived tokens B1 and B2 will receive $1 in fees for any transaction involving their offspring, whereas another derived token, B3, would only receive $0.0001 in fees. This arrangement may limit the benefit B3 brings, effectively limiting the number of children of token A to two: B1 and B2. Specifically, this is because few users would choose to use B3 when they could use B1 or B2 for far less. When the assessment (2630) determines that there is a policy-based limitation, process 2600 outputs (2620), a positive assessment.

When process 2600 determines none of the three limitation types exist, process 2600 outputs (2650) a negative output, indicating that there is no detected limitation. In accordance with many embodiments of the invention, many variants of the above process may be implemented.

In accordance with a number of embodiments, limiters may associate license costs and/or license availabilities with the right to collect revenues associated with tokens. For example, some rights may come in the form of ownership licenses (and/or assignments). Example ownership licenses may grant the licensee the rights to at least some of the royalties provided in response to token use, including but not limited to, the rendering of content associated with a token; the transferring of rights, such as ownership rights; etc. Thus, licenses may induce costs associated with the acquisition of the associated tokens (e.g., its market price). In this context, ownership rights may correspond to a form of exclusive license. Additionally or alternatively, license availability may indicate whether the associated tokens can be licensed at all.

Systems that operate in accordance with some embodiments of the invention may implement techniques to identify popularity. Popularity may correspond to the compound value and/or expected value, of license agreements associated with certain tokens. Songs licensed to be used in many contexts (such as games, movies, etc.) may have higher popularity measures than completely unlicensed songs. When the actual royalties paid are not known, systems may estimate royalties based on factors including but not limited to the stated license costs and estimated number of uses in derived works. Thus, when the cost of tokens are not known, the estimated popularity may be used as a proxy for the cost. One reason cost may not be known is that the owner of the associated resource (e.g., token) is not interested in selling the resource. Another reason may be that the owner sets the price much higher than anybody is willing to pay, precluding there from being many interested buyers. When comparing two tokens and finding that the first token has a more restrictive limiter, systems may determine that the first token is more popular than the second token on the basis that popular items, including tokens, are more valuable to investors.

Detection mechanisms operating in accordance with many embodiments of the invention may be configured to affirm that particular token hierarchies, and the corresponding fees, do not promote fraudulent activities including but not limited to Ponzi structures. Given collections of multiple associated tokens, mechanisms may be configured to identify attributes indicative of fraud. For example, the mechanisms may identify occurrences including but not limited to, there being fewer limitations than tokens in the hierarchy, that the limiters are more restrictive for tokens that are sources than tokens that are destinations, etc.

Being more restrictive may, in accordance with some embodiments, correspond to having greater associated costs of acquisition. An example that may be a Ponzi structure involves a first resource (e.g., a song) associated with a first token, and a second resource (e.g., a game using the song) associated with a second token, where the second token has a lower acquisition cost than the first token. Instances where a license to the second token causes a payment not only to the owner of the second token but also to the owner of the first token, may be indicative of Ponzi structures, although may not automatically be evidentiary.

One similar, but non-Ponzi, scenario may involve a famous song that has a very high acquisition fee (such as $2 M), wherein the acquisition fee is the cost of buying a token that includes the ownership rights to the song. Additionally or alternatively, a derived work, such as a game in which the famous song is used, may, like the earlier example, have a lower acquisition fee, such as $100 k for a game that is not well known. However, the acquisition fee may represent the cost not to acquire the rights to play the game, but to own it. For example, the rights to a portion of the profits due to in-app purchases may function as an example ownership right. The fact that the acquirer of the second token may then be the sole recipient of any royalties stemming from the licensing and/or use of the derived work (i.e., the game) may preclude Ponzi classification by mechanisms operating in accordance with some embodiments of the invention.

Detection mechanisms configured in accordance with various embodiments of the invention may determine the presence of limiters for at least one token among a plurality of tokens, on the basis that individual destination tokens tend to be tokens with one or more limiters. For example, token A may have a limiter that makes it possible and/or practically meaningful to generate up to 100 derived tokens from token A. In such cases, the derived tokens may have some particular property such as including and/or referring to content related to the content of the ancestor token (tokens from which a derived token was directly or indirectly derived). In relation to token A, we may refer to these derived tokens as tokens B1, B2, . . . B100.

Each one of these tokens (e.g., B55) may be associated with a limitation that makes it possible and/or practical to generate their own 10 derived tokens. The derived tokens generated from B55 may be referred to C1, C2, . . . C10. Token C2 may have a limiter that makes it possible and/or practical to generate 10 tokens from C2. In contrast, token C3 may have another limiter that may only make it possible and/or practical to generate 9 tokens from C3. In accordance with many embodiments of the invention, it may be "impossible" to generate a derived token, when the number of derived tokens has reached a hard (i.e., absolute) limitation. In accordance with some embodiments of the invention, it may be "impractical" to generate a derived token when the number of derived tokens have reached a threshold, beyond which generating more would carry a dramatically increasing price and/or drastically reduced benefit (i.e., price-based limitation and/or policy-based limitation).

Detection mechanisms operating in accordance with a number of embodiments may identify royalty patterns wherein the sale and/or licensing of tokens cause payment to ancestor tokens and/or tokens higher up in the hierarchy. For example, using the example above, C2's ancestors are B55 and A, while the tokens above C2 in the hierarchy are B1, B2, . . . B100, and A. Thus, these detection mechanisms may facilitate payments to parties possessing tokens from which a given tokens was derived and/or tokens on levels above the given token.

Detection mechanisms operating in accordance with certain embodiments of the invention may be used to identify the possibility of a number of levels (i.e., token generations) exceeding particular thresholds. For example, in the example above based on tokens A, there may be four levels mentioned—the level on which tokens A is; the level on which B1, B2, . . . B100 are; the level on which C1, C2, . . . C10 are; and the level on which the potential children of C2 and/or C3 are. However, additional levels may exist. Some tokens and collections of tokens may have no limiters on the number of levels (whether absolute, price-based, and/or policy-based). Some tokens and collections of tokens may have very large limits on the number of levels (e.g., 100).

Assessments of how "large" particular limits are can be determined based on the number of possible tokens that can be generated. For example, a simple collection of tokens may follow a tree-based structure where each token has a limiter of 2 (i.e., a binary tree). In circumstances where the number of levels are limited to 100, this means that the tree may include on the order of $2^{100}$ ($1.26*10^{30}$) nodes, where each node is a token. In accordance with several embodiments, limits at such levels may be considered effectively infinite, (i.e., it is not likely that the full capacity of the tree will ever be reached by the generation, use, and/or sale of all possible tokens). In contrast, when the maximum number of levels for the binary tree is 6, that may mean that $2^7-1$ (127 tokens) can be generated. As it is entirely plausible that all those tokens can be generated, used, and sold, the limitations may be far more relevant.

Systems operating in accordance with many embodiments may compare the prospective maximum number of tokens to thresholds (that may be preset). For example, systems may determine one or more levels and/or one or more counts corresponding to the maximum number of tokens that can be derived under those levels. Once this information has been determined, systems may assess whether the possible number of tokens that can be produced exceeds and/or does not exceed the threshold. A more restrictive threshold may be smaller than a less restrictive threshold, which can cause the detection of larger numbers of structures exceeding the threshold. More restrictive (i.e., lower) thresholds may correspond to more sensitive detection mechanisms.

In accordance with certain embodiments, the effectiveness of detection mechanisms may vary with the thresholds used. For instance, mechanisms using very low thresholds (e.g., a threshold of three levels) may be classified as overly sensitive. In such cases, the detection mechanisms may then tend to cause false positives. False positives may lead to the classification of benevolent structures as being Ponzi structures. Additionally or alternatively, mechanisms with very high thresholds, such as the example above, tolerating up to 1000 levels in a binary tree, may be overly insensitive and cause false negatives. False negatives may lead to the classification of Ponzi structures as being benevolent.

Mechanisms operating in accordance with some embodiments may utilize multiple thresholds, associated with believed false positives and/or believed false negative rates. By comparing the collection of tokens, existing and/or prospective, to multitudes of thresholds, the mechanisms can determine estimates of the error rates, including but not limited to false positive and false negative estimates. These estimates may be based on expert-based classifications of structures that were flagged as being Ponzi structures. Additionally or alternatively, estimates may be based on expert-based classifications of structures that were not necessarily flagged by the mechanisms as being Ponzi structures, but which end users later reported as potentially being Ponzi structures. Classifications may be derived through estimates evaluated manually by one or more experts evaluated manually.

Methods of detecting Ponzi structures, initiated by systems operating in accordance with numerous embodiments, may have various configurations. To detect Ponzi structures, one approach may be to first determine a hierarchy for one or more tokens. Based on the determined hierarchy, systems may determine that when, for at least one of the tokens of the hierarchy, there is a payment flow towards owners of tokens above given tokens in the hierarchy. Payment flows may refer to when given tokens are sold, used to generate derived tokens, etc. Third, the system determines that at least some of the levels of the hierarchy have limiters. Typically, but not unanimously, most levels but the last level may be associated with such limiters. Systems may determine when the number of possible levels exceeds a first threshold and/or when the number of possible tokens in the structure exceeds a second threshold. The first and the second threshold may both be associated with an estimated error rate.

Tokens exceeding the threshold may be considered Ponzi structures, which may lead systems to perform responsive actions. Action may depend on the error rates associated with the one or more thresholds that are exceeded, and/or on configurations of the system(s). System configurations may be set by, but are not limited to users, financial institutions evaluating the tokens, service providers processing the tokens, etc. One example action taken by a system may be the banning of some and/or all of the tokens of the determined hierarchy from use on portions of the system. Portions may refer to particular user wallets and/or marketplaces where tokens are bought and sold. Another example action may be the generation of alerts informing others of the Ponzi structure. Alerts may be sent to entities including but not limited to prospective buyers, financial institutions associated with the prospective buyers, insurers, admins of marketplaces, etc.

In accordance with some embodiments, machine learning components may be trained using collections of example token structures. Some token structures may be fraudulent and/or Ponzi structures. Machine learning components may be used to perform one or more of the steps disclosed above, without the use of hardcoded thresholds. Steps can be performed in various orders, beyond the order described in this example.

Figure 27A:
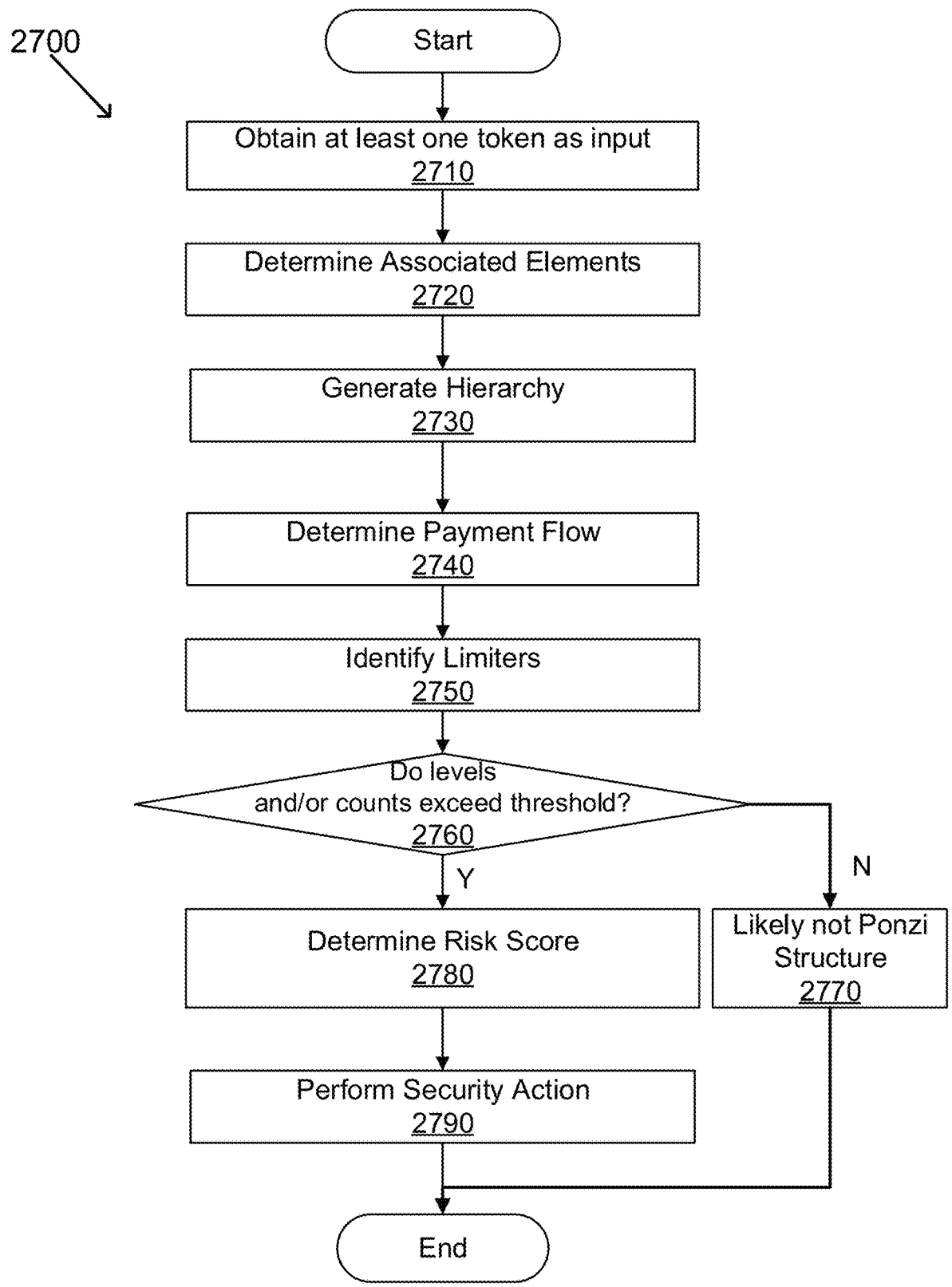
FIGS. 27A-27C conceptually illustrate the process for the detection of a potential Ponzi structure, as initiated by detection mechanisms operating in accordance with numerous embodiments of the invention.

An example of the detection of a potential Ponzi structure, as initiated by detection mechanisms operating in accordance with numerous embodiments of the invention, is illustrated in FIG. 27A. Process 2700 obtains (2710) at least one token as an input. Example tokens may include, but are not limited to NFTs. Process 2700 determines (2720) potential associated elements to the at least one token. Associated elements can be determined based on derivation rules associated with the at least one token. Associated elements may be prospective, and not actually be in existence. In such cases, associated elements may be determined by what their structure would be if they were to exist. Process 2700 generates (2730) a hierarchy based on the at least one token and any associated elements determined in step (2720). The tokens and elements of hierarchies may be referred to as nodes and their connections as edges. Edge can be used by systems operating in accordance with some embodiments to indicate relationships. Process 2700 determines (2740) payment flow data, expressed in terms of edges between the nodes for which the payment flow is identified. Example payment flow determinations are illustrated in FIG. 25. Process 2700 identifies (2750) limiters associated with nodes of the hierarchy. Process 2700 determines (2760) whether the levels and/or the count of nodes of the hierarchy exceed one or more thresholds. When they do not, process 2700 determines (2770) that the structure associated with the hierarchy is likely not a Ponzi structure. Otherwise, the process 2700 determines (2780) a risk score. Risk scores may be determined based on the payment flow and/or the limiters, as indicated below. Process 2700 initiates (2790) a security action. Security actions may be selected based on risk scores computed in step (2780). Example security actions may include but are not limited to blocking the one or more tokens; reporting the one or more tokens to authorities and/or admins; and alerting users of the risks.

Figure 27B:
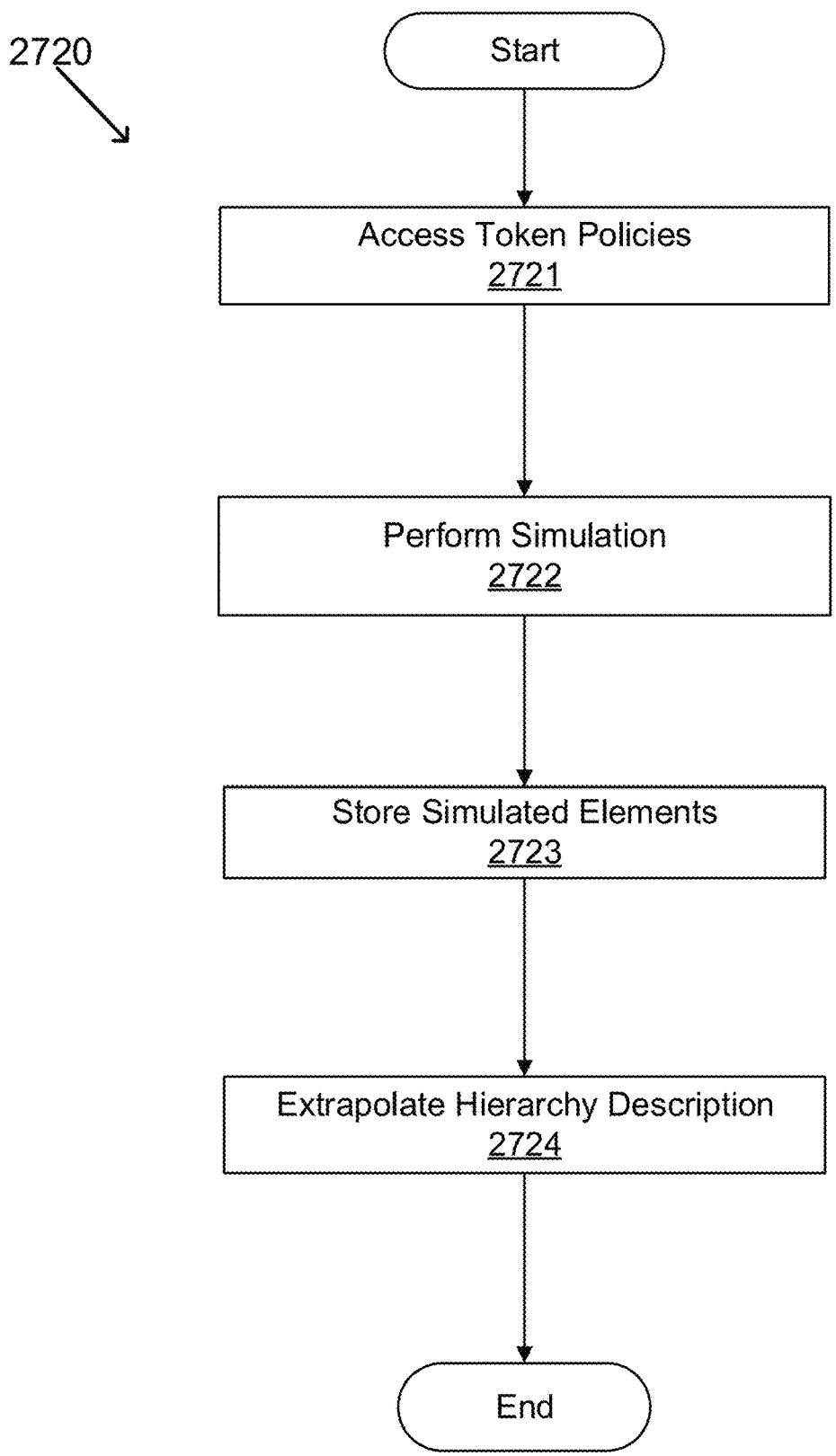

A process followed in determining associated elements relative to an input of at least one token, in accordance with many embodiments of the invention, is illustrated in FIG. 27B. Process 2720 accesses (2721) one or more policies from the set of tokens. When policies are not accessible (e.g., encrypted), but more than one token exists in the set, an estimate of policies may be made based on observed relationships between at least two tokens of the set. Process 2720 performs (2722) a simulation based on the extracted and/or estimated policies. The simulation may result in a collection of tokens that are associated with each other. Simulations may be limited to a threshold number of elements. For some policies, simulations may not be necessary to determine structures. In such cases, descriptions of the hierarchies associated with the tokens may be generated without any simulation. In some instances, some aspects of the hierarchy, such as the maximum number of levels, can be determined without simulations. For example, these aspects may be algorithmically estimated provided the accessed policies as input. Process 2720 stores (2723) simulated elements. Elements may include but are not limited to indications of relationships, optional policies, and optional payment rules. Process 2720 extrapolates (2724) a hierarchy description associated with the stored elements.

Figure 27C:
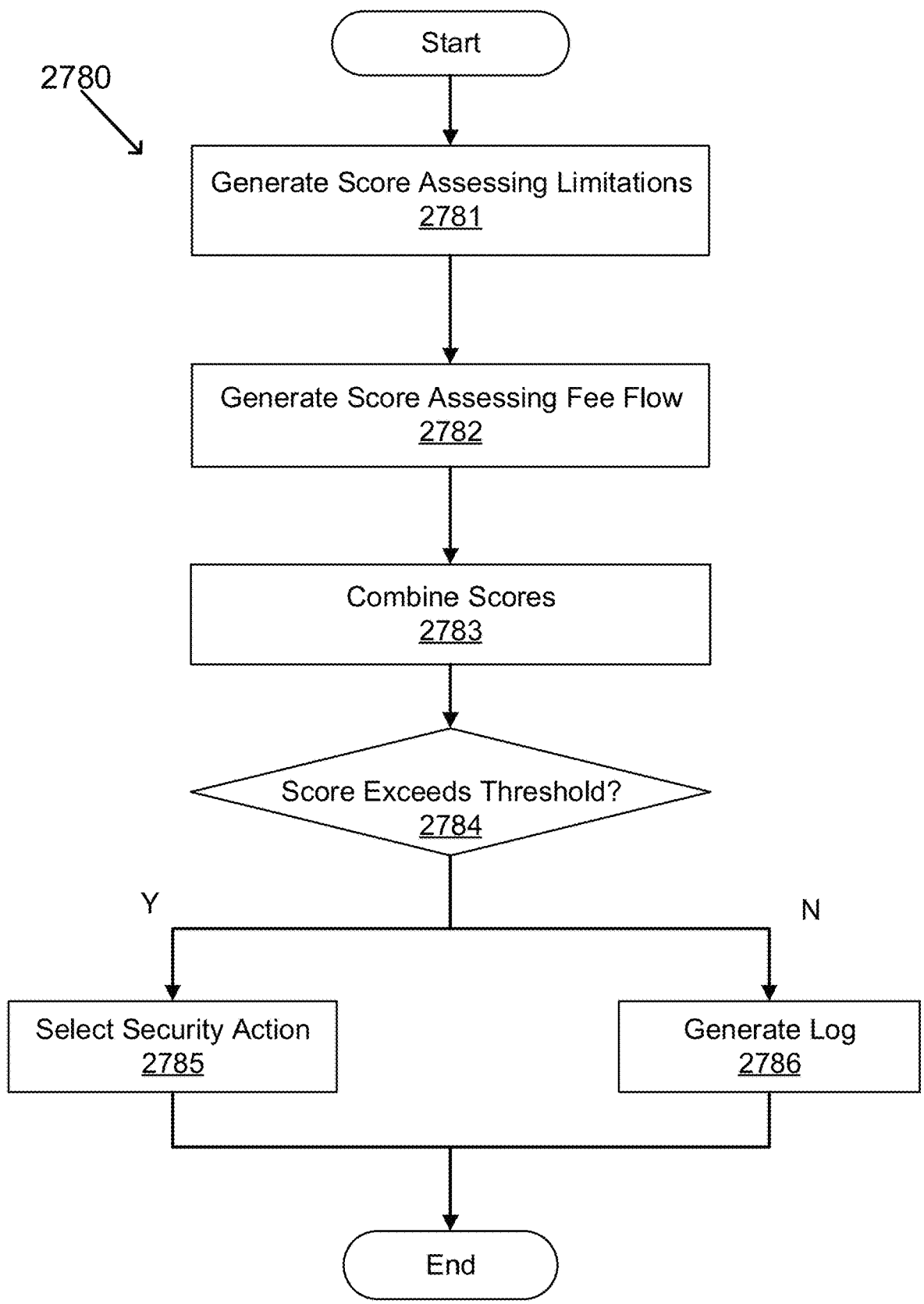

A process followed in the generation of risk scores, in accordance with numerous embodiments of the invention, is illustrated in FIG. 27C. Process 2780 generates (2781) a score that assesses the extent to which limiters are present. Determinations of limiters may be assessed through probability to determine constraints that are "likely limiters." For instance, a likely limiter may be one that is assigned a probability of being a limiter beyond a certain level (e.g., >30%). Using the extreme example disclosed in FIG. 25, the second level of tokens, assessed through comparing the fees faced by token B3 2513 ($100,000) with those faced by token B1 2511 and token B2 2512 ($2 each), may conclude a very high probability of a limiter on that level (i.e., >90%).

Limitation scores may exist on spectrums. An example spectrum may be from 0 to 10 where 0 indicates an absence of limiters, 3 indicates a medium number of likely limiters (which may reflect that 25% of the levels likely have a limiter), 5 indicates a large amount of very likely limiters (which may reflect that there are limiters on every other level), and 10 indicates an excessive number of obvious limiters (which may correspond to limiters on each level, where each such limiter is an absolute limiter. In accordance with some embodiments, levels closer to the root may be weighed more highly. For instance, a large amount of very likely limiters may be concluded from discovering very likely limiters on the first five levels.

Process 2780 generates (2782) a score indicating the fee flow. Fee flow scores may exist on spectrums, where higher scores correspond to higher amounts of fees closer to the root token of the hierarchy. This score may be determined through multiple factors including but not limited to, the number of nodes that face fees, the amount of fees faced by the respective nodes, and whether nodes closer to the root face more fees. A zero score may correspond to no fees to nodes on levels closer to the root, relative to a considered node. A score of 5 may correspond to a large number of moderate fees to most nodes closer to the root. A score of 10 may correspond to a large number of high fees to all nodes closer to the root. Nodes classified as "closer" to the root may be determined relative to a threshold. For example, in assessing closeness, the fee flow score may refer to all nodes within three levels of the root. Many other possible scores and manners of computing the scores are possible, and these are simply illustrative examples.

Process 2780 combines (2783) the score computed in (2781) with the score computed in (2782). Scores may be combined in multiple fashions. One way may be multiplying the two input scores with each other, resulting, using the earlier example, in an output between 0 and 100. Such output may be referred to as a combined score and/or a Ponzi score. Process 2780 determines (2784) whether the score exceeds a threshold by comparing the combined value with the threshold. The threshold may lead to a determination that the limitation frequency and pay flow corresponds to a Ponzi structure. For instance, on a combined scale of 100, a Ponzi structure may be assumed by combined scores exceeding a threshold value of 15.

When the combined value from (2783) exceeds this threshold, then process 2780 selects (2785) a security action, as disclosed above. The security action may depend on, but is not limited to, the combined value, lists of available options, user configurations, and/or admin configurations. When the combined value from (2783) does not exceed this threshold, process 2780 generates (2786) a log, wherein the scores computed in steps (2781) and (2782) are logged, along with other potential data, including but not limited to references to the tokens received.

Systems operation in accordance with various embodiments may be suitable for automated scheme detection with industry-standard machine learning and artificial intelligence platforms whereby detection of schemes among tokens would be prohibitive without machine assistance. Systems disclosed above may not be limited to detection of Ponzi structures and may be applied to any number of fraudulent structures.

Systems and techniques directed towards protections against fraud detection, in accordance with many embodiments of the invention, are not limited to use within NFT platforms. Accordingly, it should be appreciated that applications described herein can be implemented outside the context of an NFT platform network architecture and in contexts unrelated to fraud detection for fungible tokens and/or NFTs. Moreover, any of the systems and methods described herein with reference to FIGS. 25-27C can be utilized within any of the NFT platforms described above.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method to facilitate royalty payments related to changes in access rights associated with a token, comprising:
    embedding a reference to an anchor into an application for utilizing tokens, wherein:
        the reference to the anchor is embedded into the application by combining an executable file with an element of the anchor;
        the anchor further comprises a verifier and an identifier unique to the application; and
        the element of the anchor comprises at least one of: a reference to a library configured with respect to the identifier of the anchor, a sequence of code instructions referencing the identifier, or a binary to be integrated with the application;
    verifying, using the verifier of the anchor, that a token is compatible with the application;
    importing the token into the application;
    associating the anchor with a lock, wherein the lock governs access to content of the token;
    identifying a completed transaction that changes access rights associated with the token, wherein the completed transaction is identified using at least one of a first set of information included in the anchor or a second set of information included in the lock; and
    transmitting, to a party to the completed transaction, a lock value, wherein the lock value, when detected by the lock, allows the party to access the token.

2. The method of claim 1, further comprising:
    transmitting a royalty to a creator of the token after identifying the completed transaction; and
    providing a log of the completed transaction to an application authority that assesses validity of the completed transaction.

3. The method of claim 1, wherein:
    the token is stored in a container on the application;
    the container is encrypted at least in part through the lock; and
    the lock value comprises a decryption key for the container.

4. The method of claim 1, wherein at least one of the anchor or the lock is a digitally signed value.

5. The method of claim 1, wherein the access rights correspond to at least one of ownership rights, usage rights, or lessee rights.

6. The method of claim 1, wherein:
    the application is made accessible in an application marketplace; and
    embedding the reference to the anchor into the application is performed prior to the application becoming accessible in the application marketplace.

7. The method of claim 1, wherein verifying that the token is compatible comprises assessing the identifier of the anchor matches an identifier of the token.

8. The method of claim 1, wherein the token is a non-fungible token (NFT).

9. The method of claim 1, wherein the application is a media wallet.

10. The method of claim 1, wherein the lock comprises a smart contract element that, when executed, transmits a payment to a creator of the application.

11. A non-transitory computer-readable medium storing instructions that, when executed by a processor, are configured to cause the processor to perform operations for changes in access rights, the operations comprising:
- embedding a reference to an anchor into an application for utilizing tokens, wherein:
  - the reference to the anchor is embedded into the application by combining an executable file with an element of the anchor;
  - the anchor further comprises a verifier and an identifier unique to the application; and
  - the element of the anchor comprises at least one of: a reference to a library configured with respect to the identifier of the anchor, a sequence of code instructions referencing the identifier, or a binary to be integrated with the application;
- verifying, using the verifier of the anchor, that a token is compatible with the application;
- importing the token into the application;
- associating the anchor with a lock, wherein the lock governs access to content of the token;
- identifying a completed transaction that changes access rights associated with the token, wherein the completed transaction is identified using at least one of a first set of information included in the anchor or a second set of included in the lock; and
- transmitting, to a party to the completed transaction, a lock value, wherein the lock value, when detected by the lock, allows the party to access the token.

12. The non-transitory computer-readable medium of claim 11, further comprising:
- transmitting a royalty to a creator of the token after identifying the completed transaction; and
- providing a log of the completed transaction to an application authority that assesses validity of the completed transaction.

13. The non-transitory computer-readable medium of claim 11, wherein:
- the token is stored in a container on the application;
- the container is encrypted at least in part through the lock; and
- the lock value comprises a decryption key for the container.

14. The non-transitory computer-readable medium of claim 11, wherein at least one of the anchor or the lock is a digitally signed value.

15. The non-transitory computer-readable medium of claim 11, wherein the access rights correspond to at least one of ownership rights, usage rights, or lessee rights.

16. The non-transitory computer-readable medium of claim 11, wherein:
- the application is made accessible in an application marketplace; and
- embedding the reference to the anchor into the application is performed prior to the application becoming accessible in the application marketplace.

17. The non-transitory computer-readable medium of claim 11, wherein verifying that the token is compatible comprises assessing the identifier of the anchor matches an identifier of the token.

18. The non-transitory computer-readable medium of claim 11, wherein the token is a non-fungible token (NFT).

19. The non-transitory computer-readable medium of claim 11, wherein the application is a media wallet.

20. The non-transitory computer-readable medium of claim 11, wherein the lock comprises a smart contract element that, when executed, transmits a payment to a creator of the application.

* * * * *